US011778314B2

(12) United States Patent
Sugiyama

(10) Patent No.: US 11,778,314 B2
(45) Date of Patent: Oct. 3, 2023

(54) IMAGING APPARATUS, ACCESSORY APPARATUS, AND METHODS FOR CONTROLLING SAME

(71) Applicant: CANON KABUSHIKI KAISHA, Tokyo (JP)

(72) Inventor: Kazumichi Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/472,406

(22) Filed: Sep. 10, 2021

(65) Prior Publication Data

US 2022/0086331 A1    Mar. 17, 2022

(30) Foreign Application Priority Data

Sep. 16, 2020  (JP) ................. 2020-155591

(51) Int. Cl.
*H04N 5/232* (2006.01)
*G03B 17/14* (2021.01)
*H04N 23/663* (2023.01)
*H04N 23/661* (2023.01)

(52) U.S. Cl.
CPC ........... *H04N 23/663* (2023.01); *G03B 17/14* (2013.01); *H04N 23/661* (2023.01)

(58) Field of Classification Search
None
See application file for complete search history.

(56) References Cited

U.S. PATENT DOCUMENTS

| | | |
|---|---|---|
| 2012/0162492 A1 | 6/2012 | Akamatsu et al. |
| 2017/0289414 A1 | 10/2017 | Komatsu |
| 2017/0289431 A1* | 10/2017 | Wada ..................... G03B 17/18 |
| 2018/0224720 A1 | 8/2018 | Pan et al. |
| 2018/0348475 A1* | 12/2018 | Sugiyama ............... G02B 7/14 |
| 2018/0352139 A1* | 12/2018 | Sugita .................... G03B 17/14 |
| 2019/0037127 A1* | 1/2019 | Kawada ................. G03B 17/14 |
| 2019/0285967 A1 | 9/2019 | Himei |
| 2020/0004112 A1 | 1/2020 | Sugita |
| 2020/0007740 A1 | 1/2020 | Sugita et al. |
| 2020/0007744 A1 | 1/2020 | Sugiyama |
| 2020/0041876 A1 | 2/2020 | Sugiyama |
| 2020/0096839 A1 | 3/2020 | Shigeta |
| 2020/0096840 A1 | 3/2020 | Kawada |
| 2020/0120259 A1 | 4/2020 | Sugiyama |
| 2021/0168278 A1 | 6/2021 | Takanashi |
| 2022/0082904 A1 | 3/2022 | Tada |

(Continued)

FOREIGN PATENT DOCUMENTS

| | | |
|---|---|---|
| EP | 3229461 A2 | 10/2017 |
| EP | 3633972 A1 | 4/2020 |
| JP | H07107205 A | 4/1995 |

(Continued)

*Primary Examiner* — Ahmed A Berhan
(74) *Attorney, Agent, or Firm* — Canon U.S.A., Inc. IP Division

(57) ABSTRACT

An accessory apparatus switches between a first communication mode where a signal for performing flow control is transmitted via a signal line CS each time a frame of data is transmitted via a signal line DATA and a second communication mode where the signal for performing the flow control is received via the signal line CS each time a predetermined number of blocks of data is transmitted via the signal line DATA.

8 Claims, 35 Drawing Sheets

(56) References Cited

U.S. PATENT DOCUMENTS

2022/0086331 A1  3/2022  Sugiyama
2022/0086341 A1  3/2022  Yonezawa

FOREIGN PATENT DOCUMENTS

| JP | 2018017867 A | 2/2018 |
| JP | 6427287 B1 | 11/2018 |
| JP | 2018205705 A | 12/2018 |
| JP | 2018205720 A | 12/2018 |
| WO | 2019244972 A1 | 12/2019 |

* cited by examiner

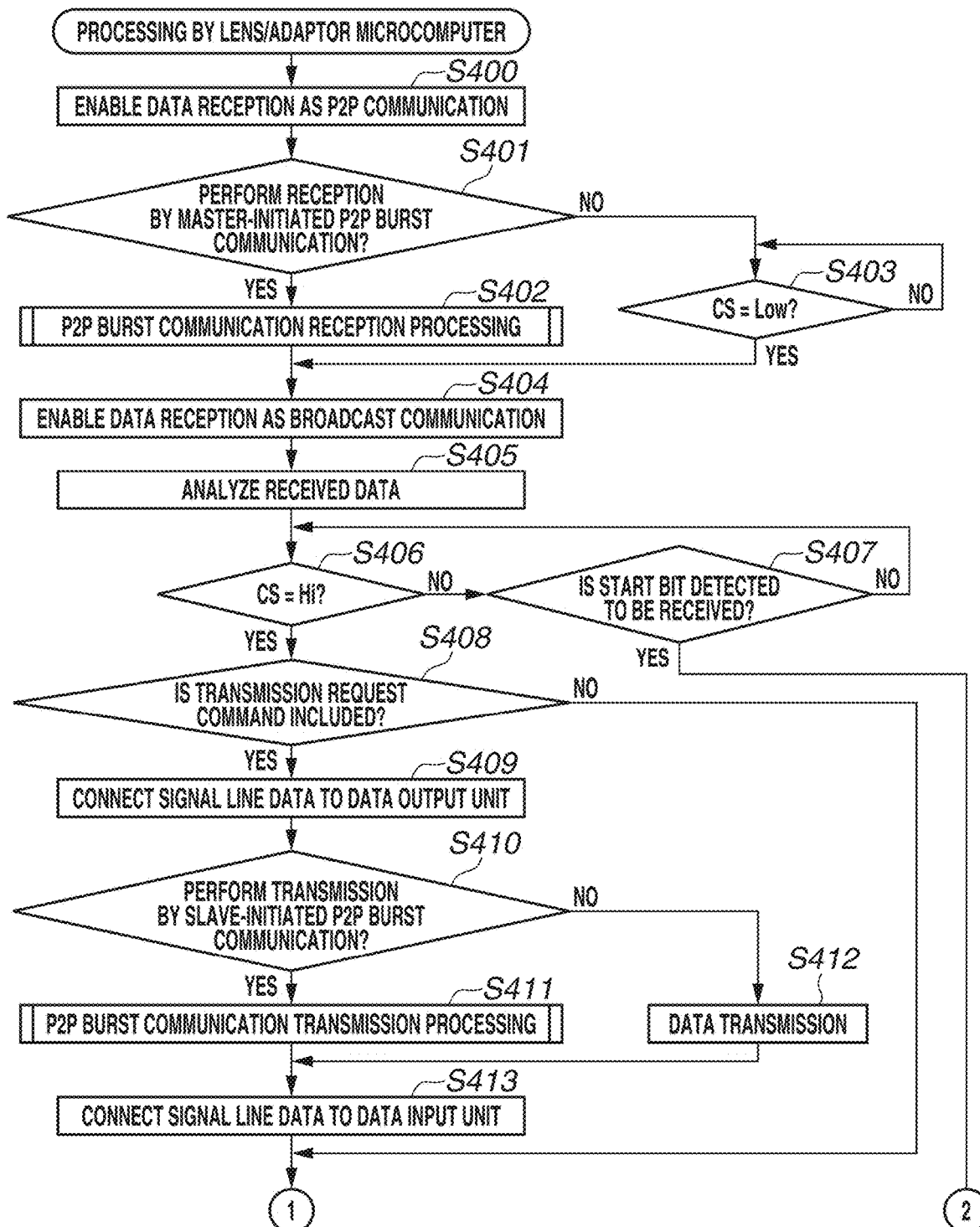

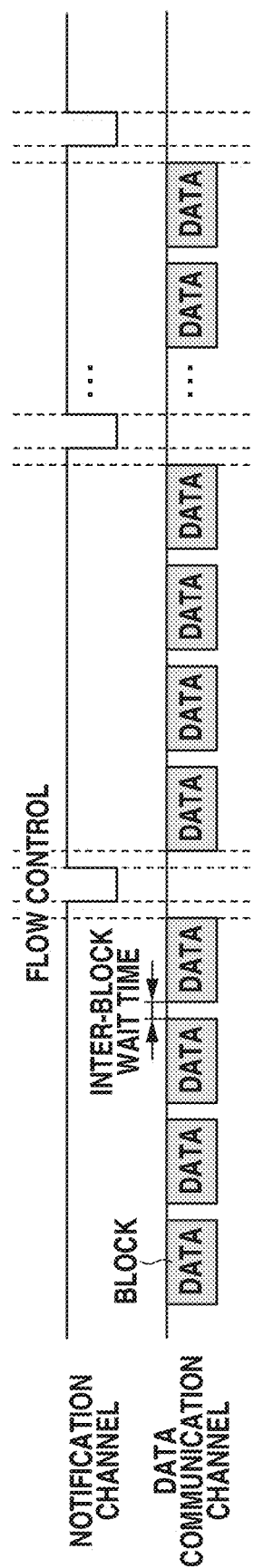

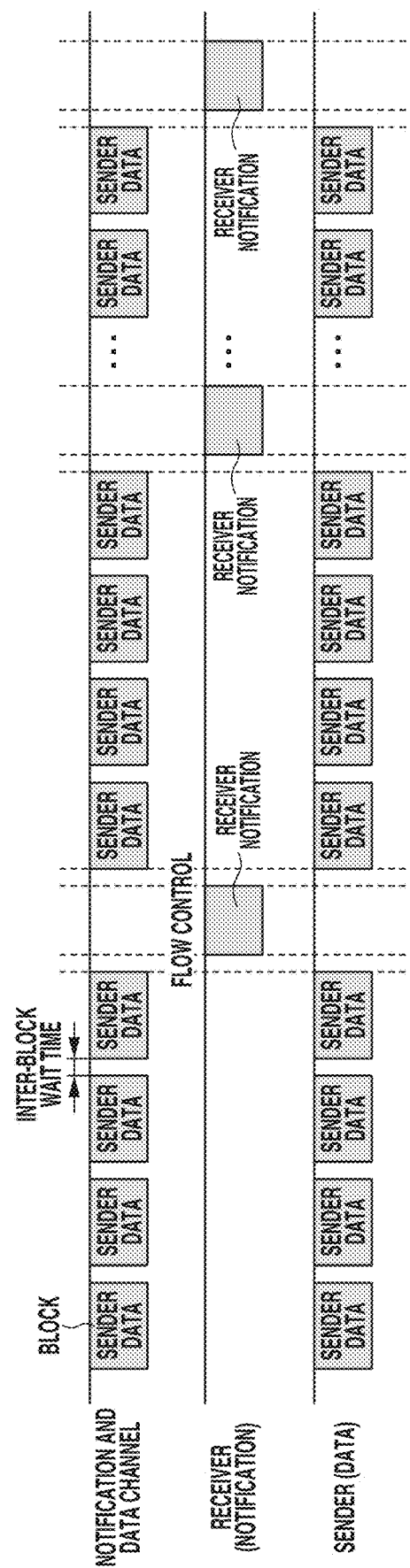

IMAGING APPARATUS, ACCESSORY APPARATUS, AND METHODS FOR CONTROLLING SAME

BACKGROUND OF THE INVENTION

Field of the Invention

The present invention relates to a camera main body and an accessory apparatus, such as an intermediate adaptor and an interchangeable lens, that communicate with each other, and methods for controlling the same.

Description of the Related Art

Techniques for performing communication between a camera main body and an accessory apparatus attached to the camera main body have been known.

Japanese Patent Application Laid-Open No. 2018-205720 discusses a technique where a camera main body communicates with an interchangeable lens mounted on the camera main body and an intermediate adaptor attached between the interchangeable lens and the camera main body via contacts disposed on a mount unit.

The amount of data to be communicated has been on the increase, due partly to advancement of imaging control and increase in frame rate, and a technique for communicating a greater amount of data in a shorter time has been demanded.

SUMMARY OF THE INVENTION

According to an aspect of the present invention, an accessory apparatus configured to be detachably attached to an imaging apparatus includes a control unit configured to communicate with the imaging apparatus via a first signal line and a second signal line, the first signal line being configured to communicate data via a first terminal, the second signal line being configured to communicate a signal via the second terminal, the signal being configured to perform flow control on communication via the first terminal. The control unit includes a switching unit configured to switch between a first communication mode where the signal configured to perform the flow control is transmitted via the second signal line if one frame of data is transmitted and a second communication mode where the signal configured to perform the flow control is received via the second signal line each time a predetermined number of blocks of data is transmitted.

According to another aspect of the present invention, an imaging apparatus to which an accessory apparatus is detachably attachable includes a control unit configured to communicate with the accessory apparatus via a first signal line and a second signal line, the first signal line being configured to communicate data via a first terminal, the second signal line configured to communicate a signal via the second terminal, the signal being configured to perform flow control on communication via the first terminal. The control unit includes a switching unit configured to switch between a first communication mode where the signal configured to perform the flow control is received via the second signal line if one frame of data is received and a second communication mode where the signal configured to perform the flow control is transmitted via the second signal line each time a predetermined number of blocks of data is received.

Further features of the present invention will become apparent from the following description of exemplary embodiments with reference to the attached drawings.

BRIEF DESCRIPTION OF THE DRAWINGS

FIGS. 10A and 10B are a flowchart for describing a communication procedure of a communication slave in P2P communication.

FIG. 21 is a diagram illustrating communication waveforms in a communication method using a notification channel and a data communication channel.

FIG. 22 is a diagram illustrating communication waveforms in a communication method using a notification and data channel.

DESCRIPTION OF THE EMBODIMENTS

Figure 1:
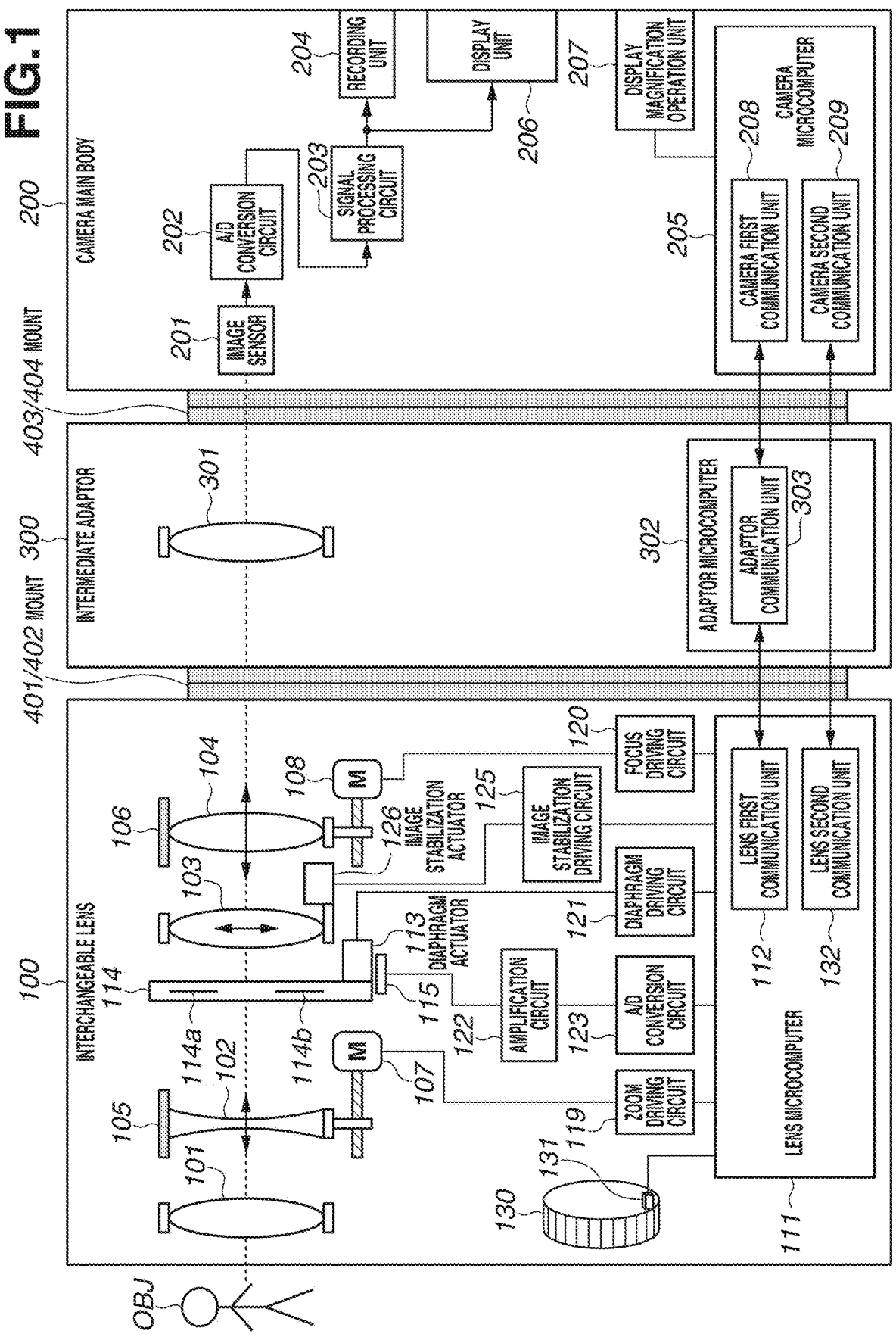
FIG. 1 is a block diagram illustrating a configuration of a camera system including an imaging apparatus and accessory apparatuses according to an exemplary embodiment of the present invention.

A first exemplary embodiment of the present invention will be described in detail below with reference to the drawings. In the drawings, similar members are designated by the same reference numerals, and redundant description will be omitted as much as possible. In the present exemplary embodiment, accessory apparatuses and an imaging apparatus communicate with each other based on a plurality of communication methods. As employed herein, the "communication methods" shall include a broadcast communication method (first communication method), a peer-to-peer (P2P) communication method (second communication method), and a P2P burst communication method (third communication method).

<Configuration of Camera System>

FIG. 1 is a block diagram illustrating a configuration of a camera system including an imaging apparatus (hereinafter, referred to as a camera main body) 200 according to the present invention, and an intermediate adaptor 300 and an interchangeable lens 100 serving as accessory apparatuses attachable to the camera main body 200. The camera main body 200, the interchangeable lens 100, and the intermediate adaptor 300 communicate control commands and internal information therebetween by using their respective communication units. The communication units support a plurality of communication methods each, and can select optimum communication modes for various situations by switching to the same communication method in a mutually synchronous manner depending on the type of data to be communicated and the purpose of communication.

FIG. 1 illustrates a configuration where the intermediate adaptor 300 is attached to the camera main body 200 as an example. However, the present invention is not limited thereto. The interchangeable lens 100 may be directly mounted on the camera main body 200. A plurality of intermediate adaptors may be attached if physically attachable.

The interchangeable lens 100 and the intermediate adaptor 300 are mechanically and electrically connected via a coupling mechanism including a mount 400 of the interchangeable lens 100 and a mount 401 of the intermediate adaptor 300. Similarly, the intermediate adaptor 300 and the camera main body 200 are mechanically and electrically connected via a coupling mechanism including a mount 402 of the intermediate adaptor 300 and a mount 403 of the camera main body 200.

The interchangeable lens 100 is powered by the camera main body 200 via a power terminal portion (not illustrated) disposed on the mount 400, and supplies operating power to various actuators and microcomputers of various devices described below. The intermediate adaptor 300 is powered by the camera main body 200 via a power terminal portion (not illustrated) on the mount 402, and supplies operating power to various actuators and microcomputers of various devices described below.

The interchangeable lens 100, the camera main body 200, and the intermediate adaptor 300 communicate with each other via communication terminal portions (illustrated in FIG. 2) disposed on the mounts 400, 401, 402, and 403.

The interchangeable lens 100 includes an imaging optical system. The imaging optical system includes, in order from an object OBJ side, a field lens 101, a zoom lens (magnification lens) 102 for magnification, a diaphragm unit 114 for adjusting a light amount, an image stabilization lens 103, and a focus lens 104 for focus adjustment.

The zoom lens 102 and the focus lens 104 are held by lens holding frames 105 and 106, respectively. The lens holding frames 105 and 106 are guided by a not-illustrated guide shaft to be movable in an optical axis direction (illustrated by a broken line in the diagram). The lens holding frames 105 and 106 are driven in the optical axis direction by stepping motors 107 and 108. The stepping motors 107 and 108 move the zoom lens 102 and the focus lens 104, respectively, in synchronization with driving pulses.

The image stabilization lens 103 reduces image blurs due to camera shakes, by shifting in directions orthogonal to the optical axis of the imaging optical system.

A lens microcomputer 111 is a lens control unit (accessory control unit) that controls operation of various units in the interchangeable lens 100. The lens microcomputer 111 receives control commands and transmission request commands transmitted from a camera microcomputer 205 via a lens first communication unit 112 serving as an interchangeable lens-dedicated communication unit, or a lens second communication unit 132 serving as an accessory communication unit. The lens microcomputer 111 performs lens control corresponding to the communication commands, and transmits lens data corresponding to the transmission request commands to the camera microcomputer 205 via the lens first communication unit 112. The lens first communication unit 112 and the lens second communication unit 132 may be configured, for example, so that the lens second communication unit 132 is used for communication related to operation of members specific to the interchangeable lens 100, such as the focus lens 104 and the diaphragm unit 114. The lens first communication unit 112 may be used for communication related to controls common with the intermediate adaptor 300, such as the acquisition of the operating amount of a lens barrel operation member.

The lens microcomputer 111 outputs driving signals to a zoom driving circuit 119 and a focus driving circuit 120 to drive the stepping motors 107 and 108 in response to commands related to magnification and focusing among the control commands. Zoom processing for controlling a magnification operation by using the zoom lens 102 and autofocus (AF) processing for controlling a focus adjustment operation by using the focus lens 104 are thereby performed.

The diaphragm unit 114 includes diaphragm blades 114a and 114b. The state of the diaphragm blades 114a and 114b is detected by a Hall element 115 and input to the lens microcomputer 111 via an amplification circuit 122 and an analog-to-digital (A/D) conversion circuit 123. The lens microcomputer 111 outputs a driving signal to a diaphragm driving circuit 121 to drive a diaphragm actuator 113 based on the input signal from the A/D conversion circuit 123. A light amount adjustment operation by the diaphragm unit 114 is thereby controlled.

The lens microcomputer 111 further drives an image stabilization actuator (such as a voice coil motor) 126 via an image stabilization driving circuit 125 based on camera shakes detected by a vibration sensor (not illustrated), such as a vibration gyroscope, included in the interchangeable lens 100. Image stabilization processing for controlling a shift operation (image stabilization operation) of the image stabilization lens 103 is thereby performed.

The interchangeable lens 100 also includes an operation ring 130 and an operation ring detection unit 131. An example of the operation ring detection unit 131 is a pair of photointerrupters that outputs two-phase signals based on a relative movement of the operation ring 130. The lens microcomputer 111 can detect the operation of the operation ring 130. The lens microcomputer 111 can notify the camera microcomputer 205 of the operation amount of the operation ring 130 via the lens first communication unit 112.

The intermediate adaptor 300 is, for example, an extender for changing a focal length. The intermediate adaptor 300 includes a magnification lens 301 and an adaptor microcomputer 302. The adaptor microcomputer 302 is an intermediate adaptor control unit for controlling operation of various units in the intermediate adaptor 300. The adaptor microcomputer 302 receives control commands and transmission request commands transmitted from the camera microcomputer 205 via an adaptor communication unit 303 serving as an accessory communication unit. The adaptor microcomputer 302 performs intermediate adaptor control corresponding to the control commands, and transmits intermediate adaptor data corresponding to the transmission request commands to the camera microcomputer 205 via the adaptor communication unit 303.

The camera main body 200 includes an image sensor 201, such as a charge-coupled device (CCD) sensor and a complementary metal-oxide-semiconductor (CMOS) sensor, an A/D conversion circuit 202, a signal processing circuit 203, a recording unit 204, the camera microcomputer 205, and a display unit 206.

The image sensor 201 photoelectrically converts an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various types of image processing on the digital signal from the A/D conversion circuit 202 to generate a video signal. The signal processing circuit 203 also generates focus information indicating a contrast state of the object image (focus state of the imaging optical system) and luminance information indicating an exposure state from the video signal. The signal processing circuit 203 outputs the video signal to the display unit 206. The display unit 206 displays the video signal as a live view image to be used in checking composition and the focus state.

The camera microcomputer 205 serving as a camera control unit controls the camera main body 200 based on input from camera operation members, such as a not-illustrated imaging instruction switch and various setting switches. The camera microcomputer 205 also transmits a control command related to the magnification operation of the zoom lens 102 to the lens microcomputer 111 via a camera first communication unit 208 or a camera second communication unit 209. For example, the camera microcomputer 205 transmits the control signal based on an operation on a not-illustrated zoom switch. The camera microcomputer 205 also transmits a control command related to the light amount adjustment operation of the diaphragm unit 114 based on the luminance information to the lens microcomputer 111 via the camera first communication unit 208 or the camera second communication unit 209. The camera microcomputer 205 also transmits a control command related to the focus adjustment operation of the focus lens 104 based on the focus information to the lens microcomputer 111 via the camera first communication unit 208 or the camera second communication unit 209. The camera microcomputer 205 also transmits transmission request commands for obtaining control information and state information about the interchangeable lens 100 to the lens microcomputer 111, and transmits transmission request commands for obtaining control information and state information about the intermediate adaptor 300 to the adaptor microcomputer 302.

<First Communication (FIG. 2)>

Figure 2:
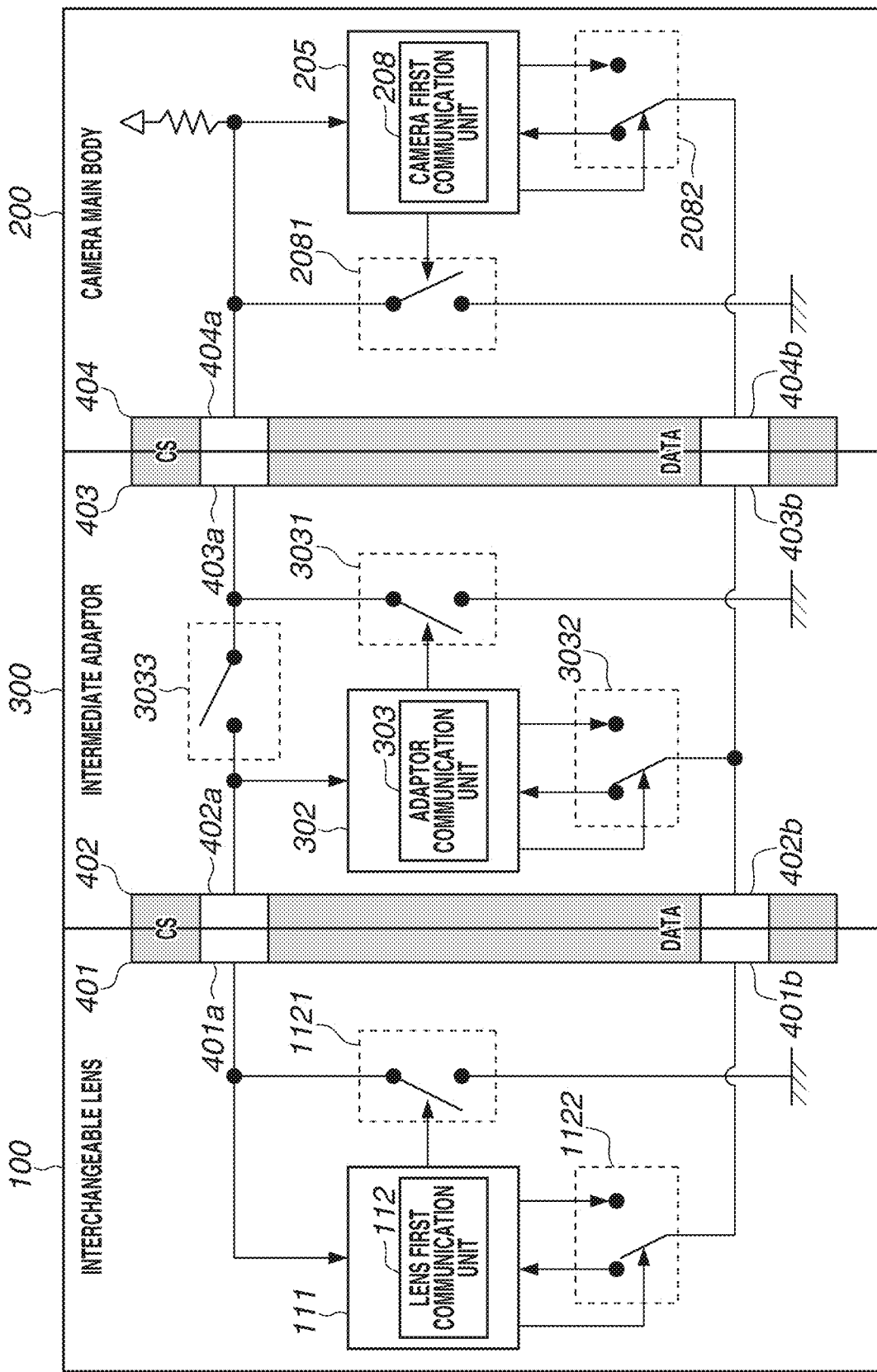
FIG. 2 is a schematic diagram illustrating a communication circuit in the camera system according to the exemplary embodiment.

A communication circuit constituted in the camera system including the camera first communication unit 208 of the camera main body 200, the lens first communication unit 112 of the interchangeable lens 100, and the adaptor communication unit 303 of the intermediate adaptor 300 will be described below with reference to FIG. 2. FIG. 2 is a schematic diagram illustrating the communication circuit in the camera system according to the present exemplary embodiment.

The camera microcomputer 205, the lens microcomputer 111, and the adaptor microcomputer 302 communicate using signal lines connected via communication terminal portions disposed on the mounts 400, 401, 402, and 403. The signal lines include two signal lines CS and DATA. The signal line CS transfers a signal for performing communication flow control and is used to make a notification of communication timing. The signal line DATA transfers data to be transmitted and received and is used for data communication. Communication using the signal lines CS and DATA will be referred to as first communication.

Communication using the signal line CS (second signal line) is performed via CS terminals 401a, 402a, 403a, and 404a. Communication using the signal line DATA is performed by using DATA terminals 401b, 402b, 403b, and 404b.

The signal line CS is connected to the camera microcomputer 205, the lens microcomputer 111, and the adaptor microcomputer 302. These microcomputers can detect the signal level (voltage level) of the signal line CS.

The signal line CS is connected to the power supply in the camera main body 200 in a pull-up manner, and connected to a ground (GND) via a GND switch 1121 of the interchangeable lens 100, a GND switch 2081 of the camera main body 200, and a GND switch 3031 of the intermediate adaptor 300. In other words, the signal line CS is in an open-drain connection. With such a configuration, the lens microcomputer 111, the camera microcomputer 205, and the adaptor microcomputer 302 can each set the signal level of the signal line CS to a low level (Low) by turning on (connecting) the respective GND switches. The signal level of the signal line CS can be set to a high level (Hi) by all the lens microcomputer 111, the camera microcomputer 205, and the adaptor microcomputer 302 turning off (disconnecting) the respective GND switches. Details of the content and operation procedures of the control signal to be transferred using the signal line CS during communication will be described below.

A CS switch 3033 is a switch for performing authentication communication described below. The CS switch 3033 is short-circuited in a steady state.

The signal line DATA (first signal line) is a single bidirectional data transmission line that can be used while switching the direction of data propagation. The signal line DATA can be connected to the lens microcomputer 111 via an input/output selection switch 1122 of the interchangeable lens 100. The signal line DATA can be connected to the camera microcomputer 205 via an input/output selection switch 2082 of the camera main body 200. The signal line DATA can be connected to the adaptor microcomputer 302 via an input/output selection switch 3032 of the intermediate adaptor 300. Each microcomputer includes a data output unit (CMOS system) for transmitting data and a data input unit (CMOS system) for receiving data. Each microcomputer can select whether to connect the signal line DATA to the data output unit or the data input unit by operating the input/output selection switch. With such a configuration, the lens microcomputer 111, the camera microcomputer 205, and the adaptor microcomputer 302 can transmit data by operating their input/output selection switch to connect the signal line DATA to the data output unit. In contrast, the lens microcomputer 111, the camera microcomputer 205, and the adaptor microcomputer 302 can receive data by operating their input/output selection switch to connect the signal line DATA to the data input unit. Details of the input/output switching procedure for the signal line DATA during communication will be described below.

While an example of the communication circuit according to the present exemplary embodiment has been described with reference to FIG. 2, the present invention is not limited thereto. For example, the signal line CS may be connected to the GND in the camera main body 200 in a pull-down manner, and may be connected to a not-illustrated power supply via the GND switches 1121, 2081, and 3031. The signal line DATA may be constantly connected to the data input units of the microcomputers, and the signal line DATA and the data output units may be configured to be connectable and disconnectable by switch operations.

<Description of Communication Data Format (Broadcast Communication and P2P Communication)>

Figure 3:
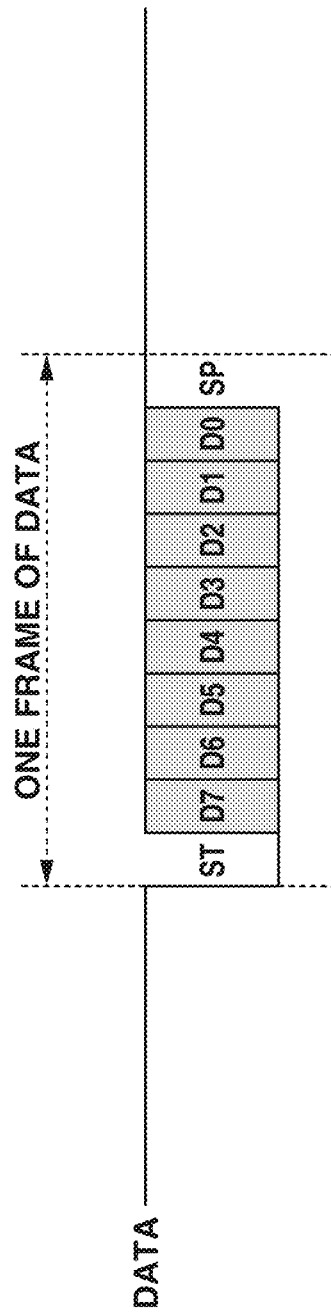
FIG. 3 is a diagram illustrating the format of data to be transmitted and received in the exemplary embodiment.

The format of data to be exchanged between the camera microcomputer 205, the lens microcomputer 111, and the adaptor microcomputer 302 will be described with reference to FIG. 3. FIG. 3 is a diagram illustrating the format of data to be transmitted and received using the signal line DATA in the present exemplary embodiment. This format (communication data format) is common between broadcast communication and P2P communication to be described below.

The communication data format is based on asynchronous communication, where communication speed for mutual communication is defined in advance and data is transmitted and received at a communication bitrate according to the definition. The signal level is maintained at Hi in a non-transmission state where no data transmission is being performed. To notify the data receiver of a start of data transmission, the signal level is set to Low only in the first bit period (start bit ST). One byte of data is transmitted in the following second to ninth, eight bit periods. The data bits are arranged in a most significant bit (MSB) first format, starting with MSB data D7, successively followed by data D6, data D5, . . . , with least significant bit data D0 at the end. To indicate the end of the transmission data, the signal level is set to Hi for one bit period (stop bit SP), whereby the transmission period of one frame of data starting with the start bit ST ends. While an example of the communication data format according to the present exemplary embodiment has been described with reference to FIG. 3, the present invention is not limited thereto. For example, the data bits may be arranged in a least significant bit (LSB) first format or in nine bits. Parity PA information may be added between the LSB data D0 and the stop bit SP. Communication data formats may be switched between broadcast communication and P2P communication to be described below.

<Broadcast Communication (First Communication Method)>

Figure 4:
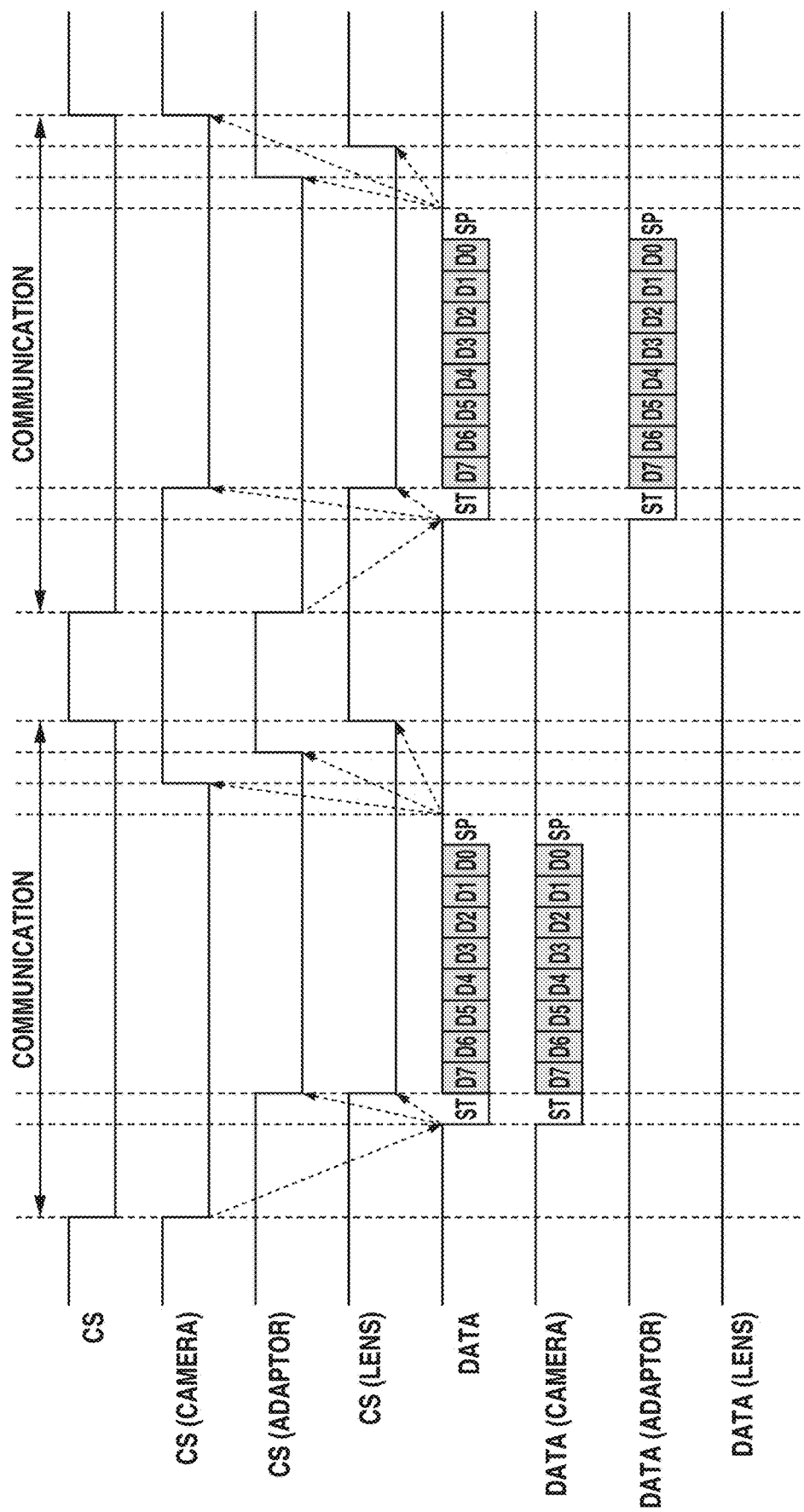
FIG. 4 is a diagram illustrating communication waveforms in broadcast communication.

An example of broadcast communication (first communication method) performed between the camera microcomputer 205, the lens microcomputer 111, and the adaptor microcomputer 302 will be described with reference to FIG. 4. FIG. 4 is a diagram illustrating communication waveforms in broadcast communication. Broadcast communication refers to a one-to-many simultaneous distribution mode where one of the camera microcomputer 205, the lens microcomputer 111, and the adaptor microcomputer 302 simultaneously transmits data to the other microcomputers. FIG. 4 illustrates a case where the camera microcomputer 205 performs broadcast communication with the lens microcomputer 111 and the adaptor microcomputer 302, and then the adaptor microcomputer 302 performs broadcast communication with the camera microcomputer 205 and the lens microcomputer 111 in response.

Initially, the camera microcomputer 205 serving as a communication master starts to output Low to the signal line CS to notify the lens microcomputer 111 and the adaptor microcomputer 302 that are communication slaves of a start of broadcast communication. Next, the camera microcomputer 205 outputs data to be transmitted to the signal line DATA. Meanwhile, the lens microcomputer 111 and the adaptor microcomputer 302 start to output Low to the signal line CS at timing when the start bit ST input from the signal line DATA is detected. The signal level of the signal line CS does not change at this point in time since the camera microcomputer 205 has already started outputting Low to the signal line CS.

The camera microcomputer 205 finishes outputting the data up to the stop bit SP, and then ends outputting Low from the signal line CS. The lens microcomputer 111 and the adaptor microcomputer 302 receive the data input to the signal line DATA up to the stop bit SP, and then analyze the received data and perform internal processing linked with the received data. The lens microcomputer 111 and the adaptor microcomputer 302 then make preparations to receive next data, and then end outputting Low to the signal line CS. As described above, the signal level of the signal line CS becomes Hi if all the camera microcomputer 205, the lens microcomputer 111, and the adaptor microcomputer 302 end outputting Low to the signal line CS. The signal level of the signal line CS being Hi can thus be checked to determine that all the microcomputers have finished processing related to the current communication and are ready for the next communication.

The adaptor microcomputer 302 checks that the signal level of the signal line CS has returned to Hi, and starts to output Low to the signal line CS to notify the camera microcomputer 205 and the lens microcomputer 111 of a start of broadcast communication. Next, the adaptor microcomputer 302 outputs data to be transmitted to the signal line DATA. Meanwhile, the camera microcomputer 205 and the lens microcomputer 111 start to output Low to the signal line CS at timing when the start bit ST input from the signal line DATA is detected. The signal level of the signal line CS does not change at this point in time since the adaptor microcomputer 302 has already started outputting Low to the signal line CS.

The adaptor microcomputer 302 finishes outputting the data up to the stop bit SP, and then stops outputting Low to the signal line CS. The camera microcomputer 205 and the lens microcomputer 111 receive the data input from the signal line DATA up to the stop bit SP, and then analyzes the received data and perform internal processing linked with the received data. The camera microcomputer 205 and the lens microcomputer 111 then makes preparations to receive next data, and stop outputting Low to the signal line CS.

As described above, the signal transferred by using the signal line CS during broadcast communication acts as a control signal indicating a start of broadcast communication and that communication processing is in process.

While an example of the communication waveforms in broadcast communication has been described with reference to FIG. 4, the present invention is not limited thereto. For example, while the data to be transmitted by a single broadcast communication is described to be one byte, two or three bytes of data may be transmitted. The broadcast communication may be unidirectional communication from the camera microcomputer 205, or communication master, to the lens microcomputer 111 and the adaptor microcomputer 302, or communication slaves.

<P2P Communication (Second Communication Method)>

Figure 5:
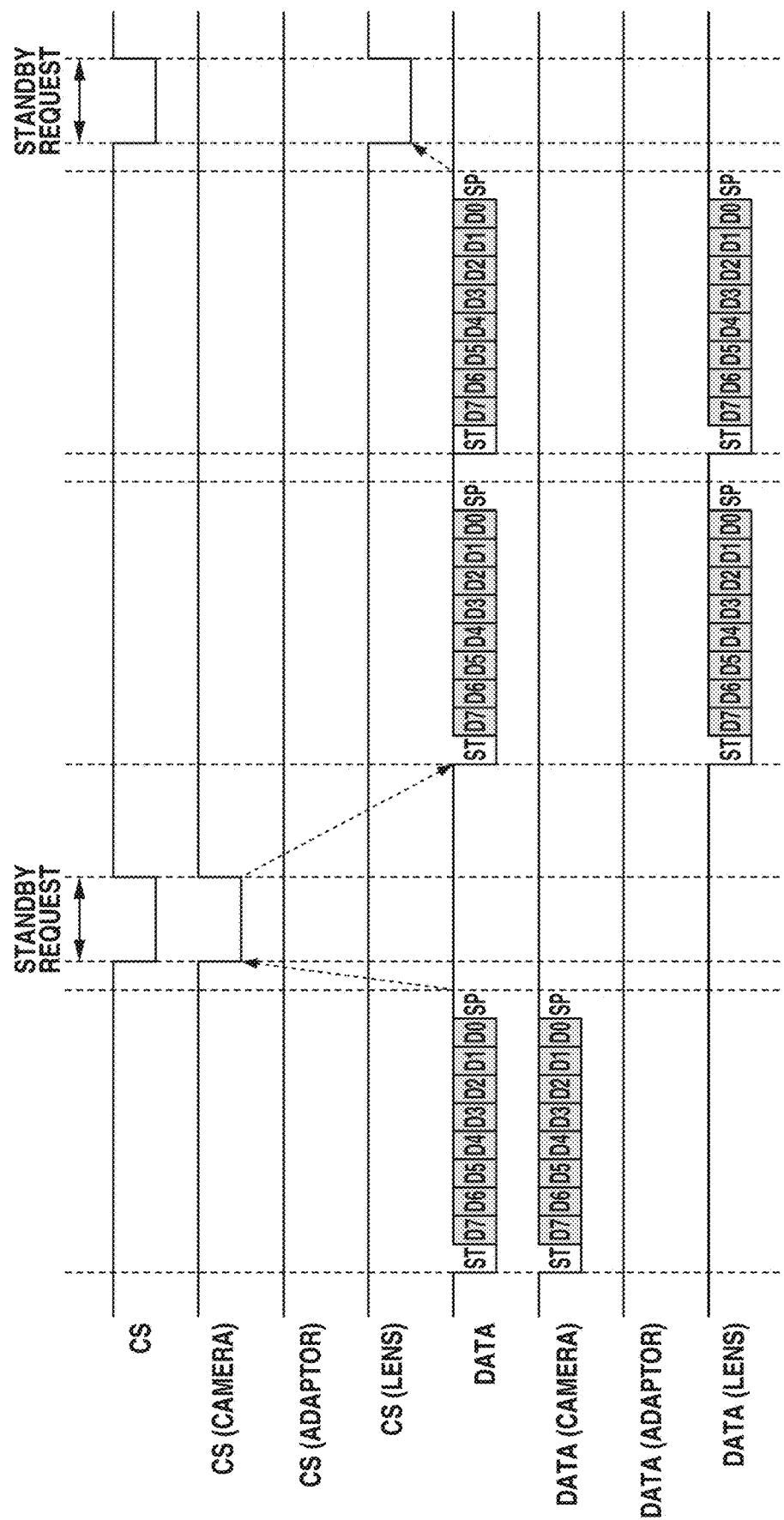
FIG. 5 is a diagram illustrating communication waveforms in peer-to-peer (P2P) communication.

An example of P2P communication (second communication method) performed between the camera microcomputer 205, the lens microcomputer 111, and the adaptor microcomputer 302 will be described with reference to FIG. 5. FIG. 5 is a diagram illustrating communication waveforms in P2P communication. P2P communication refers to a one-to-one individual communication mode where the camera microcomputer 205 transmits and receives data to/from either one of the lens and adaptor microcomputers 111 and 302 that is specified by the camera microcomputer 205. FIG. 5 illustrates a case where the lens microcomputer 111 is specified as a communication partner by the camera microcomputer 205, and the lens microcomputer 111 transmits two bytes of data to the camera microcomputer 205 in response to one-byte data transmission from the camera microcomputer 205. Procedures for specifying and switching communication partners will be described below.

Initially, the camera microcomputer 205 that is the communication master outputs data to be transmitted to the signal line DATA. The camera microcomputer 205 finishes outputting the data up to the stop bit SP, and then starts to output Low to the signal line CS. The camera microcomputer 205 subsequently makes preparations to receive next data, and then stops outputting Low to the signal line CS.

The lens microcomputer 111 detects the Low signal input from the signal line CS, and then analyzes the received data input from the signal line DATA and performs internal processing linked with the received data. The lens microcomputer 111 checks that the signal level of the signal line CS has returned to Hi, and then outputs two bytes of data to be transmitted to the signal line DATA in succession. The lens microcomputer 111 finishes outputting the data up to the stop bit SP of the second byte, and then starts to output Low to the signal line CS. The lens microcomputer 111 subsequently makes preparations to receive next data, and then stops outputting Low to the signal line CS.

Meanwhile, the adaptor microcomputer 302 not specified as a communication partner of the P2P communication does not participate in the operations of the signal line CS and the signal line DATA.

As described above, the signal transferred by using the signal line CS in P2P communication acts as a control signal indicating the end of transmission by the sender apparatus and a standby request for next data transmission.

While an example of the communication waveforms in P2P communication has been described with reference to FIG. 5, the present invention is not limited thereto. For example, data may be transmitted byte by byte or in units of other numbers of bytes.

<Communication Mode Switching>

Figure 6:
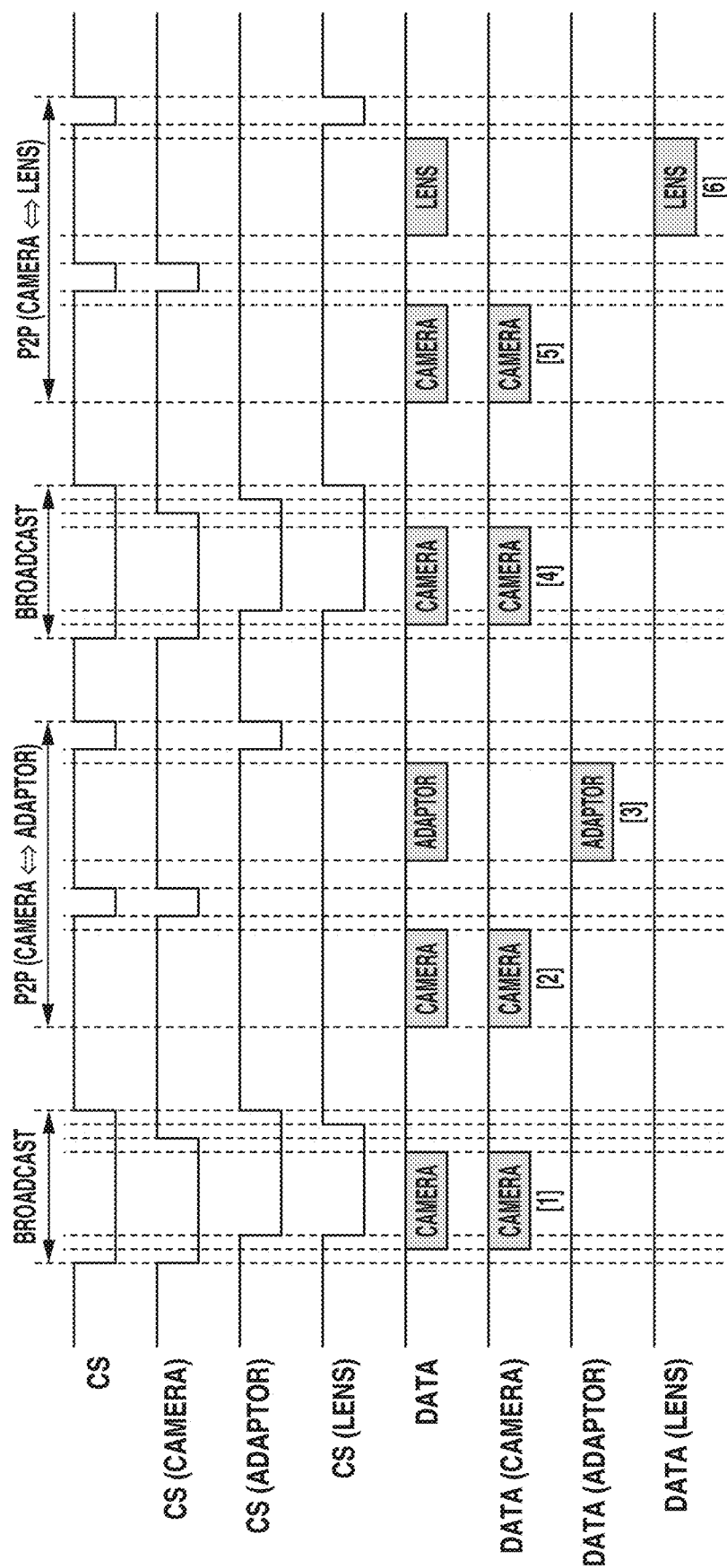
FIG. 6 is a diagram illustrating communication waveforms in switching communication methods.

An example of a method for switching broadcast communication and P2P communication performed between the camera microcomputer 205, the lens microcomputer 111, and the adaptor microcomputer 302, and specifying a communication partner in P2P communication will be described with reference to FIG. 6. FIG. 6 is a diagram illustrating communication waveforms in switching the communication methods. The communication partner of P2P communication is specified ([1]) by broadcast communication. In the following description, the camera microcomputer 205 transmits data ([2]) by P2P communication, after the camera microcomputer 205 specifies the adaptor microcomputer 302 as the communication partner of P2P communication by using broadcast communication. In response to this transmission, the adaptor microcomputer 302 sends a reply ([3]) by P2P communication. Next, the camera microcomputer 205 specifies the lens microcomputer 111 as the communication partner of P2P communication ([4]) by using broadcast communication. The camera microcomputer 205 then transmits data ([5]) and the lens microcomputer 111 sends a reply ([6]) by P2P communication.

The camera microcomputer 205, or communication master, initially performs broadcast communication by the procedure described with reference to FIG. 4. This broadcast communication notifies the communication slaves of slave specification data (communication partner specification data) for specifying the partner for the camera microcomputer 205 to communicate with in the subsequent P2P communication. The lens microcomputer 111 and the adaptor microcomputer 302, or communication slaves, each determine whether they are specified as the communication partner of the P2P communication based on the slave specification data received by the broadcast communication. Based on the broadcast communication, the camera microcomputer 205 and the communication slave specified switch to P2P communication. Since the adaptor microcomputer 302 is specified as the communication partner in this case, the camera microcomputer 205 and the adaptor microcomputer 302 transmit and receive data therebetween by P2P communication based on the procedure described with reference to FIG. 5. As described above, the camera microcomputer 205 initially transmits data to the adaptor microcomputer 302, and then the adaptor microcomputer 302 transmits data to the camera microcomputer 205.

After the P2P communication between the camera microcomputer 205 and the adaptor microcomputer 302 ends, the camera microcomputer 205 specifies the lens microcomputer 111 as the communication partner to communicate with in P2P communication by using broadcast communication. Based on this broadcast communication, the adaptor microcomputer 302 ends P2P communication, and the lens microcomputer 111 switches to P2P communication. If the broadcast communication is not executed, the P2P communication between the camera microcomputer 205 and the adaptor microcomputer 302 is continued. In P2P communication, the camera microcomputer 205 and the lens microcomputer 111 transmit and receive data with each other by the procedure described with reference to FIG. 5. As described above, the camera microcomputer 205 transmits data to the lens microcomputer 111, and then the lens microcomputer 111 transmits data to the camera microcomputer 205.

<Communication Flow Control in Broadcast Communication>

Communication flow control that is a communication procedure performed between the camera microcomputer 205, the lens microcomputer 111, and the adaptor microcomputer 302 in broadcast communication and P2P communication will be described.

Figure 7:
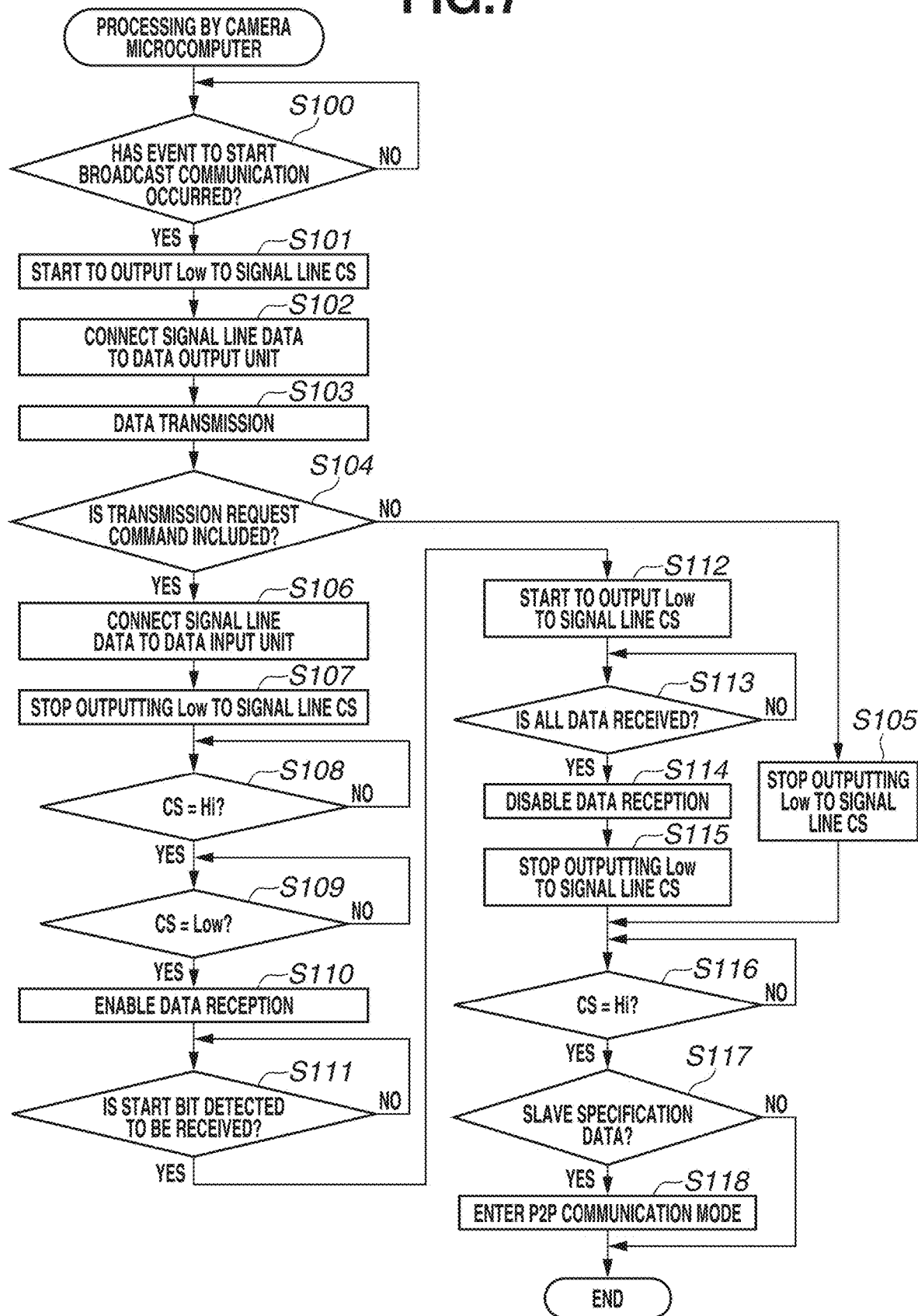
FIG. 7 is a flowchart for describing a communication procedure of a communication master in broadcast communication.
Figure 8:
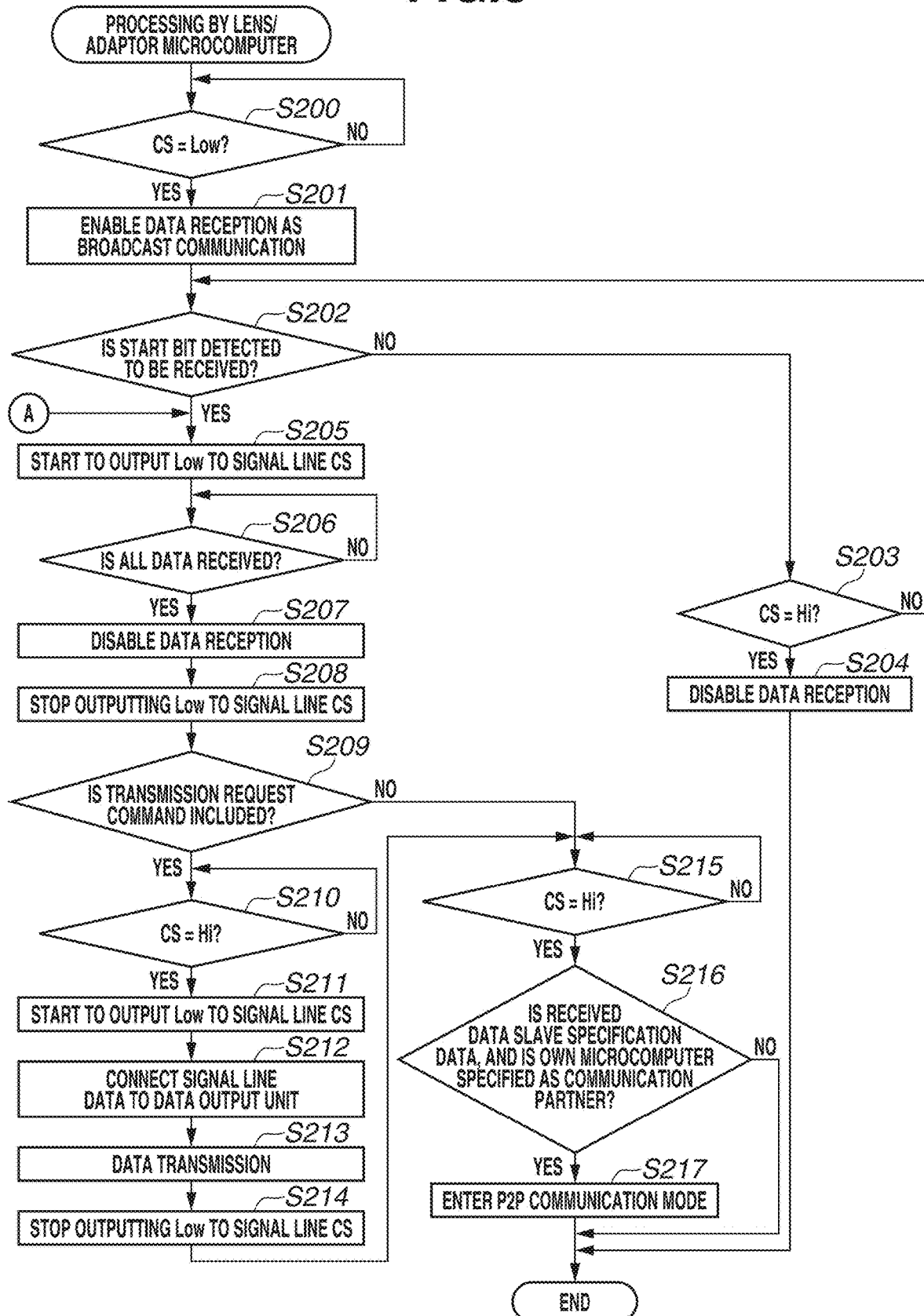
FIG. 8 is a flowchart for describing a communication procedure of a communication slave in broadcast communication.

A communication procedure in broadcast communication will be described with reference to FIGS. 7 and 8. FIG. 7 is a flowchart for describing a communication procedure of the camera microcomputer 205, or communication master, in broadcast communication. FIG. 8 is a flowchart for describing a communication procedure of the lens microcomputer 111 and the adaptor microcomputer 302, or communication slaves, in broadcast communication.

The communication procedure of the camera microcomputer 205 will initially be described.

In step S100, the camera microcomputer 205 determines whether an event to start broadcast communication has occurred. If the event has occurred (YES in step S100), the processing proceeds to step S101. If the event has not occurred (NO in step S100), the processing returns to step S100 and the camera microcomputer 205 repeats the determination.

In step S101, the camera microcomputer 205 turns on (connects) the GND switch 2081 to start outputting Low to the signal line CS. This notifies the lens microcomputer 111 and the adaptor microcomputer 302 of a start of broadcast communication.

In step S102, the camera microcomputer 205 operates the input/output selection switch 2082 to connect the signal line DATA to the data output unit of the camera microcomputer 205.

In step S103, the camera microcomputer 205 starts data transmission.

In step S104, the camera microcomputer 205 determines whether the data transmitted in step S103 includes a transmission request command. The transmission request command is a command for requesting a communication slave receiving the data transmitted from the camera microcomputer 205, or communication master, to transmit data to the camera microcomputer 205. If the transmission request command is included (YES in step S104), the processing proceeds to step S106. If the transmission request command is not included (NO in step S104), the processing proceeds to step S105.

In step S105, the camera microcomputer 205 turns off (disconnects) the GND switch 2081 to stop outputting Low to the signal line CS.

In step S106, the camera microcomputer 205 operates the input/output selection switch 2082 to connect the signal line DATA to the data input unit of the camera microcomputer 205.

In step S107, the camera microcomputer 205 turns off (disconnects) the GND switch 2081 to stop outputting Low to the signal line CS.

In step S108, the camera microcomputer 205 determines whether the signal level of the signal line CS is Hi. If the signal level is Hi (YES in step S108), the processing proceeds to step S109. If the signal level is not Hi (NO in step S108), the processing returns to step S108 and the camera microcomputer 205 repeats the determination.

In step S109, the camera microcomputer 205 determines whether the signal level of the signal line CS is Low. If the signal level is Low (YES in step S109), the processing proceeds to step S110. If the signal level is not Low (NO in step S109), the processing returns to step S109 and the camera microcomputer 205 repeats the determination.

In step S110, the camera microcomputer 205 enables data reception from the signal line DATA.

In step S111, the camera microcomputer 205 determines whether the start bit ST is detected to be received from the signal line DATA. If the start bit ST is detected to be received (YES in step S111), the processing proceeds to step S112. If the start bit ST is not detected to be received (NO in step S111), the processing returns to step S111 and the camera microcomputer 205 repeats the determination.

In step S112, the camera microcomputer 205 turns on (connects) the GND switch 2081 to start outputting Low to the signal line CS.

In step S113, the camera microcomputer 205 determines whether all the data has been received. If all the data has been received (YES in step S113), the processing proceeds to step S114. If not all the data has been received (NO in step S113), the processing returns to step S113 and the camera microcomputer 205 repeats the determination.

In step S114, the camera microcomputer 205 disables data reception from the signal line DATA.

In step S115, the camera microcomputer 205 turns off (disconnects) the GND switch 2081 to stop outputting Low to the signal line CS.

In step S116, the camera microcomputer 205 determines whether the signal level of the signal line CS is Hi. If the signal level is Hi (YES in step S116), the processing proceeds to step S117. If the signal level is not Hi (NO in step S116), the processing returns to step S116 and the camera microcomputer 205 repeats the determination.

In step S117, the camera microcomputer 205 determines whether the data transmitted in step S103 is slave specification data for specifying a communication partner. If the data is slave specification data (YES in step S117), the processing proceeds to step S118. If the data is not slave specification data (NO in step S117), the processing ends.

In step S118, the camera microcomputer 205 enters a P2P communication mode.

The communication procedure of the adaptor microcomputer 302 will now be described with reference to FIG. 8. Since the communication procedure of the lens microcomputer 111 is almost the same as that of the adaptor microcomputer 302, a description thereof will be omitted in the present exemplary embodiment.

In step S200, the adaptor microcomputer 302 determines whether the signal level of the signal line CS is Low. If the signal level is Low (YES in step S200), the processing proceeds to step S201. If the signal level is not Low (NO in step S200), the processing returns to step S200 and the adaptor microcomputer 302 repeats the determination.

In step S201, the adaptor microcomputer 302 enables data reception from the signal line DATA as broadcast communication.

In step S202, the adaptor microcomputer 302 determines whether the start bit ST is detected to be received from the signal line DATA. If the start bit ST is detected to be received (YES in step S202), the processing proceeds to step S205. If the start bit ST is not detected to be received (NO in step S202), the processing proceeds to step S203.

In step S203, the adaptor microcomputer 302 determines whether the signal level of the signal line CS is Hi. If the signal level is Hi (YES in step S203), the processing proceeds to step S204. If the signal level is not Hi (NO in step S203), the processing returns to step S202.

In step S204, the adaptor microcomputer 302 disables data reception from the signal line DATA.

The reason why the processing of steps S203 and S204 is performed here is to accommodate a situation where the camera microcomputer 205 and the lens microcomputer 111 perform P2P communication therebetween and only the adaptor microcomputer 302 performs broadcast communication. In such a situation, the adaptor microcomputer 302 does not receive data from the camera microcomputer 205.

In step S205, the adaptor microcomputer 302 turns on (connects) the GND switch 3031 to start outputting Low to the signal line CS.

In step S206, the adaptor microcomputer 302 determines whether all the data has been received. If all the data has been received (YES in step S206), the processing proceeds to step S207. If not all the data has been received (NO in step S206), the processing returns to step S206 and the adaptor microcomputer 302 repeats the determination.

In step S207, the adaptor microcomputer 302 disables data reception from the signal line DATA.

In step S208, the adaptor microcomputer 302 turns off (disconnects) the GND switch 3031 to stop outputting Low to the signal line CS.

In step S209, the adaptor microcomputer 302 determines whether the data received in step S206 includes the transmission request command. If the transmission request command is included (YES in step S209), the processing proceeds to step S210. If the transmission request command is not included (NO in step S209), the processing proceeds to step S215.

In step S210, the adaptor microcomputer 302 determines whether the signal level of the signal line CS is Hi. If the signal level is Hi (YES in step S210), the processing proceeds to step S211. If the signal level is not Hi (NO in step S210), the processing returns to step S210 and the adaptor microcomputer 302 repeats the determination.

In step S211, the adaptor microcomputer 302 turns on (connects) the GND switch 3031 to start outputting Low to the signal line CS.

In step S212, the adaptor microcomputer 302 operates the input/output selection switch 3032 to connect the signal line DATA to the data output unit of the adaptor microcomputer 302.

In step S213, the adaptor microcomputer 302 starts data transmission.

In step S214, the adaptor microcomputer 302 turns off (disconnects) the GND switch 3031 to stop outputting Low to the signal line CS.

In step S215, the adaptor microcomputer 302 determines whether the signal level of the signal line CS is Hi. If the signal level is Hi (YES in step S215), the processing proceeds to step S216. If the signal level is not Hi (NO in step S215), the processing returns to step S215 and the adaptor microcomputer 302 repeats the determination.

In step S216, the adaptor microcomputer 302 determines whether the data received in step S206 is slave specification data and the adaptor microcomputer 302 is specified as the communication partner of the camera microcomputer 205 in P2P communication. If the data is slave specification data and the adaptor microcomputer 302 is specified as the communication partner (YES in step S216), the processing proceeds to step S217. If the data is not slave specification data or the adaptor microcomputer 302 is not specified as the communication partner (NO in step S216), the processing ends.

In step S217, the adaptor microcomputer 302 enters the P2P communication mode.

<Communication Flow Control in P2P Communication>

Figure 9A:
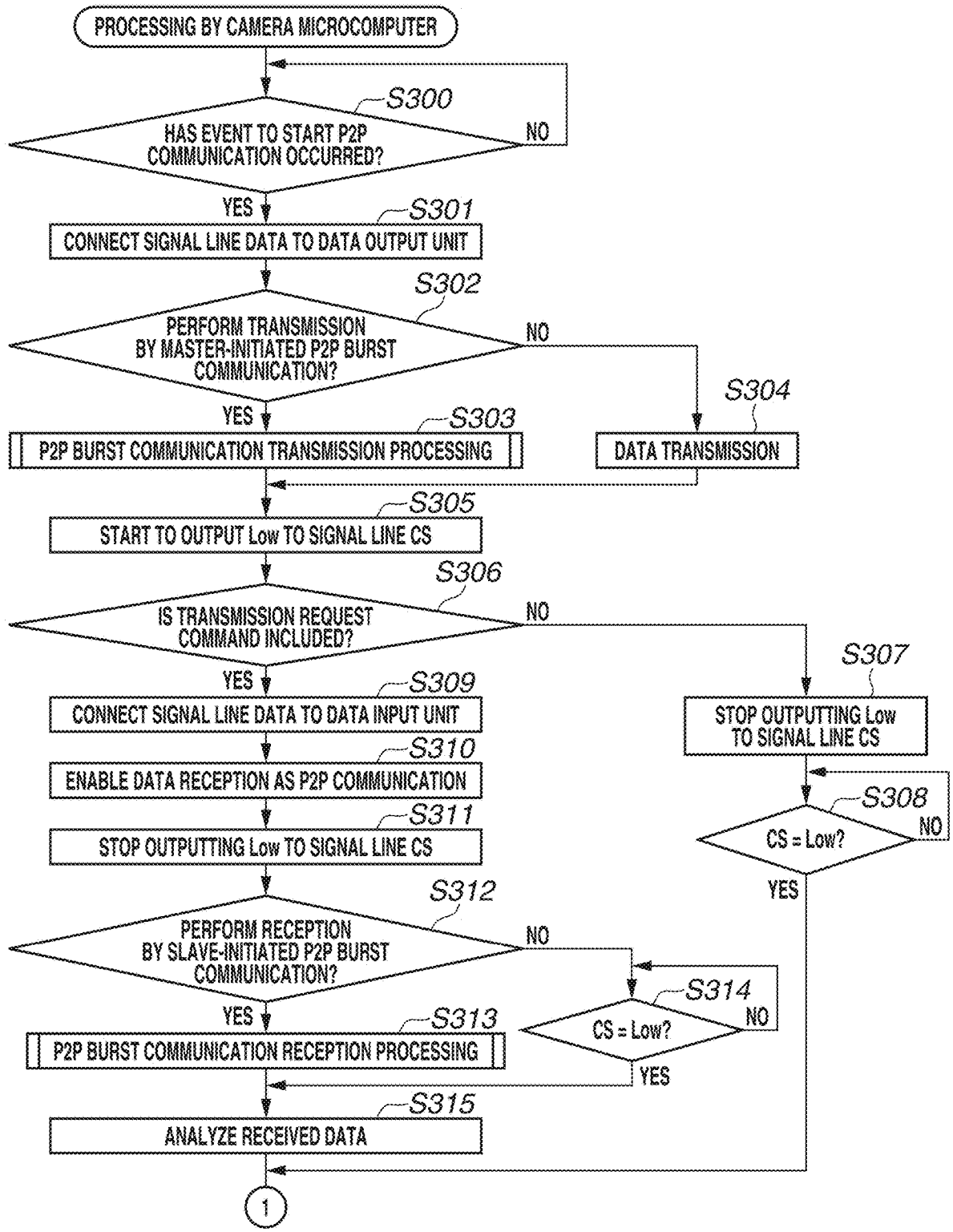
FIGS. 9A and 9B are a flowchart for describing a communication procedure of the communication master in P2P communication.
Figure 9B:
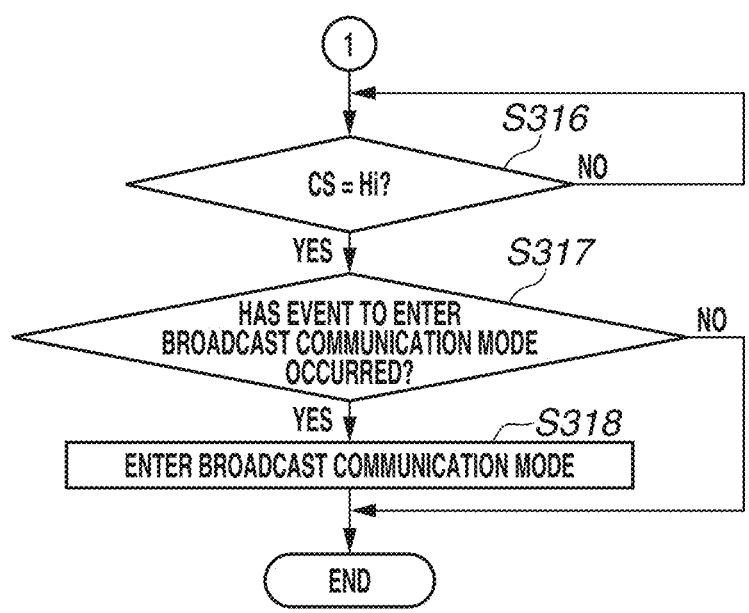

Communication procedures in P2P communication will be described with reference to FIGS. 9A to 10B. FIGS. 9A and 9B are a flowchart for describing the communication procedure of the camera microcomputer 205, or communication master, in P2P communication.

In step S300, the camera microcomputer 205 determines whether an event to start P2P communication has occurred. If the event has occurred (YES in step S300), the processing proceeds to step S301. If the event has not occurred (NO in step S300), the processing returns to step S300 and the camera microcomputer 205 repeats the determination.

In step S301, the camera microcomputer 205 operates the input/output selection switch 2082 to connect the signal line DATA to the data output unit of the camera microcomputer 205.

In step S302, the camera microcomputer 205 determines whether to perform master-initiated P2P burst communication transmission. If master-initiated P2P burst communication transmission is to be performed (YES in step S302), the processing proceeds to step S303. If not (NO in step S302), the processing proceeds to step S304.

In step S303, the camera microcomputer 205 performs master-initiated P2P burst communication transmission. The processing proceeds to step S305. Details of the master-initiated P2P burst communication transmission processing will be described below.

In step S304, the camera microcomputer 205 starts data transmission.

In step S305, the camera microcomputer 205 turns on (connects) the GND switch 2081 to start outputting Low to the signal line CS.

In step S306, the camera microcomputer 205 determines whether the data transmitted in step S304 includes the transmission request command. If the transmission request command is included (YES in step S306), the processing proceeds to step S309. If the transmission request command is not included (NO in step S306), the processing proceeds to step S307.

In step S307, the camera microcomputer 205 turns off (disconnects) the GND switch 2081 to stop outputting Low to the signal line CS.

In step S308, the camera microcomputer 205 determines whether the signal level of the signal line CS is Low. If the signal level is Low (YES in step S308), the processing proceeds to step S316. If the signal level is not Low (NO in step S308), the processing returns to step S308 and the camera microcomputer 205 repeats the determination.

In step S309, the camera microcomputer 205 operates the input/output selection stich 2082 to connect the signal line DATA to the data input unit of the camera microcomputer 205.

In step S310, the camera microcomputer 205 enables data reception from the signal line DATA as P2P communication.

In step S311, the camera microcomputer 205 turns off (disconnects) the GND switch 2081 to stop outputting Low to the signal line CS.

In step S312, the camera microcomputer 205 determines whether to perform slave-initiated P2P burst communication reception. If slave-initiated P2P burst communication reception is to be performed (YES in step S312), the processing proceeds to step S313. If not (NO in step S312), the processing proceeds to step S314.

In step S313, the camera microcomputer 205 performs slave-initiated P2P burst communication reception. The processing proceeds to step S315. Details of the slave-initiated P2P burst communication reception processing will be described below.

In step S314, the camera microcomputer 205 determines whether the signal level of the signal line CS is Low. If the signal level is Low (YES in step S314), the processing proceeds to step S315. If the signal level is not Low (NO in step S314), the processing returns to step S314 and the camera microcomputer 205 repeats the determination.

In step S315, the camera microcomputer 205 analyzes the data received from the signal line DATA.

In step S316, the camera microcomputer 205 determines whether the signal level of the signal line CS is Hi. If the signal level is Hi (YES in step S316), the processing proceeds to step S317. If the signal level is not Hi (NO in step S316), the processing returns to step S316 and the camera microcomputer 205 repeats the determination.

In step S317, the camera microcomputer 205 determines whether an event to enter a broadcast communication mode has occurred. If such an event has occurred (YES in step S317), the processing proceeds to step S318. If no such event has occurred (NO in step S317), the processing ends.

In step S318, the camera microcomputer 205 enters the broadcast communication mode.

Figure 10B:
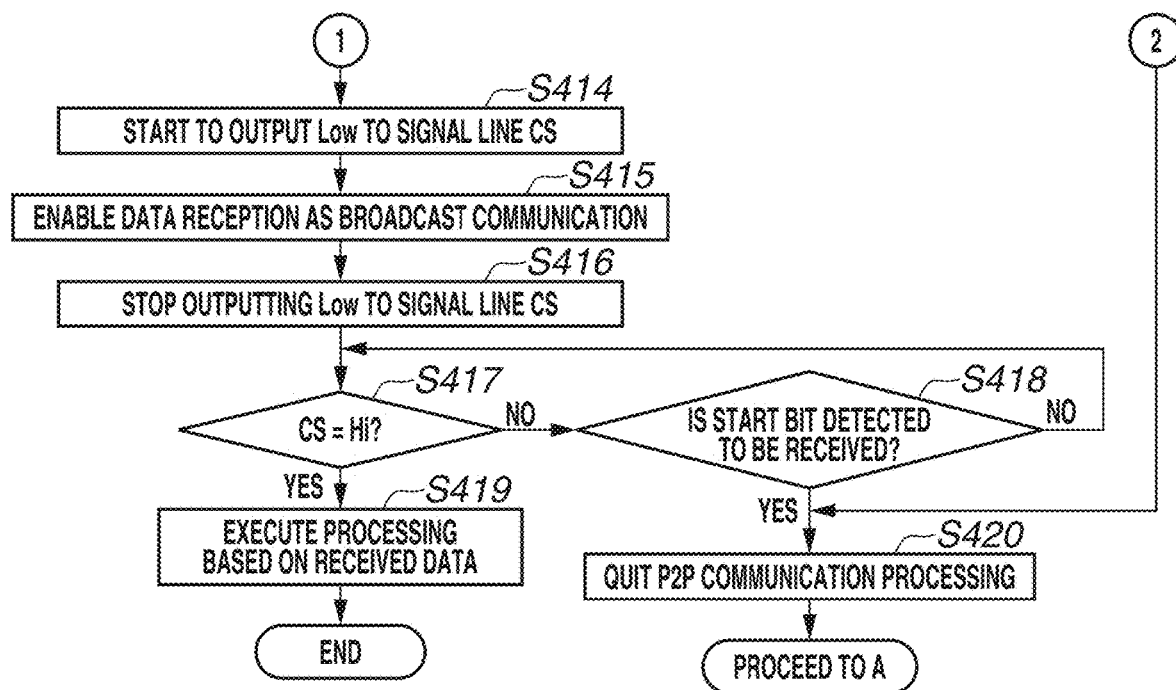

FIGS. 10A and 10B are a flowchart for describing the communication procedure of the adaptor microcomputer 302, or communication slave, in P2P communication. Since the communication procedure of the lens microcomputer 111 is almost the same as that of the adaptor microcomputer 302, a description thereof will be omitted in the present exemplary embodiment.

In step S400, the adaptor microcomputer 302 enables data reception from the signal line DATA as P2P communication.

In step S401, the adaptor microcomputer 302 determines whether to perform master-initiated P2P burst communication reception. If master-initiated P2P burst communication reception is to be performed (YES in step S401), the processing proceeds to step S402. If not (NO in step S401), the processing proceeds to step S403.

In step S402, the adaptor microcomputer 302 performs master-initiated P2P burst communication reception. The processing then proceeds to step S404. Details of the master-initiated P2P burst communication reception processing will be described below.

In step S403, the adaptor microcomputer 302 determines whether the signal level of the signal line CS is Low. If the signal level is Low (YES in step S403), the processing proceeds to step S404. If the signal level is not Low (NO in step S403), the processing returns to step S403 and the adaptor microcomputer 302 repeats the determination.

In step S404, the adaptor microcomputer 302 enables data reception from the signal line DATA as broadcast communication.

In step S405, the adaptor microcomputer 302 analyzes the data received from the signal line DATA.

In step S406, the adaptor microcomputer 302 determines whether the signal level of the signal line CS is Hi. If the signal level is Hi (YES in step S406), the processing proceeds to step S408. If the signal level is not Hi (NO in step S406), the processing proceeds to step S407.

In step S407, the adaptor microcomputer 302 determines whether the start bit ST is detected to be received from the signal line DATA. If the start bit ST is detected to be received (YES in step S407), the processing proceeds to step S420. If the start bit ST is not detected to be received (NO in step S407), the processing proceeds to step S406.

In step S408, the adaptor microcomputer 302 determines whether the data received in step S405 includes the transmission request command. If the transmission request command is included (YES in step S408), the processing proceeds to step S409. If the transmission request command is not included (NO in step S408), the processing proceeds to step S414.

In step S409, the adaptor microcomputer 302 operates the input/output selection switch 3032 to connect the signal line DATA to the data output unit of the adaptor microcomputer 302.

In step S410, the adaptor microcomputer 302 determines whether to perform slave-initiated P2P burst communication transmission. If slave-initiated P2P burst communication transmission is to be performed (YES in step S410), the processing proceeds to step S411. If not (NO in step S410), the processing proceeds to step S412.

In step S411, the adaptor microcomputer 302 performs slave-initiated P2P burst communication transmission. The processing proceeds to step S413. Details of the slave-initiated P2P burst communication transmission processing will be described below.

In step S412, the adaptor microcomputer 302 starts data transmission.

In step S413, the adaptor microcomputer 302 operates the input/output selection switch 3032 to connect the signal line DATA to the data input unit of the adaptor microcomputer 302.

In step S414, the adaptor microcomputer 302 turns on (connects) the GND switch 3031 to start outputting Low to the signal line CS.

In step S415, the adaptor microcomputer 302 enables data reception from the signal line DATA as broadcast communication.

In step S416, the adaptor microcomputer 302 turns off (disconnects) the GND switch 3031 to stop outputting Low to the signal line CS.

In step S417, the adaptor microcomputer 302 determines whether the signal level of the signal line CS is Hi. If the signal level is Hi (YES in step S417), the processing proceeds to step S419. If the signal level is not Hi (NO in step S417), the processing proceeds to step S418.

In step S418, the adaptor microcomputer 302 determines whether the start bit ST is detected to be received from the signal line DATA. If the start bit ST is detected to be received (YES in step S418), the processing proceeds to step S420. If the start bit ST is not detected to be received (NO in step S418), the processing proceeds to step S417.

In step S419, the adaptor microcomputer 302 executes processing based on the data received in step S405. After the execution of the processing of step S419, P2P communication can be continued by starting the present procedure again.

In step S420, the adaptor microcomputer 302 quits P2P communication processing. The processing then proceeds to step S205 of FIG. 8 to perform broadcast communication.

In such a manner, the communication partner of P2P communication can be specified by broadcast communication, and broadcast communication and P2P communication can be switched at the same time.

An enormous amount of data is difficult to communicate by P2P communication at a time since the size of data that can be transmitted by one session of P2P communication is limited due to the reception buffer size of the receiver apparatus. An enormous amount of data can be transferred by repeating P2P communication over and over. This, however, increases the transfer time since the communication master and the communication slave alternately transfer data and issue notifications using the signal line CS in P2P communication. To solve such an issue, an enormous amount of data is transferred by P2P burst communication described next.

<Switching to Slave-Initiated P2P Burst Communication Mode>

Switching to P2P burst communication performed between the camera microcomputer 205 and the adaptor microcomputer 302 and an example of the P2P burst communication will be described with reference to FIGS. 11 to 13.

Figure 11:
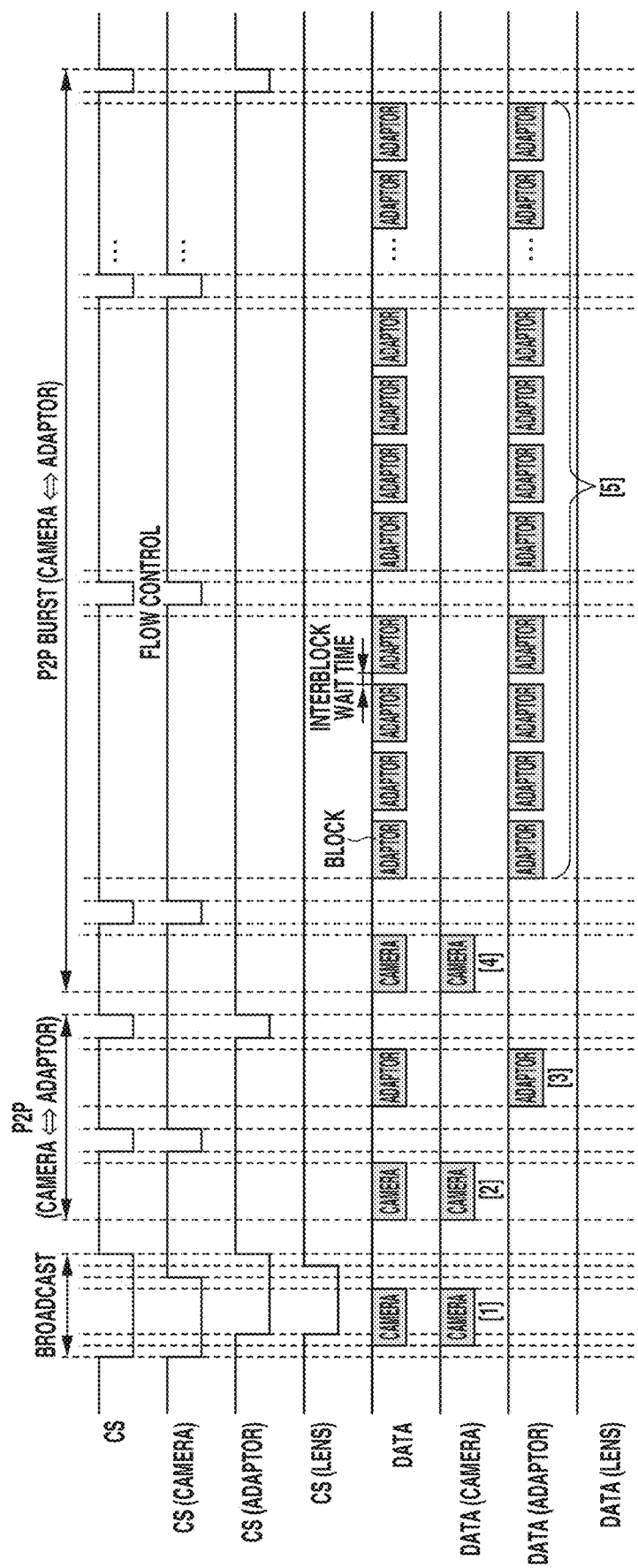
FIG. 11 is a diagram illustrating communication waveforms in slave-initiated P2P burst communication.

FIG. 11 is a diagram illustrating communication waveforms in slave-initiated P2P burst communication where data is transferred from the adaptor microcomputer 302 to the camera microcomputer 205. In the following description, the camera microcomputer 205 specifies the adaptor microcomputer 302 as the communication partner of P2P communication ([1]) by broadcast communication. The camera microcomputer 205 then transmits data ([2]) and the adaptor microcomputer 302 sends a reply ([3]) by P2P communication. The transmission ([2]) from the camera microcomputer 205 transmits burst communication information about P2P burst communication (corresponding to step S2802 of FIG. 28). The burst communication information is setting information about slave-initiated P2P burst communication to be performed afterward. When receiving the burst communication information, the adaptor microcomputer 302 sends a reply an in response (corresponding to step S2805 of FIG. 28). Examples of the information transmitted by the reply an include information indicating the reception of the burst communication information. The camera microcomputer 205 then transmits a command to enter slave-initiated P2P burst communication ([4]), and the adaptor microcomputer 302 performs slave-initiated P2P burst communication with the camera microcomputer 205 ([5]).

The adaptor microcomputer 302 may transmit burst communication information about the intermediate adaptor 300 to the camera microcomputer 205. In such a case, for example, the camera microcomputer 205 transmits a command for requesting burst communication information (corresponding to step S2807 of FIG. 28) after the reply an from the adaptor microcomputer 302. The adaptor microcomputer 302 receives the command, and transmits the burst communication information in response (corresponding to step S2809 of FIG. 28). With such a configuration, P2P burst communication can be performed by using settings executable by both the apparatuses even if the camera main body 200 and the intermediate adaptor 300 have different burst communication information.

The processing for specifying the communication partner of P2P communication and the P2P communication are similar to those described with reference to FIG. 6. A description thereof will thus be omitted.

The burst communication information for slave-initiated P2P burst communication according to the present exemplary embodiment includes a block size, an interblock wait time, the number of blocks ahead of flow control, and a total size.

A block refers to a group of data to be continuously communicated by slave-initiated P2P burst communication. The block size is the number of bytes of data included in a block. For example, the block size in the present exemplary embodiment refers to the size of data that the camera microcomputer 205, or receiver of slave-initiated P2P burst communication, can continuously receive. In the present exemplary embodiment, the block size is 16 bytes. In such a case, each block includes 16 consecutive frames of data. As described above, one frame of data includes the start bit ST of Low level, eight bits (one byte) of data, and the stop bit SP of Hi level. If the block size is 16 bytes, each block includes a total of 16 start bits ST and 16 stop bits in addition to 16 bytes of data.

The interblock wait time refers to a time for which the adaptor microcomputer 302, or sender of slave-initiated P2P burst communication, waits before starting to transmit the next block after the completion of transmission of one block. In the present exemplary embodiment, the interblock wait time refers to the time from when the camera microcomputer 205, or the receiver of slave-initiated P2P burst communication, completes receiving one block to when the camera microcomputer 205 becomes ready to receive the next block. Specifically, the interblock wait time is 100 ns.

In the present exemplary embodiment, flow control is implemented by the camera microcomputer 205, or the receiver of slave-initiated P2P burst communication, making a notification of communication timing using the signal line CS. For example, time for processing other than the slave-initiated P2P burst communication can be secured by making the notification of the communication timing after the completion of the processing other than the communication.

The number of blocks ahead of flow control is the number of blocks to be accepted between one session of flow control and the next. The number of blocks ahead of flow control according to the present exemplary embodiment refers to an interval for the camera microcomputer 205, or receiver of slave-initiated P2P burst communication, to secure time for processing other than slave-initiated P2P burst communication. Specifically, the number of blocks ahead of flow control is four. The number of blocks ahead of flow control may also be referred to as a predetermined number of blocks.

The total size refers to the size of data for the adaptor microcomputer 302, or the sender of slave-initiated P2P burst communication, to transmit by the slave-initiated P2P burst communication. For example, if the total size is 128 bytes and the block size is 16 bytes, a total of eight blocks are transmitted.

Next, the camera microcomputer 205 transmits a command to enter slave-initiated P2P burst communication, and the adaptor microcomputer 302 performs slave-initiated P2P burst communication with the camera microcomputer 205 based on the foregoing burst communication information.

Specifically, the camera microcomputer 205 transmits the command to enter slave-initiated P2P burst communication to the adaptor microcomputer 302, and notifies the adaptor microcomputer 302 of an end of transmission and a standby request for next data transmission by using the signal line CS. When receiving the command to enter slave-initiated P2P burst communication, the adaptor microcomputer 302 generates data to be transmitted by the slave-initiated P2P burst communication.

The camera microcomputer 205 completes preparations for the reception of slave-initiated P2P burst communication, and cancels the standby request for data transmission by using the signal line CS.

If the generation of the data to be transmitted is completed and the standby request from the camera microcomputer 205 is cancelled, the adaptor microcomputer 302 transmits a block of data having the block size of 16 bytes. The adaptor microcomputer 302 then suspends communication for the interblock wait time of 100 μs or more. The camera microcomputer 205 receives the one block of data, and performs processing for receiving the next one block of data within the interblock wait time of 100 μs.

The camera microcomputer 205 and the adaptor microcomputer 302 perform the foregoing processing for transferring one block of data until as many blocks as the number of blocks ahead of flow control, or four blocks, are transferred.

The adaptor microcomputer 302 completes transmitting as many blocks as the number of blocks ahead of flow control, and waits for flow control by the camera microcomputer 205.

The camera microcomputer 205 completes receiving as many blocks as the number of blocks ahead of flow control, and notifies the adaptor microcomputer 302 of suspension of reception and a standby request for next data transmission by using the signal line CS. The camera microcomputer 205 then completes preparations for the reception of slave-initiated P2P burst communication, and cancels the standby request for data transmission, which means cancellation of the flow control, by using the signal line CS.

The camera microcomputer 205 and the adaptor microcomputer 302 perform the foregoing flow control processing until as much data as the total size has been transferred.

The camera microcomputer 205 completes receiving as much data as the total size, and waits for a notification of an end of transmission and a standby request for next data transmission, given by the adaptor microcomputer 302 using the signal line CS.

The adaptor microcomputer 302 completes transmitting as much data as the total size, notifies the camera microcomputer 205 of the end of transmission and a standby request for next data transmission via the signal line CS, and then cancels the standby request for data transmission. This ends the slave-initiated P2P burst communication.

If not as much data as the total size is transferred from the adaptor microcomputer 302, the camera microcomputer 205 determines that a communication error has occurred due to reception timeout. The camera microcomputer 205 then make a retry from the transmission of a command to enter slave-initiated P2P burst communication ([4]) or the specification of the communication partner of P2P communication ([1]) by broadcast communication.

If the adaptor microcomputer 302 transmits data more than the total size notified in advance, the camera microcomputer 205 is unable to receive the data. If the camera microcomputer 205 waits for the notification of the end of transmission from the adaptor microcomputer 302 via the signal line CS and the wait time expires, the camera microcomputer 205 determines that a communication error has occurred. If the adaptor microcomputer 302 waits for the notification of the communication timing from the camera microcomputer 205 via the signal line CS and the wait time expires, the adaptor microcomputer 302 determines that a communication error has occurred. To recover from such errors related to the signal line CS, the camera microcomputer 205 desirably makes a retry from the specification of the communication partner of P2P communication ([1]) by broadcast communication, or by resetting the power supply.

<Slave-Initiated P2P Burst Communication Procedures>

Communication procedures in slave-initiated P2P burst communication will be described with reference to FIGS. 12 and 13. FIG. 12 is a flowchart for describing the communication procedure of the camera microcomputer 205, or communication master, in slave-initiated P2P burst communication.

In step S500, the camera microcomputer 205 performs data reception processing. The processing proceeds to step S501.

In step S501, the camera microcomputer 205 determines whether as much data as the total size has been received. If as much data has been received (YES in step S501), the processing proceeds to step S511. If not as much data has been received (NO in step S501), the processing proceeds to step S502.

In step S502, the camera microcomputer 205 determines whether the signal level of the signal line CS is Low. If the signal level is Low (YES in step S502), the processing ends. If the signal level is not Low (NO in step S502), the processing proceeds to step S503.

In step S503, the camera microcomputer 205 determines whether as much data as the block size has been received. If as much data has been received (YES in step S503), the processing proceeds to step S504. If not as much data has been received (NO in step S503), the processing proceeds to step S500.

In step S504, the camera microcomputer 205 determines whether as much data as the number of blocks ahead of flow control has been received. If as much data has been received (YES in step S504), the processing proceeds to step S507. If not as much data has been received (NO in step S504), the processing proceeds to step S505.

In step S505, the camera microcomputer 205 determines whether to perform processing other than communication. If processing other than communication is to be performed (YES in step S505), the processing proceeds to step S507. If no processing other than communication is to be performed (NO in step S505), the processing proceeds to step S506.

In step S506, the camera microcomputer 205 performs reception data processing for burst communication. The processing proceeds to step S500. The reception data processing is processing for saving received data to enable reception of the next block. This processing is desirably completed within the foregoing interblock wait time.

In step S507, the camera microcomputer 205 turns on (connects) the GND switch 2081 to start outputting Low to the signal line CS.

In step S508, the camera microcomputer 205 performs reception data processing similar to that performed in step S506.

In step S509, the camera microcomputer 205 performs the processing other than communication.

In step S510, the camera microcomputer 205 turns off (disconnects) the GND switch 2081 to stop outputting Low to the signal line CS.

In step S511, the camera microcomputer 205 determines whether the signal level of the signal line CS is Low. If the signal level is Low (YES in step S511), the processing ends. If the signal level is not Low (NO in step S511), the processing returns to step S511 and the camera microcomputer 205 repeats the determination.

Figure 13:
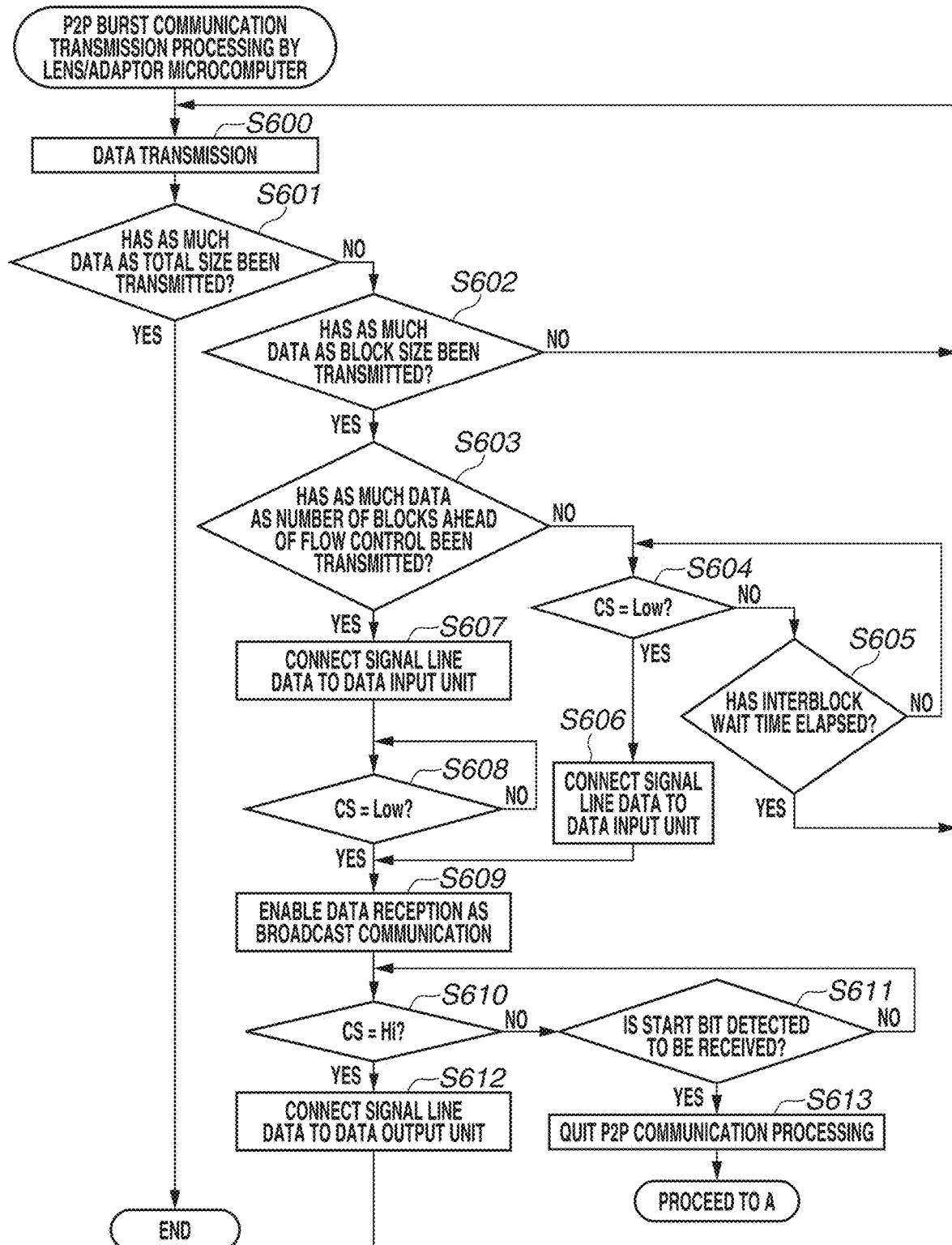
FIG. 13 is a flowchart for describing a communication procedure of a communication slave in slave-initiated P2P burst communication.

FIG. 13 is a flowchart for describing the communication procedure of the adaptor microcomputer 302, or communication slave, in slave-initiated P2P burst communication. Since the communication procedure of the lens microcomputer 111 is almost the same as that of the adaptor microcomputer 302, a description thereof will be omitted in the present exemplary embodiment.

In step S600, the adaptor microcomputer 302 starts data transmission.

In step S601, the adaptor microcomputer 302 determines whether as much data as the total size has been transmitted. If as much data has been transmitted (YES in step S601), the processing ends. If not as much data has been transmitted (NO in step S601), the processing proceeds to step S602.

In step S602, the adaptor microcomputer 302 determines whether as much data as the block size has been transmitted. If as much data has been transmitted (YES in step S602), the processing proceeds to step S603. If not as much data has been transmitted (NO in step S602), the processing proceeds to step S600.

In step S603, the adaptor microcomputer 302 determines whether as much data as the number of blocks ahead of flow control has been transmitted. If as much data has been transmitted (YES in step S603), the processing proceeds to step S607. If not as much data has been transmitted (NO in step S603), the processing proceeds to step S604.

In step S604, the adaptor microcomputer 302 determines whether the signal level of the signal line CS is Low. If the signal level is Low (YES in step S604), the processing proceeds to step S606. If the signal level is not Low (NO in step S604), the processing proceeds to step S605.

In step S605, the adaptor microcomputer 302 determines whether the interblock wait time has elapsed. If the interblock wait time has elapsed (YES in step S605), the processing proceeds to step S600. If the interblock wait time has not elapsed (NO in step S605), the processing proceeds to step S604.

In step S606, the adaptor microcomputer 302 operates the input/output selection switch 3032 to connect the signal line DATA to the data input unit of the adaptor microcomputer 302. The processing proceeds to step S609.

In step S607, the adaptor microcomputer 302 operates the input/output selection switch 3032 to connect the signal line DATA to the data input unit of the adaptor microcomputer 302.

In step S608, the adaptor microcomputer 302 determines whether the signal level of the signal line CS is Low. If the signal level is Low (YES in step S608), the processing proceeds to step S609. If the signal level is not Low (NO in step S608), the processing returns to step S608 and the adaptor microcomputer 302 repeats the determination.

In step S609, the adaptor microcomputer 302 enables data reception from the signal line DATA as broadcast communication.

In step S610, the adaptor microcomputer 302 determines whether the signal level of the signal line CS is Hi. If the signal level is Hi (YES in step S610), the processing proceeds to step S612. If the signal level is not Hi (NO in step S610), the processing proceeds to step S611.

In step S611, the adaptor microcomputer 302 determines whether the start bit ST is detected to be received from the signal line DATA. If the start bit ST is detected to be received (YES in step S611), the processing proceeds to step S613. If the start bit ST is not detected to be received (NO in step S611), the processing proceeds to step S610.

In step S612, the adaptor microcomputer 302 operates the input/output selection switch 3032 to connect the signal line DATA to the data output unit of the adaptor microcomputer 302.

In step S613, the adaptor microcomputer 302 quits P2P communication processing. The processing then proceeds to step S205 of FIG. 8 to perform broadcast communication.

An operation of the lens microcomputer 111 while the camera microcomputer 205 and the adaptor microcomputer 302 are performing P2P burst communication will now be described with reference to FIG. 8.

Suppose that the camera microcomputer 205 specifies the adaptor microcomputer 302 as the communication partner of P2P communication by using broadcast communication. In step S216, the lens microcomputer 111 determines that it is not specified as a slave (NO in step S216), and does not enter the P2P communication mode.

In the subsequent P2P communication and the subsequent P2P burst communication, the signal line DATA remains Hi when the signal line CS is Low. In step S202, the lens microcomputer 111 therefore does not determine that the start bit ST is received, and the processing goes through steps S200, S201, S202, S203, and S204 repeatedly. In other words, the camera microcomputer 205 and the adaptor microcomputer 302 can perform P2P burst communication without a problem despite the connection of a communication slave that is not the partner of the P2P burst communication like the lens microcomputer 111. Moreover, the processing of the lens microcomputer 111 does not include making a determination about P2P burst communication. The camera microcomputer 205 and the adaptor microcomputer 302 can thus perform P2P burst communication even if the connected lens microcomputer 111 that supports only the conventional broadcast communication and P2P communication.

As described above, in the present exemplary embodiment, the camera system that performs communication using two lines, e.g., the signal line CS and the signal line DATA, appropriately switches information to be transferred through the signal line CS in the broadcast communication mode and the P2P communication mode. Communications between the camera microcomputer 205 and the lens microcomputer 111 and between the camera microcomputer 205 and the adaptor microcomputer 302 can thus be implemented with a small number of signal lines. In addition, slave-initiated P2P burst communication different from P2P communication can be implemented with a small number of signal lines.

<Switching to Master-Initiated P2P Burst Communication Mode>

Switching of P2P burst communication between the camera microcomputer 205 and the adaptor microcomputer 302 and another example of the P2P burst communication will be described with reference to FIGS. 14 to 16.

Figure 14:
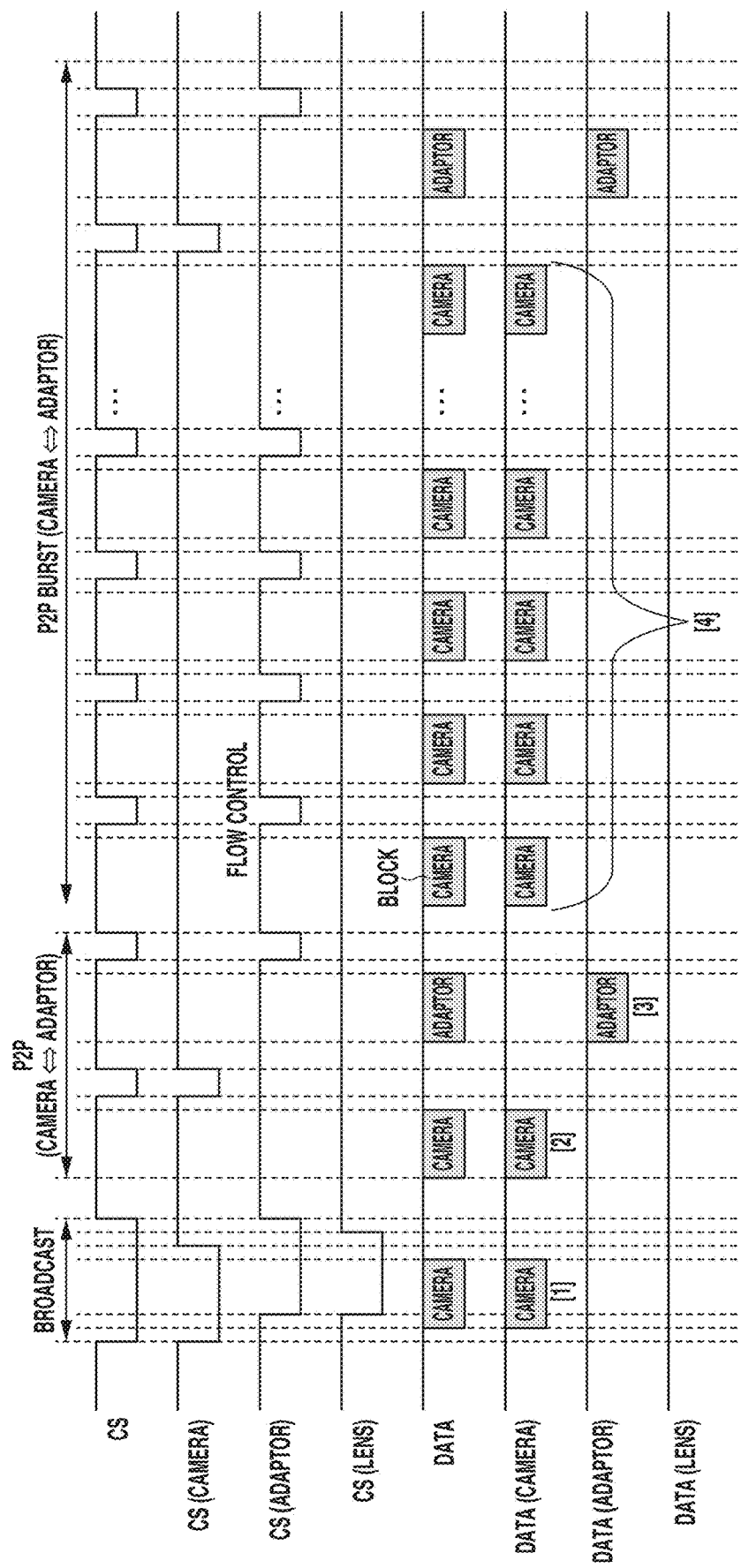
FIG. 14 is a diagram illustrating communication waveforms in master-initiated P2P burst communication.
Figure 15:
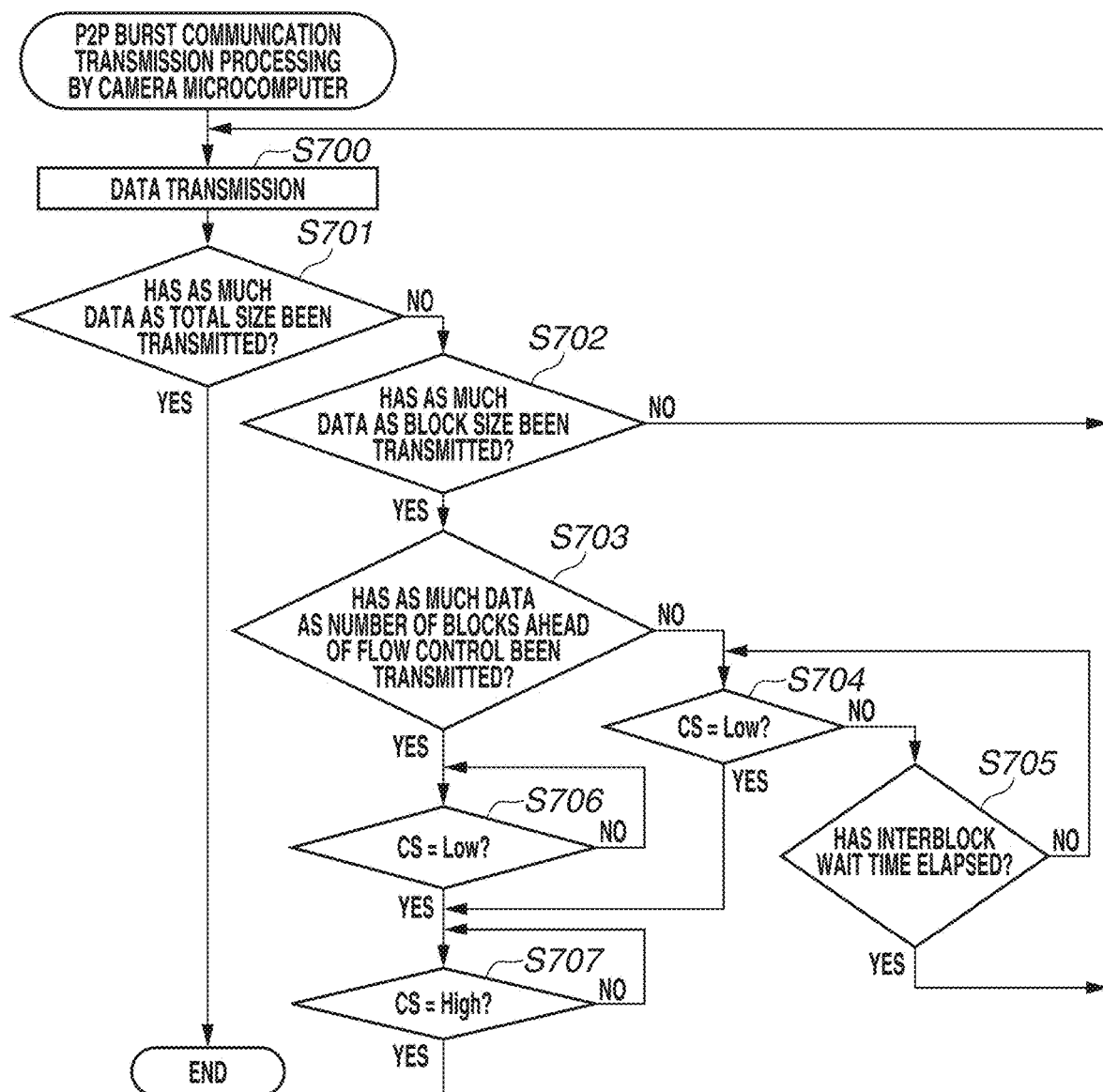
FIG. 15 is a flowchart for describing a communication procedure of the communication master in master-initiated P2P burst communication.

FIG. 14 is a diagram illustrating master-initiated P2P burst communication waveforms in transferring data from the camera microcomputer 205 to the adaptor microcomputer 302, i.e., in a reverse direction to that of FIG. 11. In the following description, the camera microcomputer 205 specifies the adaptor microcomputer 302 as the communication partner of P2P communication ([1]) by broadcast communication. The camera microcomputer 205 then transmits data ([2]) and the adaptor microcomputer 302 sends a reply ([3]) by P2P communication. The camera microcomputer 205 then transfers data ([4]) by master-initiated P2P burst communication, and the adaptor microcomputer 302 returns a result to the camera microcomputer 205 ([5]).

Since the processing for specifying the communication partner of P2P communication and the P2P communication are performed as described with reference to FIG. 6, a description thereof will be omitted. Burst communication information for use in master-initiated P2P burst communication to be performed afterward is shared by this P2P communication. The burst communication information for master-initiated P2P burst communication according to the present exemplary embodiment is similar to that for slave-initiated P2P burst communication. The burst communication information includes a block size, an interblock wait time, the number of blocks ahead of flow control, and a total size.

For example, the block size according to the present exemplary embodiment is the size of data that the adaptor microcomputer 302, or receiver of master-initiated P2P burst communication, can continuously receive. In the present exemplary embodiment, the block size is eight bytes.

The interblock wait time according to the present exemplary embodiment refers to a time from the completion of reception of a block to when the adaptor microcomputer 302, or receiver of master-initiated P2P burst communication, becomes ready to receive the next block. In the present exemplary embodiment, the interblock wait time is 150 µs. Note that in the present exemplary embodiment, the transmission of each block is always followed by flow control, and the interblock wait time is therefore not used.

The number of blocks ahead of flow control according to the present exemplary embodiment refers to an interval for the adaptor microcomputer 302, or receiver of the master-initiated P2P burst communication, to secure time for processing other than the master-initiated P2P burst communication. The number of blocks ahead of flow control is one. In other words, the transmission of one block is always followed by flow control.

The total size refers to the size of data for the camera microcomputer 205, or sender of master-initiated P2P burst communication, to transfer by the master-initiated P2P burst communication.

Next, the camera microcomputer 205 transfers data by master-initiated P2P burst communication, after the completion of which the adaptor microcomputer 302 sends a reply.

Specifically, the adaptor microcomputer 302 sends a reply to the P2P communication for sharing the burst communication information, and makes preparations for the reception of master-initiated P2P burst communication. After the reception preparations are completed, the adaptor microcomputer 302 cancels the standby request for data transmission by using the signal line CS.

After receiving the cancellation of the standby request from the adaptor microcomputer 302, the camera microcomputer 205 starts master-initiated P2P burst communication and initially transmits one block of data, i.e., as much as the block size of eight bytes. Since the number of blocks ahead of flow control is one, the camera microcomputer 205 waits for the flow control by the adaptor microcomputer 302 after the transmission of one block without waiting the interblock wait time.

The adaptor microcomputer 302 completes receiving one block of data, i.e., as much as the number of blocks ahead of flow control, and notifies the camera microcomputer 205 of suspension of reception and a standby request for next data transmission by using the signal line CS. The adaptor microcomputer 302 then completes preparations for the reception of master-initiated P2P burst communication, and cancels the standby request for data transmission, which means cancellation of the flow control, by using the signal line CS.

The camera microcomputer 205 and the adaptor microcomputer 302 perform the foregoing flow control processing until as much data as the total size has been transferred.

The adaptor microcomputer 302 completes receiving as much data as the total size, and waits for a notification made by the camera microcomputer 205 via the signal line CS of an end of transmission and a standby request for next data transmission.

The camera microcomputer 205 completes transmitting as much data as the total size, notifies the adaptor microcomputer 302 of the end of transmission and a standby request for next data transmission via the signal line CS, and then cancels the standby request for data transmission.

The adaptor microcomputer 302 receives the notification made by the camera microcomputer 205 via the signal line CS of the end of transmission and the cancellation of the standby request for next data transmission, and transmits a reception result of the master-initiated P2P burst communication. The adaptor microcomputer 302 then makes a notification of an end of transmission and a standby request for next data transmission by using the signal line CS, and cancels the standby request for next data transmission. This ends the master-initiated P2P burst communication.

<Procedures for Master-Initiated P2P Burst Communication>

Communication procedures for master-initiated P2P burst communication will be described with reference to FIGS. 15 and 16. FIG. 15 is a flowchart for describing a communication procedure of the camera microcomputer 205, or communication master, in master-initiated P2P burst communication.

In step S700, the camera microcomputer 205 starts data transmission.

In step S701, the camera microcomputer 205 determines whether as much data as the total size has been transmitted. If as much data has been transmitted (YES in step S701), the processing ends. If not as much data has been transmitted (NO in step S701), the processing proceeds to step S702.

In step S702, the camera microcomputer 205 determines whether as much data as the block size has been transmitted. If as much data has been transmitted (YES in step S702), the processing proceeds to step S703. If not as much data has been transmitted (NO in step S702), the processing proceeds to step S700.

In step S703, the camera microcomputer 205 determines whether as much data as the number of blocks ahead of flow control has been transmitted. If as much data has been transmitted (YES in step S703), the processing proceeds to step S706. If not as much data has been transmitted (NO in step S703), the processing proceeds to step S704.

In step S704, the camera microcomputer 205 determines whether the signal level of the signal line CS is Low. If the signal level is Low (YES in step S704), the processing proceeds to step S707. If the signal level is not Low (NO in step S704), the processing proceeds to step S705.

In step S705, the camera microcomputer 205 determines whether the interblock wait time has elapsed. If the interblock wait time has elapsed (YES in step S705), the processing proceeds to step S700. If the interblock wait time has not elapsed (NO in step S705), the processing proceeds to step S704.

In step S706, the camera microcomputer 205 determines whether the signal level of the signal line CS is Low. If the signal level is Low (YES in step S706), the processing proceeds to step S707. If the signal level is not Low (NO in step S706), the processing returns to step S706 and the camera microcomputer 205 repeats the determination.

In step S707, the camera microcomputer 205 determines whether the signal level of the signal line CS is Hi. If the signal level is Hi (YES in step S707), the processing proceeds to step S700. If the signal level is not Hi (NO in step S707), the processing returns to step S707 and the camera microcomputer 205 repeats the determination.

Figure 16:
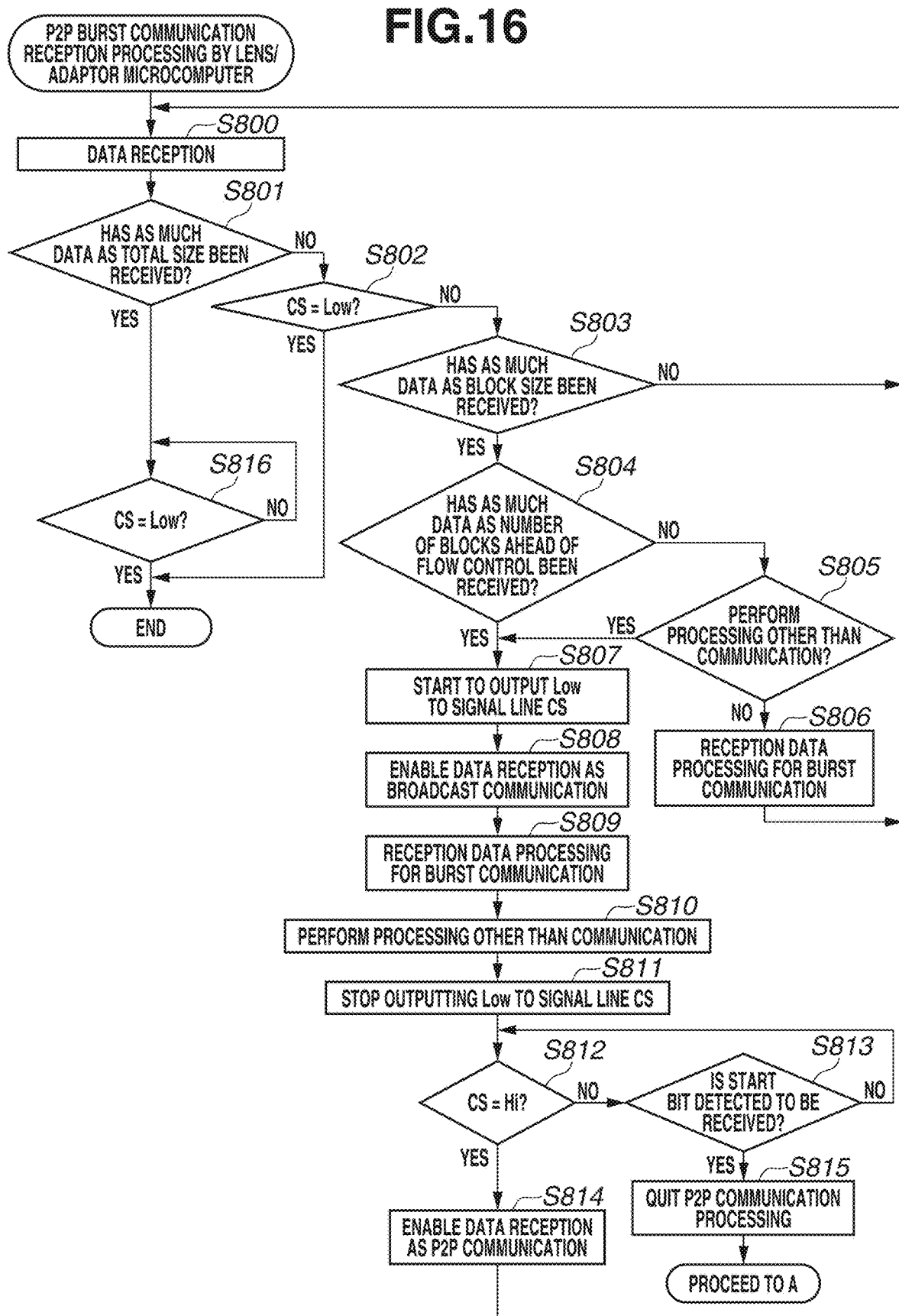
FIG. 16 is a flowchart for describing a communication procedure of a communication slave in master-initiated P2P burst communication.

FIG. 16 is a flowchart for describing the communication procedure of the adaptor microcomputer 302, or communication slave, in master-initiated P2P burst communication.

Details of the master-initiated P2P burst communication reception processing by the adaptor microcomputer 302 will now be described with reference to FIG. 16. Since the communication procedure of the lens microcomputer 111 is almost the same as that of the adaptor microcomputer 302, a description thereof will be omitted in the present exemplary embodiment.

In step S800, the adaptor microcomputer 302 performs data reception processing.

In step S801, the adaptor microcomputer 302 determines whether as much data as the total size has been received. If as much data has been received (YES in step S801), the processing proceeds to step S816. If not as much data has been received (NO in step S801), the processing proceeds to step S802.

In step S802, the adaptor microcomputer 302 determines whether the signal level of the signal line CS is Low. If the signal level is Low (YES in step S802), the processing ends. If the signal level is not Low (NO in step S802), the processing proceeds to step S803.

In step S803, the adaptor microcomputer 302 determines whether as much data as the block size has been received. If as much data has been received (YES in step S803), the processing proceeds to step S804. If not as much data has been received (NO in step S803), the processing proceeds to step S800.

In step S804, the adaptor microcomputer 302 determines whether as much data as the number of blocks ahead of flow control has been received. If as much data has been received (YES in step S804), the processing proceeds to step S807. If not as much data has been received (NO in step S804), the processing proceeds to step S805.

In step S805, the adaptor microcomputer 302 determines whether to perform processing other than communication. If processing other than communication is to be performed (YES in step S805), the processing proceeds to step S807. If no processing other than communication is to be performed (NO in step S805), the processing proceeds to step S806.

In step S806, the adaptor microcomputer 302 performs reception data processing for burst communication. The processing proceeds to step S800. This reception data processing is processing for saving the received data to enable reception of the next block. The reception data processing is desirably completed within the foregoing interblock wait time.

In step S807, the adaptor microcomputer 302 turns on (connects) the GND switch 2081 to start outputting Low to the signal line CS.

In step S808, the adaptor microcomputer 302 enables data reception from the signal line DATA as broadcast communication.

In step S809, the adaptor microcomputer 302 performs reception data processing similar to that of step S806.

In step S810, the adaptor microcomputer 302 performs the processing other than communication.

In step S811, the adaptor microcomputer 302 turns off (disconnects) the GND switch 2081 to stop outputting Low to the signal line CS.

In step S812, the adaptor microcomputer 302 determines whether the signal level of the signal line CS is Hi. If the signal level is Hi (YES in step S812), the processing proceeds to step S814. If the signal level is not Hi (NO in step S812), the processing proceeds to step S813.

In step S813, the adaptor microcomputer 302 determines whether the start bit ST is detected to be received from the signal line DATA. If the start bit ST is detected to be received (YES in step S813), the processing proceeds to step S815. If the start bit ST is not detected to be received (NO in step S813), the processing proceeds to step S812.

In step S814, the adaptor microcomputer 302 enables data reception from the signal line DATA as P2P communication.

In step S815, the adaptor microcomputer 302 quits the P2P communication processing. The processing then proceeds to step S205 of FIG. 8 to perform broadcast communication.

An operation of the lens microcomputer 111 while the camera microcomputer 205 and the adaptor microcomputer 302 are performing master-initiated P2P burst communication is similar to that performed during slave-initiated P2P burst communication. A description thereof will thus be omitted.

As described above, in the present exemplary embodiment, the camera system that performs communication using two lines, namely, the signal lines CS and DATA can implement master-initiated P2P burst communication with a small number of signal lines.

As illustrated in FIG. 14, processing using only the flow control via the signal line CS without the interblock wait time may be employed. In such a case, flow control can be performed each time the receiver has received as much data as the reception buffer size by specifying the number of blocks ahead of flow control to be one. This enables P2P burst communication using flow control even if the processing time of the processing for the receiver to save the reception data can vary from some reason, i.e., if the interblock wait time is not definable.

Alternatively, communication using only the interblock wait time-based control without flow control may be employed. For example, communication not using flow control can be implemented by specifying the number of blocks ahead of flow control to be zero. In such a case, the determination whether as much data as the number of blocks ahead of flow control has been communicated can always be negative at the conditional branches in step S504 of FIG. 12, step S603 of FIG. 13, step S703 of FIG. 15, and step S804 of FIG. 16.

Figure 12:
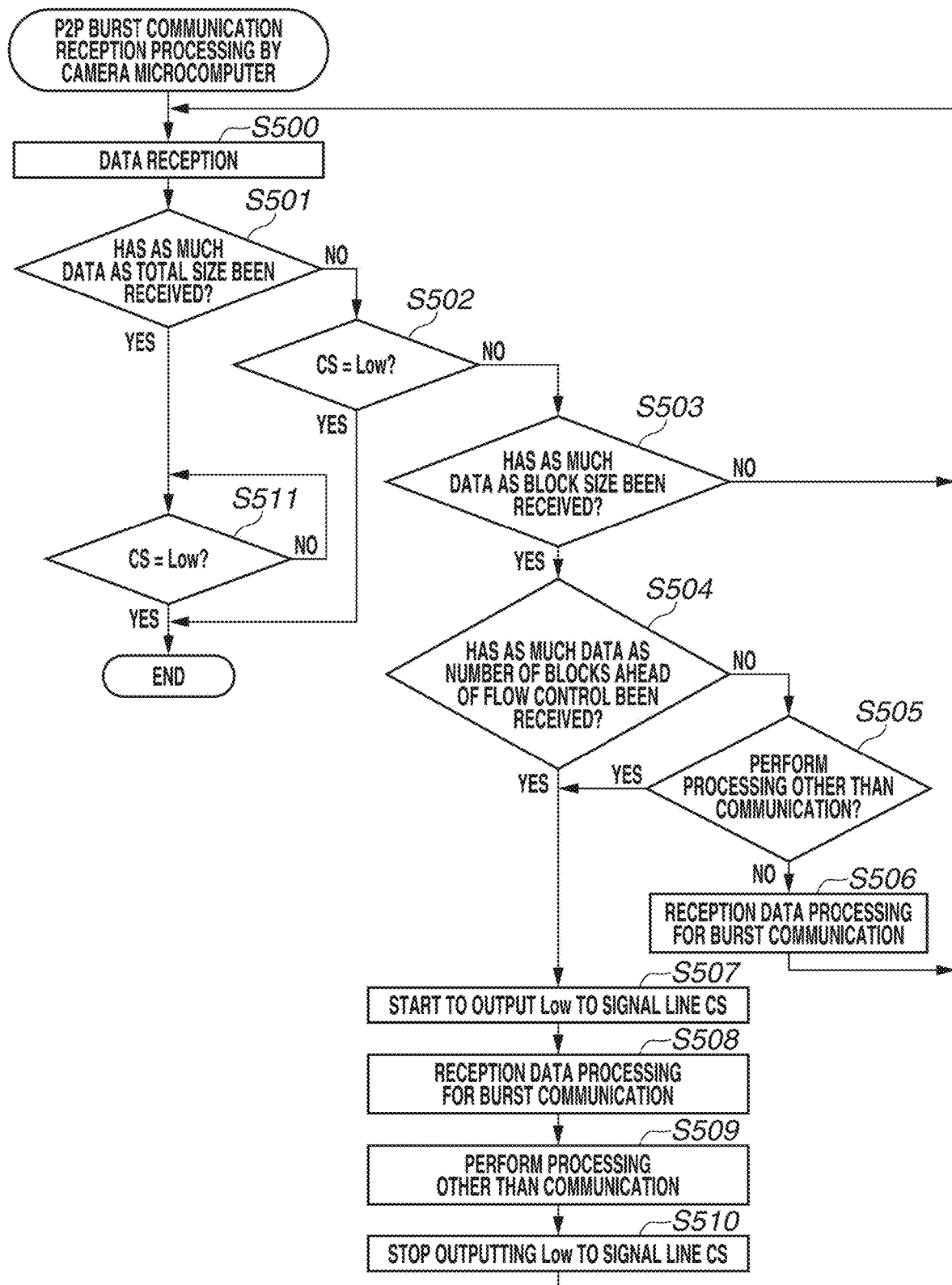
FIG. 12 is a flowchart for describing a communication procedure of the communication master in slave-initiated P2P burst communication.

Moreover, if processing other than communication is determined to be performed as illustrated in step S505 of FIG. 12 and step S805 of FIG. 16, the signal line CS is set to Low at the timing of the processing based on the interblock wait time. If the Low state of the signal line CS is detected in the processing for waiting the interblock wait time as illustrated in step S604 of FIG. 13 and the step S704 of FIG. 15, the sender of the P2P burst communication enters the processing for flow control using the signal line CS. In such a manner, flow control can be performed to secure time for the processing other than communication, if processing other than communication is determined to be performed at the timing of the interblock wait time-based processing.

In the present exemplary embodiment, the communication slave in P2P communication mode waits for the reception of broadcast communication while receiving a control signal indicating a standby request after data transmission, i.e., while the signal level of the signal line CS is Low. Specifically, as described in steps S404 and S415 of FIG. 10A, step S609 of FIG. 13, and step S808 of FIG. 16, the communication slave enables data reception from the signal line DATA as broadcast communication. As described in steps S407 and S418 of FIG. 10B, step S611 of FIG. 13, and step S813 of FIG. 16, the communication slave then determines whether data is received while data reception is enabled. If data is received, the communication slave can quit the P2P communication processing and enter the broadcast communication mode as described in step S420 of FIG. 10B, step S613 of FIG. 13, and step S815 of FIG. 16.

The camera microcomputer 205 can sometimes detect a discrepancy in the recognition of communication timing with the adaptor microcomputer 302 and the lens microcomputer 111 due to, for example, communication noise. In such a case, the camera microcomputer 205 can retry communication by using broadcast communication even in the process of P2P burst communication by the foregoing processing.

Figure 17:
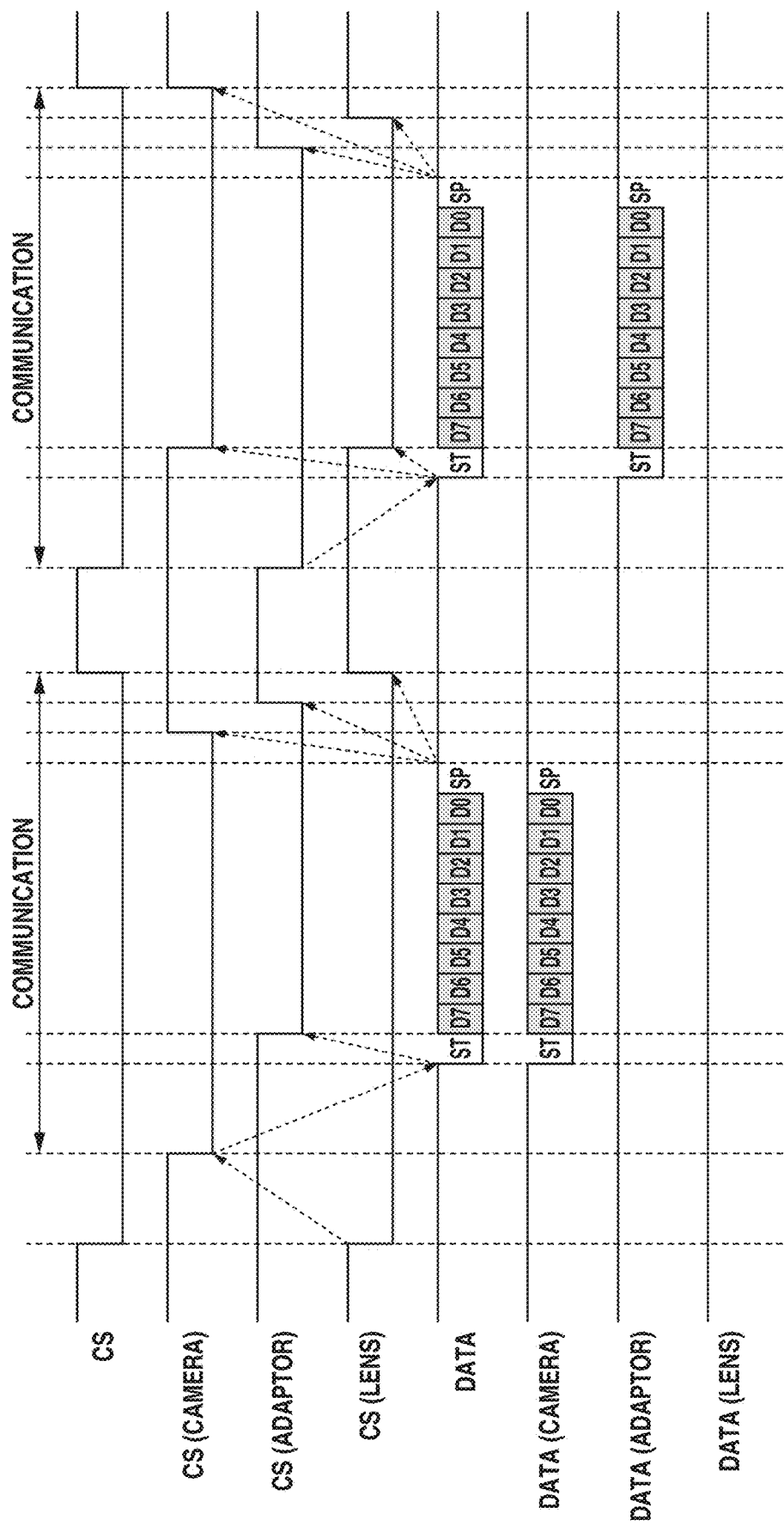
FIG. 17 is a diagram illustrating communication waveforms in broadcast communication.

Situations where the lens microcomputer 111 and the adaptor microcomputer 302, or communication slaves, start broadcast communication will now be described with reference to FIG. 17. FIG. 17 is a diagram illustrating signal waveforms in broadcast communication. That a communication slave starts broadcast communication will be referred to as a communication request. With broadcast communication from the camera microcomputer 205 to the communication slaves suspended, a communication request refers to that a communication slave resumes the broadcast communication on its own initiative. With communication from the camera microcomputer 205 to a communication slave suspended, a communication request to the camera microcomputer 205 is made when the communication slave resumes the communication with the camera microcomputer 205 on its own initiative. As an example, a case where the lens microcomputer 111 makes a notification of a start of broadcast communication, the camera microcomputer 205 performs broadcast communication, and the adaptor microcomputer 302 performs broadcast communication in response will be described.

Initially, the lens microcomputer 111 starts to output Low to the signal line CS to notify the camera microcomputer 205 and the adaptor microcomputer 302 of a start of broadcast communication. Next, the camera microcomputer 205 detects that the signal level of the signal line CS becomes Low, and starts to output Low to the signal line CS. At this point in time, the signal level of the signal CS remains unchanged since the lens microcomputer 111 has already started outputting Low to the signal line CS.

Next, the camera microcomputer 205 outputs data to be transmitted to the signal line DATA. Meanwhile, the adaptor microcomputer 302 starts to output Low to the signal ling CS at timing when the start bit ST input from the signal line DATA is detected. At this point in time, the signal level of the signal line CS remains unchanged since the camera microcomputer 205 has already started outputting Low to the signal line CS.

The camera microcomputer 205 completes outputting the data up to the stop bit SP, and stops outputting Low to the signal line CS. The lens microcomputer 111 and the adaptor microcomputer 302 receive the data input from the signal line DATA up to the stop bit SP, and then analyze the received data and perform internal processing linked with the received data. The lens microcomputer 111 and the adaptor microcomputer 302 then make preparations to receive next data, and stop outputting Low to the signal line CS. As described above, the signal level of the signal line CS becomes Hi when the camera microcomputer 205, the lens microcomputer 111, and the adaptor microcomputer 302 all stop outputting Low to the signal line CS. By checking that the signal level of the signal line CS is Hi, all the microcomputers can determine that the processing related to the current communication has been ended and preparations for next communication have been made.

After checking that the signal level of the signal line CS is restored to Hi, the adaptor microcomputer 302 starts to output Low to the signal line CS to notify the camera microcomputer 205 and the lens microcomputer 111 of a start of broadcast communication. The adaptor microcomputer 302 then outputs data to be transmitted to the signal line DATA. Meanwhile, the camera microcomputer 205 and the lens microcomputer 111 start to output Low to the signal line CS at timing when the start bit ST input from the signal line DATA is detected. At this point in time, the signal level of the signal line CS remains unchanged since the adaptor microcomputer 302 has already started outputting Low to the signal line CS.

The adaptor microcomputer 302 finishes outputting the data up to the stop bit SP, and then stops outputting Low to the signal line CS. Meanwhile, the camera microcomputer 205 and the lens microcomputer 111 receive the data input from the signal line DATA up to the stop bit SP, and then analyze the received data and perform internal processing linked with the received data. The camera microcomputer 205 and the lens microcomputer 111 then make preparations to receive next data, and stop outputting Low to the signal line CS.

Note that the lens microcomputer 111 and the adaptor microcomputer 302, or communication slaves, start broadcast communication only if the camera microcomputer 205, the lens microcomputer 111, and the adaptor microcomputer 302 are all in the broadcast communication mode.

If broadcast communication is started by a communication slave, the camera microcomputer 205, or communication master, is unable to determine which has turned the signal line CS to Low, the lens microcomputer 111 or the adaptor microcomputer 302. The camera microcomputer 205 therefore desirably performs communication with both the lens microcomputer 111 and the adaptor microcomputer 302 to obtain information about whether they have started the broadcast communication.

The timing at which the camera microcomputer 205 outputs Low to the signal line CS to start broadcast communication and the timing at which a communication slave outputs Low to the signal line CS to start broadcast communication can sometimes coincide. In such a case, the camera microcomputer 205 is unable to detect that the communication slave has output Low to the signal line CS. The camera microcomputer 205 can therefore be configured to issue a permission notification for permitting the communication slaves to start broadcast communication.

As described above, in the present exemplary embodiment, a communication slave in the camera system that performs communication using two lines, i.e., the signal lines CS and DATA can start the broadcast communication mode. This eliminates the need for the camera microcomputer 205 to continue communicating with the lens microcomputer 111 and the adaptor microcomputer 302 all the time. Useless communication can thus be inhibited to reduce communication traffic.

The burst communication information according to the present exemplary embodiment is described to include the block size, the interblock wait time, the number of blocks ahead of flow control, and the total size. However, this is not restrictive.

The interblock wait time and the number of blocks ahead of flow control do not need to be shared if the employed communication protocol involves processing using only the flow control via the signal line CS without the interblock wait time. Similarly, the number of blocks ahead of flow control does not need to be shared if only the interblock wait time-based control is used without flow control.

The foregoing values do not need to be directly shared, as long as values equivalent to such parameters can be shared among the microcomputers. For example, the number of bytes ahead of flow control can be shared instead of the number of blocks ahead of flow control, in which case the number of blocks ahead of flow control can be calculated based on the block size. Similarly, the total number of blocks can be shared instead of the total size, in which case a value equivalent to the total size can be calculated based on the block size. The burst communication information may be shared in terms of function-indicating identifiers (IDs) or communication generations.

Other information may be added to the burst communication information. For example, communication settings, such as the communication rate of P2P burst communication and the presence or absence of parity check, may be additionally shared. Parameters for identifying data to be transmitted by P2P burst communication, such as values for identifying the type of interchangeable lens 100 and the type of camera main body 200 and commands linked with obtained data, may be added. Parameters for checking communication reliability of data transmitted by P2P burst communication, such as a check sum, a cyclic redundancy check (CRC), and a hash value, may be shared in advance.

The burst communication information according to the present exemplary embodiment is described to be shared by P2P communication before P2P burst communication. However, this is not restrictive. For example, such information may defined as a communication protocol in advance. The camera microcomputer 205 may also notify the adaptor microcomputer 302 of the information by broadcast communication. The information may be shared by using other communication lines.

Effects of First Exemplary Embodiment

Suppose, for example, that the camera main body 200 and the accessory apparatuses transmit and receive optical information at the startup of the camera system. In such a case, processing other than the transmission and reception processing is also performed in parallel during startup. Examples include communication processing with the interchangeable lens 100 through another communication path to be described below, initialization processing on actuators of the accessory apparatuses, and startup processing for various members of the camera main body 200. Since the transmission and reception processing and various other types of processing are performed in parallel and their processing times affect the startup time, a greater amount of data is desirably obtained in a shorter time.

In transferring an enormous amount of data in a collective manner, the receiver desirably controls its reception buffer to not overflow. For example, if the camera main body 200 receives an enormous amount of data by using the first communication method or the second communication method, the camera main body 200 can request data in units of a size receivable in one session of reception processing. This gives rise to an issue of increased transfer time due to repetition of the data request and the reception processing.

By contrast, the third communication method according to the present exemplary embodiment is configured such that data is received from the accessory apparatuses by unidirectional communication using an interblock wait and flow control. A greater amount of data can thereby be obtained in a shorter time.

A second exemplary embodiment of the present invention will be described in detail below with reference to the drawings. A difference from the first exemplary embodiment is that flow control is performed by using the signal line DATA, not the signal line CS. In the drawings, similar members are designated by the same reference numerals, and a redundant description will be omitted. A description of components similar to those of the first exemplary embodiment will also be omitted.

Figure 18:
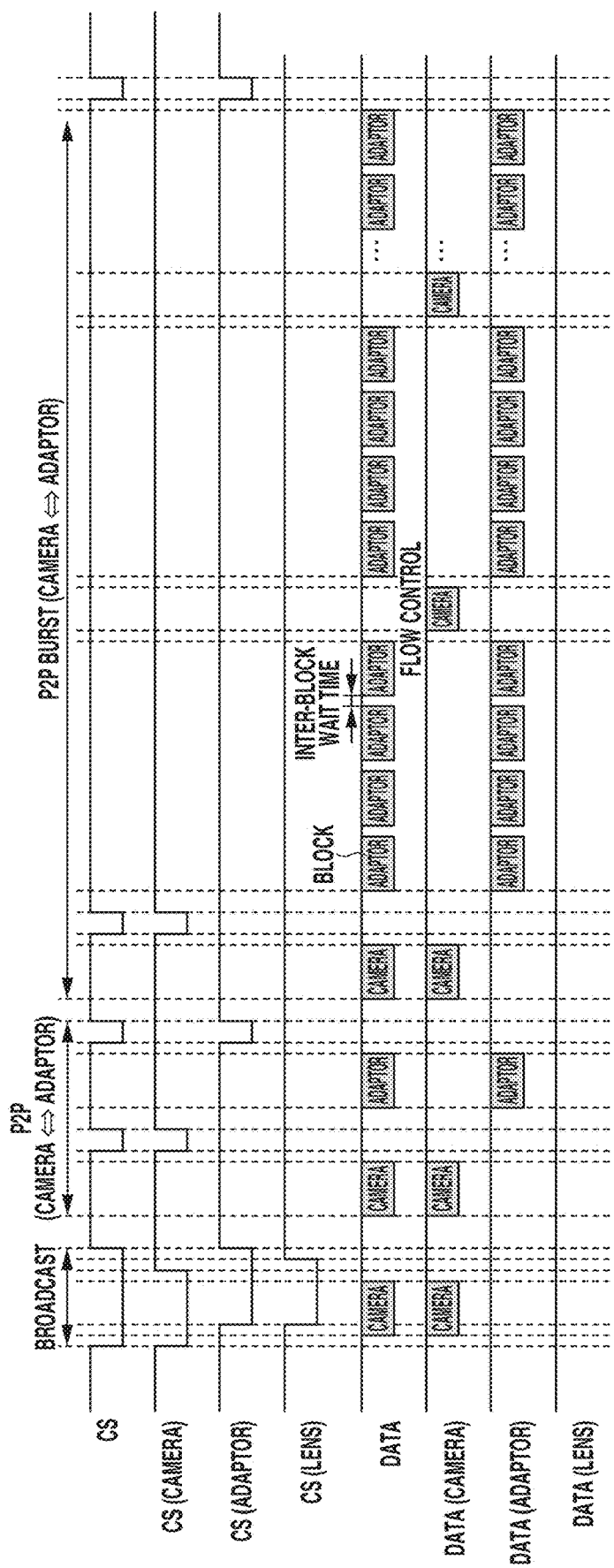
FIG. 18 is a diagram illustrating communication waveforms in slave-initiated P2P burst communication.

FIG. 18 is a diagram illustrating communication waveforms in slave-initiated P2P burst communication where the adaptor microcomputer 302 transfers data to the camera microcomputer 205. Unlike FIG. 11 of the first exemplary embodiment where the flow control is performed by using the signal line CS, the flow control in the present exemplary embodiment is performed by using the signal line DATA.

Suppose that the camera microcomputer 205 outputs two bytes of value to the signal line DATA for flow control, with the first byte corresponding to a fall of the signal line CS in the first exemplary embodiment and the second byte a rise of the signal line CS.

Figure 19:
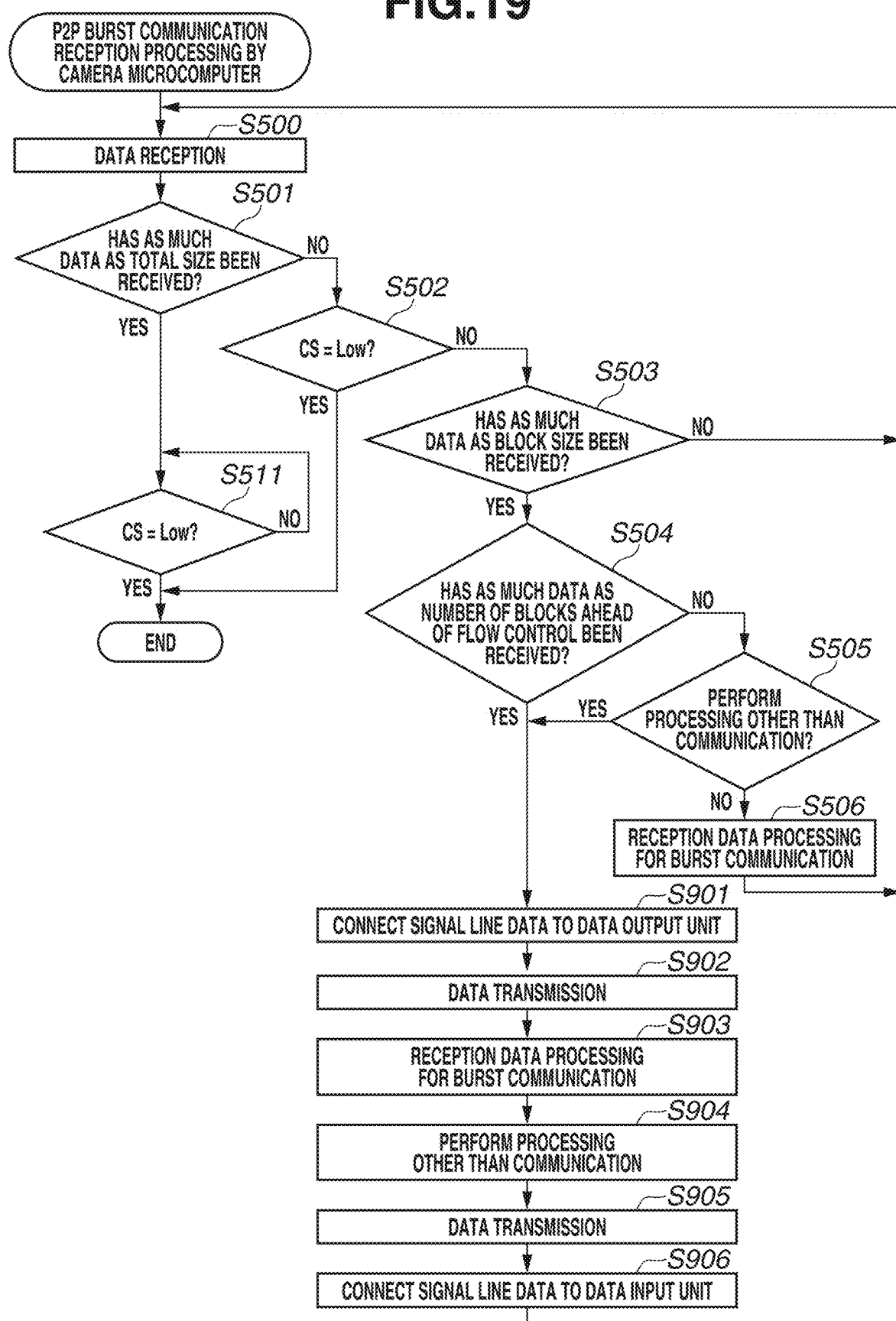
FIG. 19 is a flowchart for describing a communication procedure of the communication master in slave-initiated P2P burst communication.

Next, details of slave-initiated P2P burst communication reception processing by the camera microcomputer 205 will be described with reference to FIG. 19. Processes similar to those of FIG. 12 according to the first exemplary embodiment are designated by the same step numbers, and a description thereof will be omitted.

In step S901, the camera microcomputer 205 operates the input/output selection switch 2082 to connect the signal line DATA to the data output unit of the camera microcomputer 205.

In step S902, the camera microcomputer 205 outputs one byte of data.

In step S903, the camera microcomputer 205 performs reception data processing similar to that of step S506 in FIG. 12.

In step S904, the camera microcomputer 205 performs processing other than communication similar to that of step S509 in FIG. 12.

In step S905, the camera microcomputer 205 transmits one byte of data.

In step S906, the camera microcomputer 205 operates the input/output selection switch 2082 to connect the signal line DATA to the data input unit of the camera microcomputer 205.

Figure 20:
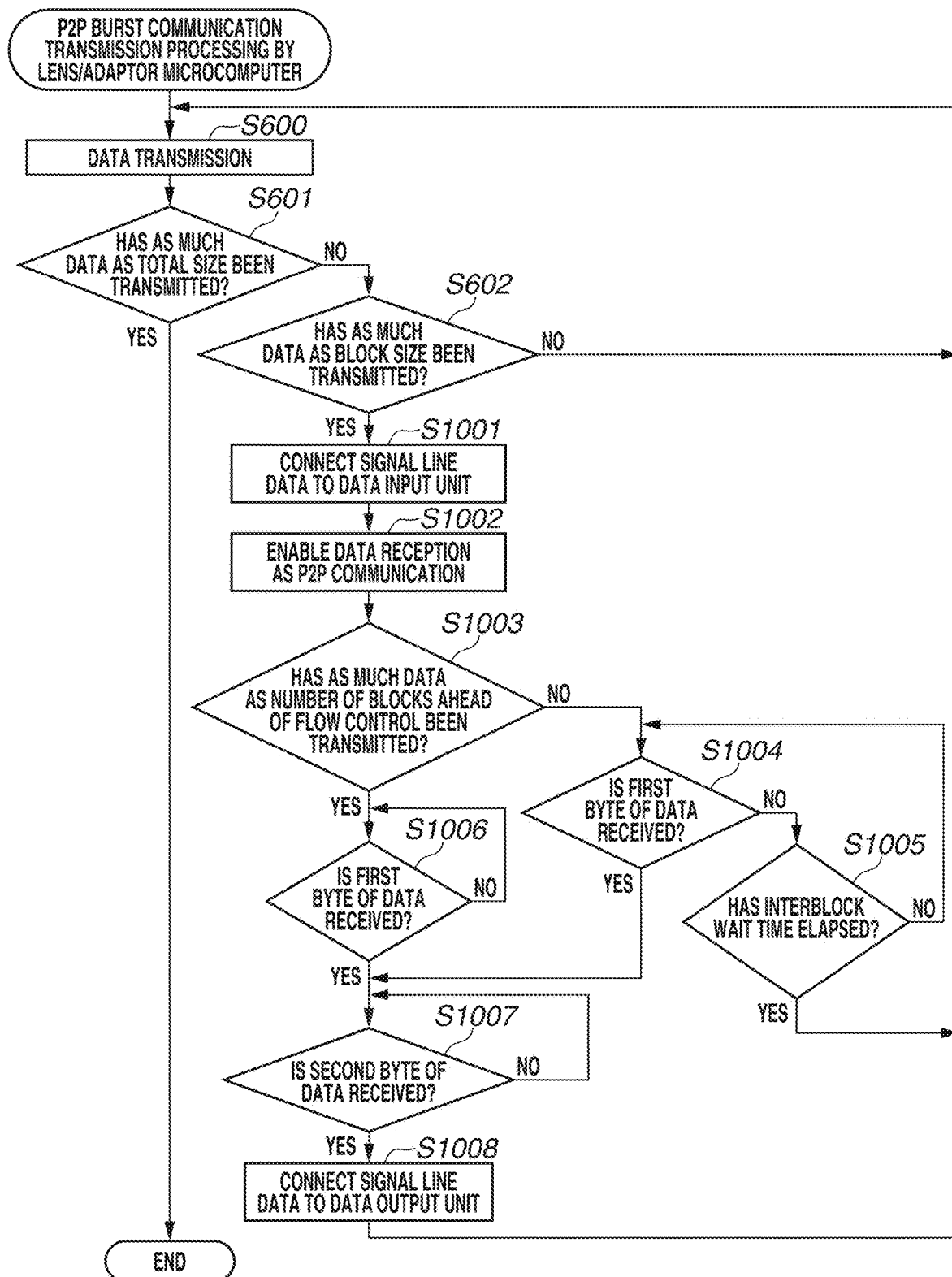
FIG. 20 is a flowchart for describing a communication procedure of a communication slave in slave-initiated P2P burst communication.

Next, details of slave-initiated P2P burst communication transmission processing by the adaptor microcomputer 302 will be described with reference to FIG. 20. Processes similar to those of FIG. 13 according to the first exemplary embodiment are designated by the same step numbers, and a description thereof will be omitted.

In step S1001, the adaptor microcomputer 302 operates the input/output selection switch 3032 to connect the signal line DATA to the data input unit of the adaptor microcomputer 302.

In step S1002, the adaptor microcomputer 302 enables data reception from the signal line DATA as P2P communication.

In step S1003, the adaptor microcomputer 302 determines whether as much data as the number of blocks ahead of flow control has been transmitted. If as much data has been transmitted (YES in step S1003), the processing proceeds to step S1006. If not as much data has been transmitted (NO in step S1003), the processing proceeds to step S1004.

In step S1004, the adaptor microcomputer 302 determines whether the first byte of data has been received. If the first byte of data has been received (YES in step S1004), the processing proceeds to step S1007. If the first byte of data has not been received (NO in step S1004), the processing proceeds to step S1005.

In step S1005, the adaptor microcomputer 302 determines whether the interblock wait time has elapsed. If the interblock wait time has elapsed (YES in step S1005), the processing proceeds to step S600. If the interblock wait time has not elapsed (NO in step S1005), the processing proceeds to step S1004.

In step S1006, similarly to step S1004, the adaptor microcomputer 302 determines whether the first byte of data has been received. If the first byte of data has been received (YES in step S1006), the processing proceeds to step S1007. If the first byte of data has not been received (NO in step S1006), the processing returns to step S1006 and the adaptor microcomputer 302 repeats the determination.

In step S1007, the adaptor microcomputer 302 determines whether the second byte of data has been received. If the second byte of data has been received (YES in step S1007), the processing proceeds to step S1008. If the second byte of data has not been received (NO in step S1007), the processing returns to step S1007 and the adaptor microcomputer 302 repeats the determination.

In step S1008, the adaptor microcomputer 302 operates the input/output selection switch 3032 to connect the signal line DATA to the data output unit of the adaptor microcomputer 302.

As described above, in the present exemplary embodiment, the flow control can be performed by using the signal line DATA in slave-initiated P2P burst communication.

As described in the first exemplary embodiment, the notification using the signal line CS also reaches the communication slave that is not the communication partner of P2P burst communication, like the lens microcomputer 111, and can affect operation. By contrast, in the present exemplary embodiment, P2P burst communication is performed without turning the signal line CS to Low. P2P burst communication can thus be performed without affecting the communication slave that is not the communication partner of the P2P burst communication, like the lens microcomputer 111.

Note that since the camera microcomputer 205 and the adaptor microcomputer 302 switch and use the output of the signal line DATA without the intervention of a notification using the signal line CS, the outputs to the signal line DATA are desirably prevented from conflicting with each other. Specifically, the adaptor microcomputer 302 desirably connects the signal line DATA to its data input unit in step S1001 of FIG. 20 before the camera microcomputer 205 connects the signal line DATA to its data output unit in step S901 of FIG. 19. Similarly, the camera microcomputer 205 desirably connects the signal line DATA to its data input unit in step S906 of FIG. 19 before the adaptor microcomputer 302 connects the signal line DATA to its data output unit in step S1008 of FIG. 20. In step S901 of FIG. 19 and step S1008 of FIG. 20, the processing for connecting the signal line DATA to the respective data output units are therefore desirably performed after waiting for a certain amount of time.

In the present exemplary embodiment, two bytes of data is described to be transmitted through the signal line DATA as flow control. However, this is not restrictive. The flow control can be performed by setting the signal line DATA to Low and then to Hi as with the signal line CS of the first exemplary embodiment.

Moreover, the flow control performed by using two bytes of data may be shortened to one byte in a case where the execution of processing other than communication does not desirably be taken into account at the timing of the interblock wait time-based processing. This case corresponds to a case where no determination is made by step S505 of FIG. 19. Specifically, since the conditional branch processing of step S1004 in FIG. 20 is not needed, the adaptor microcomputer 302, or sender of P2P burst communication, determines whether one byte of data has been received as a common process combining steps S1006 and S1007. In such a case, the camera microcomputer 205, or receiver, can omit step S902 as well as the determination in step S505 of FIG. 19.

The flow control using the signal line DATA is also similarly performed in master-initiated P2P burst communication. A description thereof will thus be omitted.

A third exemplary embodiment describes a procedure for receiving data from an accessory apparatus by using P2P burst communication (third communication method). Communication via the signal lines CS and DATA will be referred to as first communication. The present exemplary embodiment further includes a configuration for second communication. In the drawings, similar members are designated by the same reference numerals, and a redundant description will be omitted. A description of components similar to those of the first and second exemplary embodiments will also be omitted.

<Second Communication (FIGS. 23A and 23B)>

The second communication will be described with reference to FIGS. 23A and 23B. The second communication is a communication channel intended mainly for communication between the camera main body 200 and the interchangeable lens 100.

Figures 23A, 23B:
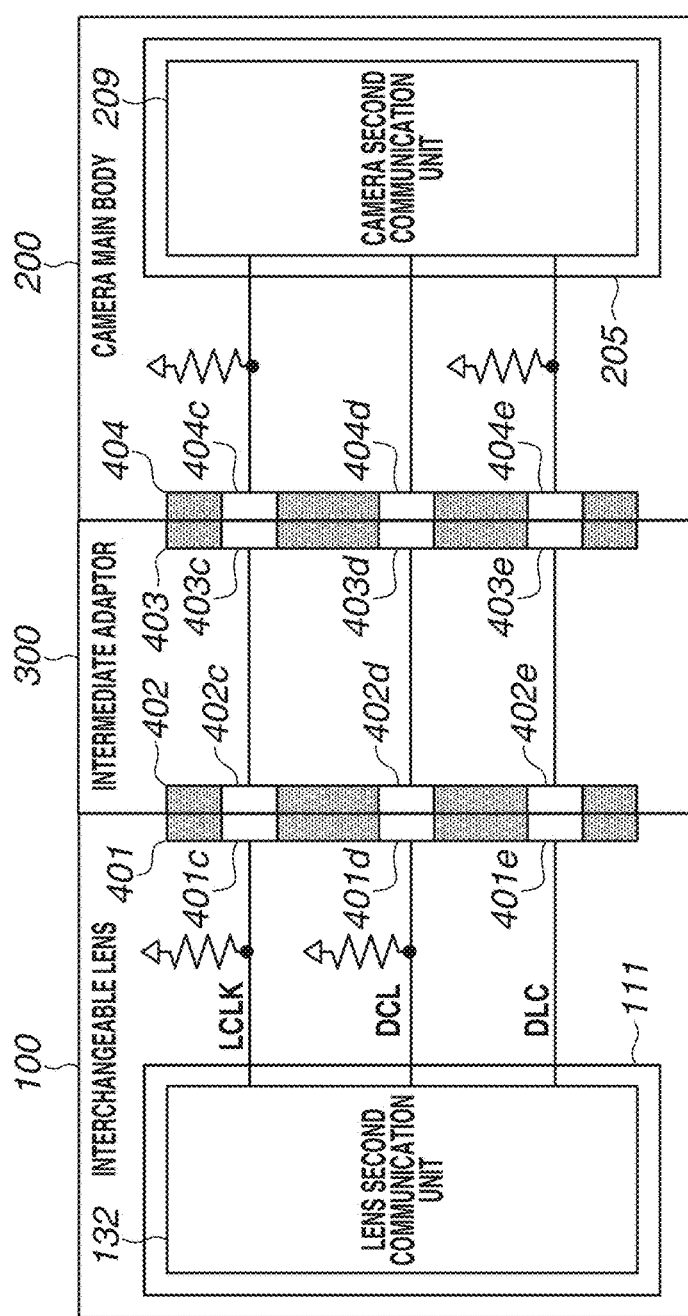
FIG. 23A is a conceptual diagram of second communication.
FIG. 23B is a diagram illustrating communication waveforms thereof.

FIG. 23A illustrates a configuration for performing the second communication. In the present exemplary embodiment, clock synchronous communication is performed as the second communication, whereas asynchronous communication may be performed instead. The mounts 401, 402, 403, and 404 respectively include LCLK terminals 401c, 402c, 403c, and 404c that are terminals of a clock line LCLK output from the camera second communication unit 209. In the present exemplary embodiment, the mounts 401, 402, 403, and 404 also include DCL terminals 401d, 402d, 403d, and 404d that are terminals of a data line DCL output from the camera second communication unit 209 in clock synchronous communication. The mounts 401, 402, 403, and 404 also include second communication DLC terminals 401e, 402e, 403e, and 404e that are terminals of a data line DLC output from the lens second communication unit 132 in clock synchronous communication.

As illustrated in FIG. 23A, the clock line LCLK and the data line DCL are pulled up in the interchangeable lens 100. The clock line LCLK and the data line DLC are pulled up in the camera main body 200.

The terminals 402c, 402d, and 402e and the terminals 403c, 403d, and 403e of the clock line LCLK, the data line DCL, and the data line DLC are respectively short-circuited inside the intermediate adaptor 300.

FIG. 23B illustrates waveforms of the clock line LCLK, the data line DCL, and the data line DLC during the second communication. The camera second communication unit 209 outputs a clock to the clock line LCLK, and outputs eight bits of data B7 to B0 to the data line DCL in synchronization with rising signals on the clock link LCLK. Similarly, the lens second communication unit 132 outputs eight bits of data B7 to B0 to the data line DLC in synchronization with the rising signals on the clock line LCLK. Moreover, the camera second communication unit 209 receives the eight bits of data B7 to B0 on the data line DLC in synchronization with rising signals on the clock line LCLK. Similarly, the lens second communication unit 132 receives the eight bits of data B7 to B0 on the data line DLC in synchronization with rising signals on the clock line LCLK. In such a manner, the camera second communication unit 209 and the lens second communication unit 132 can exchange communication data with each other. After receiving the eight bits of data B7 to B0 on the data line DCL, the lens second communication unit 132 outputs Low to the clock line LCLK for time Tbusy, and then stops outputting Low. The interchangeable lens 100 processes the received data during time Tbusy. The camera second communication unit 209 is configured to not transmit data until the clock line LCLK changes Low to Hi after data transmission. Flow control in the second communication can be performed by such a signal control. The foregoing processing can be repeated to transmit data between the camera second communication unit 209 and the lens second communication unit 132 by the second communication.

<Initial Communication and Data Communication by Third Communication Method (FIG. 24)>

Figure 24:
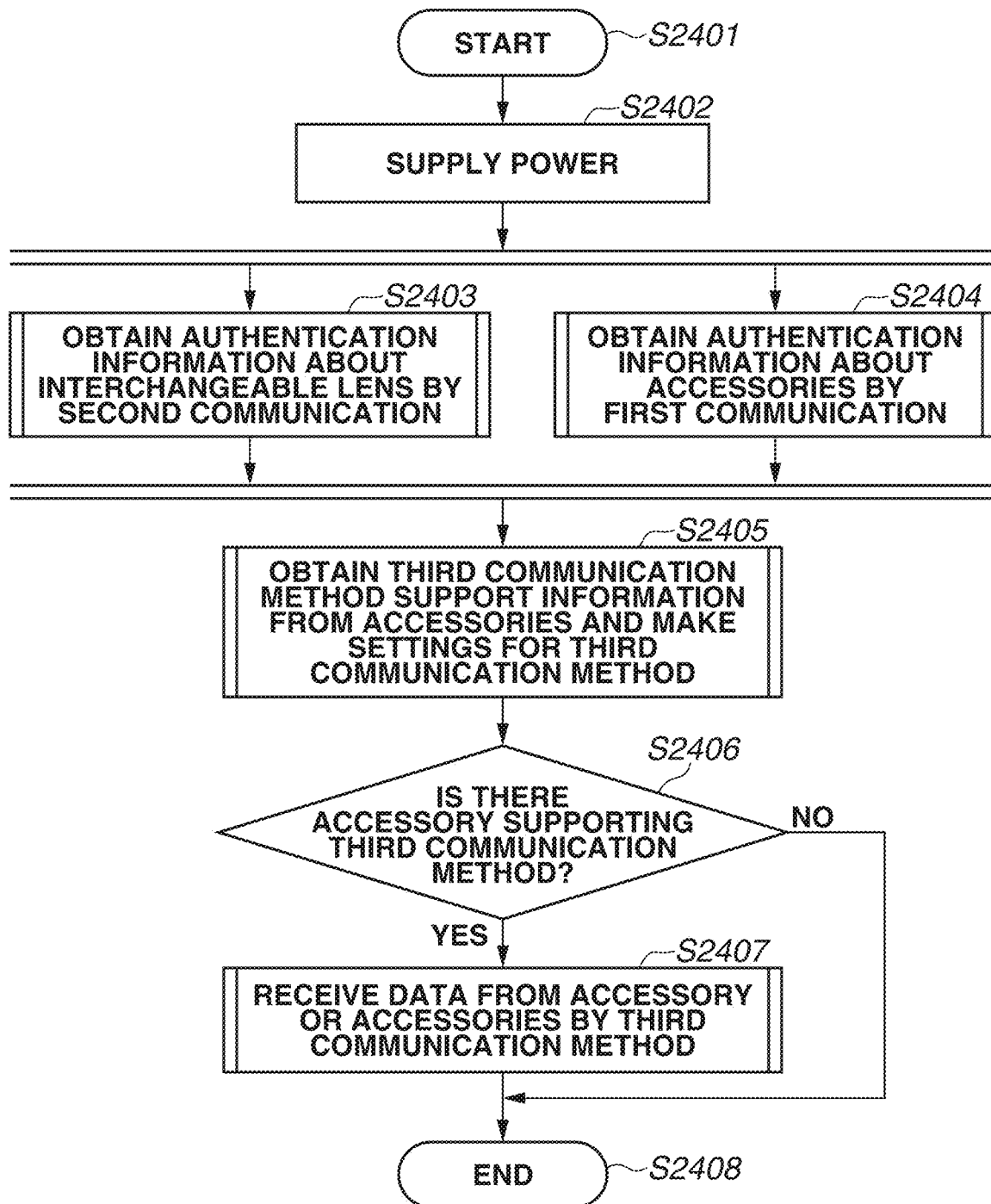
FIG. 24 is a flowchart illustrating a procedure from initial communication processing with accessory apparatuses to reception of data from the accessory apparatuses by P2P burst communication.

Next, a procedure where the camera microcomputer 205 obtains identification information about the intermediate adaptor 300 and the interchangeable lens 100 by initial communication, and receives data from the accessory apparatuses (hereinafter, also referred to as accessories) by the third communication method of the first communication will be described with reference to FIG. 24. By the initial communication, the camera microcomputer 205 obtains information to be used for subsequent communication, such as authentication information to be described below, from the accessories attached to the camera main body 200, such as the interchangeable lens 100 and the intermediate adaptor 300. In the present exemplary embodiment, before communication using the third communication method of the first communication, the camera microcomputer 205 obtains information indicating whether the accessories support the third communication method as authentication information, and makes settings for the third communication method. The camera microcomputer 205 then receives data from the accessories by using the third communication method. Such a procedure will be described with reference to FIG. 24. The procedure illustrated in FIG. 24 is performed upon power-on with the intermediate adaptor 300 and the interchangeable lens 100 attached.

In step S2401, the camera main body 200 is activated. The processing proceeds to step S2402.

In step S2402, the camera main body 200 supplies power to the interchangeable lens 100 and the intermediate adaptor 300 via not-illustrated power supply mount contacts. The processing proceeds to steps S2403 and S2404.

In step S2403, the camera microcomputer 205 obtains authentication information from the lens microcomputer 111 by the second communication. The authentication information includes interchangeable lens identification information. The interchangeable lens identification information may be information such as a model number (ID) used to identify the type (model) of the interchangeable lens 100, or optical data identification information indicating optical data specific to the interchangeable lens 100. The interchangeable lens identification information may also include information indicating a function or functions of the interchangeable lens 100, and/or information indicating a production number (serial number) that can identify the individual lens among lenses of the same model.

The procedure of step (subprocess) S2403 for obtaining the authentication information about the interchangeable lens 100 by the second communication will be described below with reference to FIG. 25. In step S2404, the camera microcomputer 205 performs initial communication with the accessories by the first communication, and obtains authentication information about the accessories. The authentication information about the accessories includes identification information about the accessories.

For example, the intermediate adaptor authentication information includes intermediate adaptor identification information as accessory identification information, if the authentication information about an accessory is intermediate adaptor authentication information. The intermediate adaptor identification information may be information such as a model number (ID) used to identify the type (model) of the intermediate adaptor 300, or optical data identification information indicating optical data specific to the intermediate adaptor 300. The intermediate adaptor identification information may also include information indicating a function or functions of the intermediate adaptor 300, and/or information such as a production number (serial number) that can identify the individual adaptor among adaptors of the same model.

Since the identification information about the interchangeable lens 100 is obtained by the second communication, the identification information about the interchangeable lens 100 to be transmitted in the first communication may be a value not redundant with the identification information about the intermediate adaptor 300 (e.g., a value indicating that the accessory is an interchangeable lens). The reason why a value not redundant with the identification information about the intermediate adaptor 300 is transmitted is that the identification information is used to make a notification of the communication target of the first communication.

The procedure of step (subprocess) S2404 for obtaining the intermediate adaptor authentication information and the authentication information about the interchangeable lens by the first communication will be described below with reference to FIG. 26. Steps S2403 and S2404 use respective different communication paths, and can thus be performed in parallel or in succession.

After the acquisition of the authentication information about the interchangeable lens 100 and the authentication information about the attached accessories in steps S2403 and S2404, the processing proceeds to step S2405.

In step S2405, the camera microcomputer 205 obtains third communication method support information from the accessories by using the identification information about the respective accessories, obtained in step S2404. The third communication method support information is information indicating whether each accessory supports the third communication method. If the third communication method support information indicates that the third communication method is supported, the camera microcomputer 205 makes settings for the third communication method. The procedure of step (subprocess) S2405 for obtaining the third communication method support information about each accessory and making settings for the third communication method by the first communication will be described below with reference to FIG. 27.

After the completion of the settings for the third communication method, the processing proceeds to step S2406. In step S2406, if there is any accessory supporting the third communication method (YES in step S2406), the processing proceeds to step S2407. In step S2407, the camera microcomputer 205 receives data from the accessory or accessories by using the third communication method. The third communication method may be implemented by slave-initiated P2P burst communication described with reference to FIG. 11 where flow control is performed using the signal line CS, or slave-initiated P2P burst communication described with reference to FIG. 18 where flow control is performed using the signal line DATA. If no flow control is needed because of the use of first communication-dedicated microcomputers or direct memory access (DMA), a block control time can simply be set. If the camera first communication unit 208 has a sufficiently large reception buffer, block control is not needed, either.

If there is no accessory supporting the third communication method (NO in step S2406), the processing proceeds to step S2408.

In step S2407, the camera microcomputer 205 performs data reception by the third communication method. Here, the camera microcomputer 205 receives data from the accessory or accessories by the third communication method based on the settings made in step S2405. After the completion of the data reception by the third communication method in step S2407, the processing proceeds to step S2408. In step S2408, the camera microcomputer 205 ends the data reception from the accessory apparatus(es).

After the data acquisition by the third communication method, the second communication is used for communication for the camera main body 200 to control the interchangeable lens 100, and the first communication is mainly used for communication for the camera main body 200 to regularly obtain operation information about the intermediate adaptor 300. Communication for regularly obtaining operation information about the operation member (operation ring) 130 of the interchangeable lens 100 may use either of the first and second communications in consideration of the occupancy rates of the respective communication paths as well as communication and control responsivity.

<Processing for Obtaining Authentication Information by Second Communication Between Camera Main Body and Interchangeable Lens (FIG. 25)>

Figure 25:
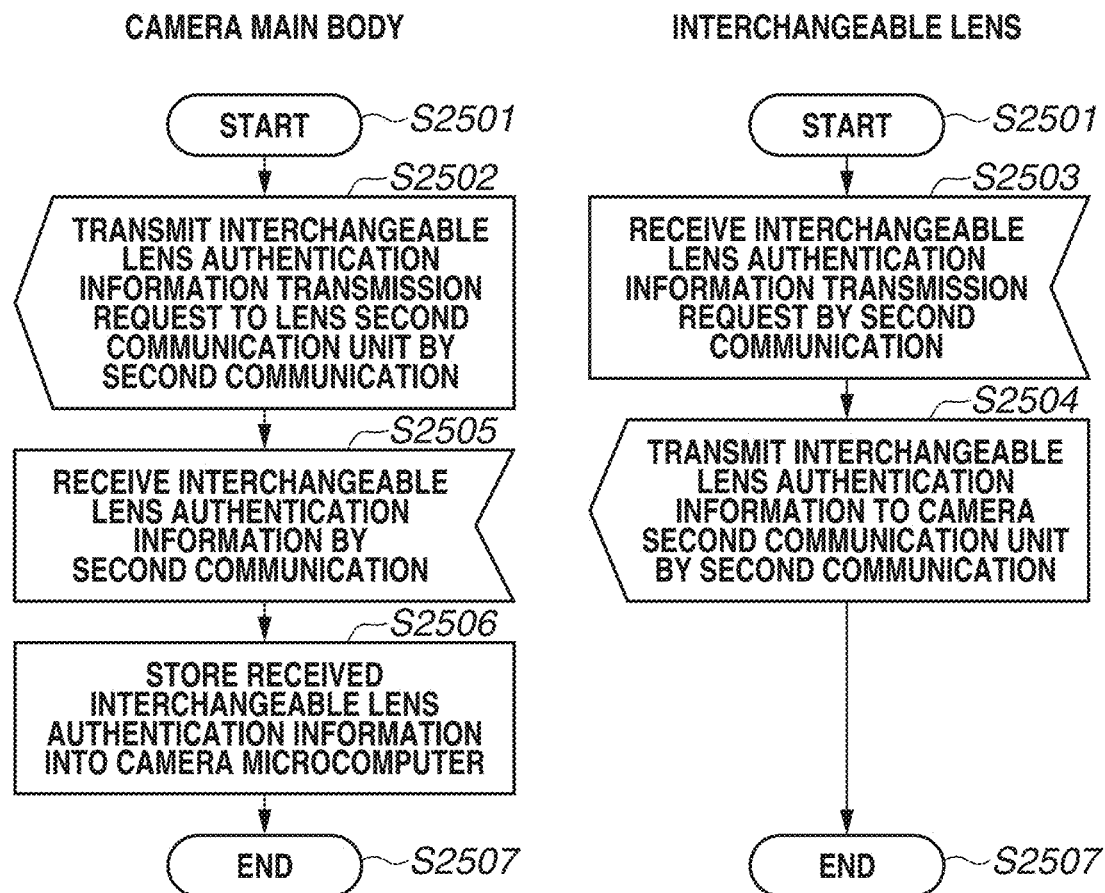
FIG. 25 is a flowchart illustrating a procedure of initial communication processing by second communication between a camera main body and an interchangeable lens.

FIG. 25 illustrates the procedure of subprocess S2403 that is initial communication processing the camera main body 200 performs with the interchangeable lens 100 in the camera system according to the third exemplary embodiment. In subprocess S2403, the camera microcomputer 205 obtains the authentication information about the interchangeable lens 100 from the lens microcomputer 111.

In step S2501, subprocess S2403 starts. The processing proceeds to step S2502.

In step S2502, the camera second communication unit 209 transmits an interchangeable lens authentication information transmission request to the lens second communication unit 132 by the second communication.

In step S2503, the lens second communication unit 132 receives the interchangeable lens authentication information transmission request. The processing proceeds to step S2504. In step S2504, the lens second communication unit 132 transmits the interchangeable lens authentication information to the camera second communication unit 209 by the second communication.

In step S2505, the camera second communication unit 209 receives the interchangeable lens authentication information. The processing proceeds to step S2506. In step S2506, the camera second communication unit 209 stores the received interchangeable authentication information into the camera microcomputer 205.

In step S2504, subprocess S2403 ends.

<Processing for Obtaining Authentication Information by First Communication Between Camera Main Body and Accessories (FIG. 26)>

Figure 26:
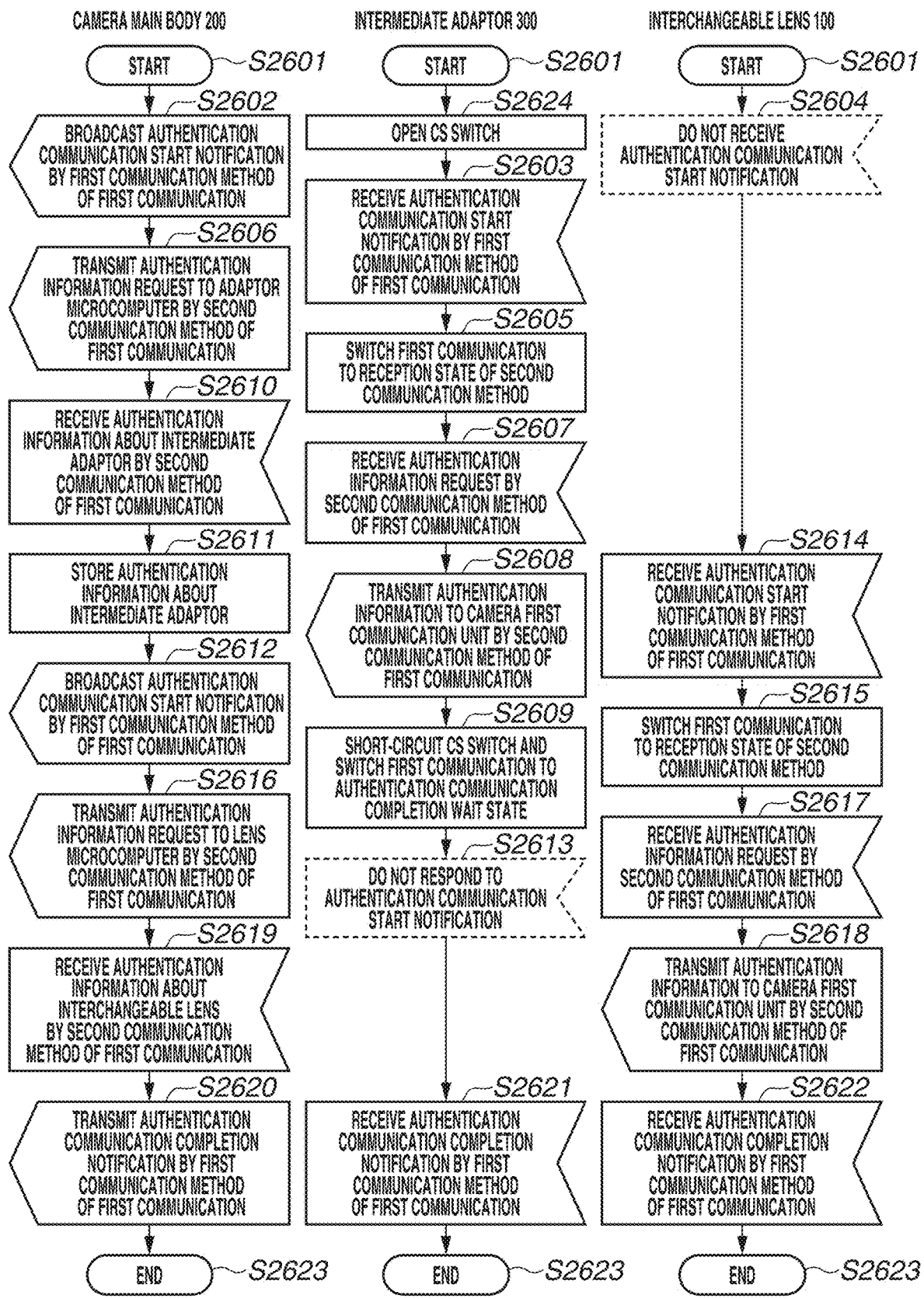
FIG. 26 is a flowchart illustrating a procedure of initial communication processing by first communication between the camera main body and the accessory apparatuses.

FIG. 26 is a diagram for describing the procedure of subprocess S2404 that is initial communication processing performed between the camera main body 200 and the accessories in the camera system according to the third exemplary embodiment. In subprocess S2404, the camera microcomputer 205 obtains authentication information about the accessories.

In step S2602, the camera microcomputer 205 broadcasts an authentication communication start notification by the first communication method of the first communication.

In step S2603, the adaptor microcomputer 302 receives the authentication communication start notification by the first communication method. The processing proceeds to step S2605. In step S2605, the adaptor microcomputer 302 switches the first communication to a reception state of the second communication method.

In the first communication, the camera main body 200 can communicate with one or more accessories. In such a one-to-many communication, the transmission destination can be specified, for example, by adding the identification information about the accessory to communicate with to the beginning of the communication data. However, the camera microcomputer 205 does not have authentication information about the accessories at the stage of step S2602, and thus is unable to specify the transmission target using the communication data.

Examples of means for the camera main body 200 to communicate with a plurality of accessories by turns in this subprocess include a method using the CS switch 3033 located on the CS line of the intermediate adaptor 300 illustrated in FIG. 2 in a manner described below. Suppose that the CS switch 3033 is short-circuited in a steady state.

In step S2601, the camera microcomputer 205 transmits a subprocess start information by the first communication. Since the CS switch 3033 is short-circuited, the accessories receive the subprocess start information. After receiving the subprocess start information, in step S2624, the adaptor microcomputer 302 opens the CS switch 3033. In such a state, only the adaptor communication unit 303 is connected to the camera first communication unit 208 and can receive data transmitted from the camera first communication unit 208. The adaptor microcomputer 302 finishes processing corresponding to the received data and short-circuits the CS switch 3033. This enables the lens first communication unit 112 to receive data transmitted from the camera first communication unit 208. With the CS switch 3033 short-circuited, the adaptor microcomputer 302 does not respond to information transmitted from the camera first communication unit 208 until an authentication communication completion notification transmitted from the camera microcomputer 205 in step S2621 is received at the end of this subprocess.

In such a manner, the camera microcomputer 205 can communicate with a plurality of accessories by turns.

In step S2604, since the CS switch 3033 is open, the lens microcomputer 111 does not receive the authentication communication start notification transmitted from the camera first communication unit 208 in step S2602.

After the transmission of the authentication communication start notification by adaptor microcomputer 302 in step S2602, the processing proceeds to step S2606. In step S2606, the camera microcomputer 205 switches the first communication to a transmission state of the second communication method, and transmits an authentication information request to the adaptor microcomputer 302. After the transmission, the camera microcomputer 205 switches the first communication to the reception state of the second communication method.

The authentication information request according to the present exemplary embodiment is a communication requesting to transmit authentication information including at least the identification information about the accessory and termination information to the camera microcomputer 205.

In step S2607, the adaptor communication unit 303 receives the authentication information request by the second communication method. The processing proceeds to step S2608.

In step S2608, the adaptor microcomputer 302 transmits the authentication information about the adaptor microcomputer 302 to the camera first communication unit 208 by the second communication method of the first communication.

Here, the authentication information that the intermediate adaptor 300 transmits to the camera microcomputer 205 includes at least the identification information about the accessory and the termination information.

In the present exemplary embodiment, the termination information is information indicating whether the accessory is the termination of the first communication as seen from the camera microcomputer 205. If the intermediate adaptor 300 is the termination of the first communication as seen from the camera microcomputer 205, the termination information indicates "being a termination". If the intermediate adaptor 300 is not the termination of the first communication as seen from the camera microcomputer 205, the termination information indicates "not being a termination".

After the transmission of the authentication information to the camera first communication unit 208 in step S2608, the processing proceeds to step S2609. In step S2609, the adaptor microcomputer 302 short-circuits the CS switch 3033. This enables the lens first communication unit 112 to receive data transmitted from the camera first communication unit 208. Since the transmission and reception of data to be exchanged by the initial communication is completed by step S2609, the adaptor microcomputer 302 switches the first communication to an authentication communication completion wait state. The adaptor microcomputer 302 then does not respond to the first communication until the authentication communication completion notification is received by the first communication method of the first communication in step S2621.

In step S2610, the camera microcomputer 205 receives the authentication information about the intermediate adaptor 300. The processing proceeds to step S2611. In step S2611, the camera microcomputer 205 stores the received authentication information.

After the acquisition of the authentication information about the intermediate adaptor 300 in the foregoing steps S2602 to S2611, the processing proceeds to step S2612. In steps S2612 and S2614 to S2619, the microcomputer 205 obtains authentication information about the interchangeable lens 100 in a similar manner to that in steps S2602, S2603, and S2605 to S2611.

In step S2613, the adaptor microcomputer 302 receives the authentication communication notification transmitted from the camera microcomputer 205 but makes no response since the authentication communication completion notification has not been received.

While the third exemplary embodiment deals with an example where a total of two accessories, namely, an interchangeable lens and an intermediate adaptor are connected, two or more intermediate adaptors may be connected. Since any number of intermediate adaptors can be attached, accessory termination information is desirably obtained in the processing for obtaining accessory information.

Methods for obtaining accessory termination information will now be described. For example, as in the present exemplary embodiment, the lens second communication unit 132 may return termination information notifying of being an interchangeable lens when the authentication information request is transmitted from the camera microcomputer 205. The termination accessory may detect that the own apparatus is the termination based on the connection state of a not-illustrated terminal, and notify the camera microcomputer 205 thereof. The present exemplary embodiment deals with the case where the termination information is notified by the lens microcomputer 111 returning the authentication information including the termination information in response to the authentication information request from the camera microcomputer 205.

In step S2616, the camera microcomputer 205 transmits an authentication information request by the second communication method of the first communication as in step S2606.

In step S2619, the camera microcomputer 205 receives the authentication information about the interchangeable lens 100. Since the authentication information includes the interchangeable lens identification information and the termination information, the current communication target is found to be an interchangeable lens and the termination accessory of the first communication. If the interchangeable lens identification information is to be stored, the camera microcomputer 205 stores the interchangeable lens identification information as in step S2611.

After the end of the authentication communication with the termination accessory, the processing proceeds to step S2620. In step S2620, the camera microcomputer 205 transmits the authentication communication completion notification by the first communication method of the first communication. In step S2621, the adaptor microcomputer 302 receives the authentication communication completion notification by the first communication method of the first communication, and enters the steady state. In step S2622, the lens microcomputer 111 receives the authentication communication completion notification by the first communication method of the first communication, and enters the steady state. In the steady state, the adaptor microcomputer 302 and the lens microcomputer 111 switch the first communication to the reception state of the second communication method upon receiving their own identification information from the camera microcomputer 205 by the first communication method of the first communication.

The processing for obtaining the authentication information by the first communication between the camera main body 200 and the accessories is thus completed, and the processing proceeds to step S2623. Subprocess S2404 thereby ends.

In the present exemplary embodiment, processing using the means for communicating with a plurality of accessories by turns using a second communication connection switch (CS switch) has been described. However, other means capable of communicating with a plurality of accessories can be used. For example, what number an accessory is in the order of attachment from the camera main body 200 can be found out by the accessory detecting the voltage level of a not-illustrated terminal connected thereto. In such a case, the accessory counts the number of information transmission requests transmitted from the camera main body 200, and transmits information to the camera main body 200 only when the number matches its own order of attachment.

<Subprocess for Obtaining Third Communication Method Support Information and Making Settings (FIG. 27)>

Figure 27:
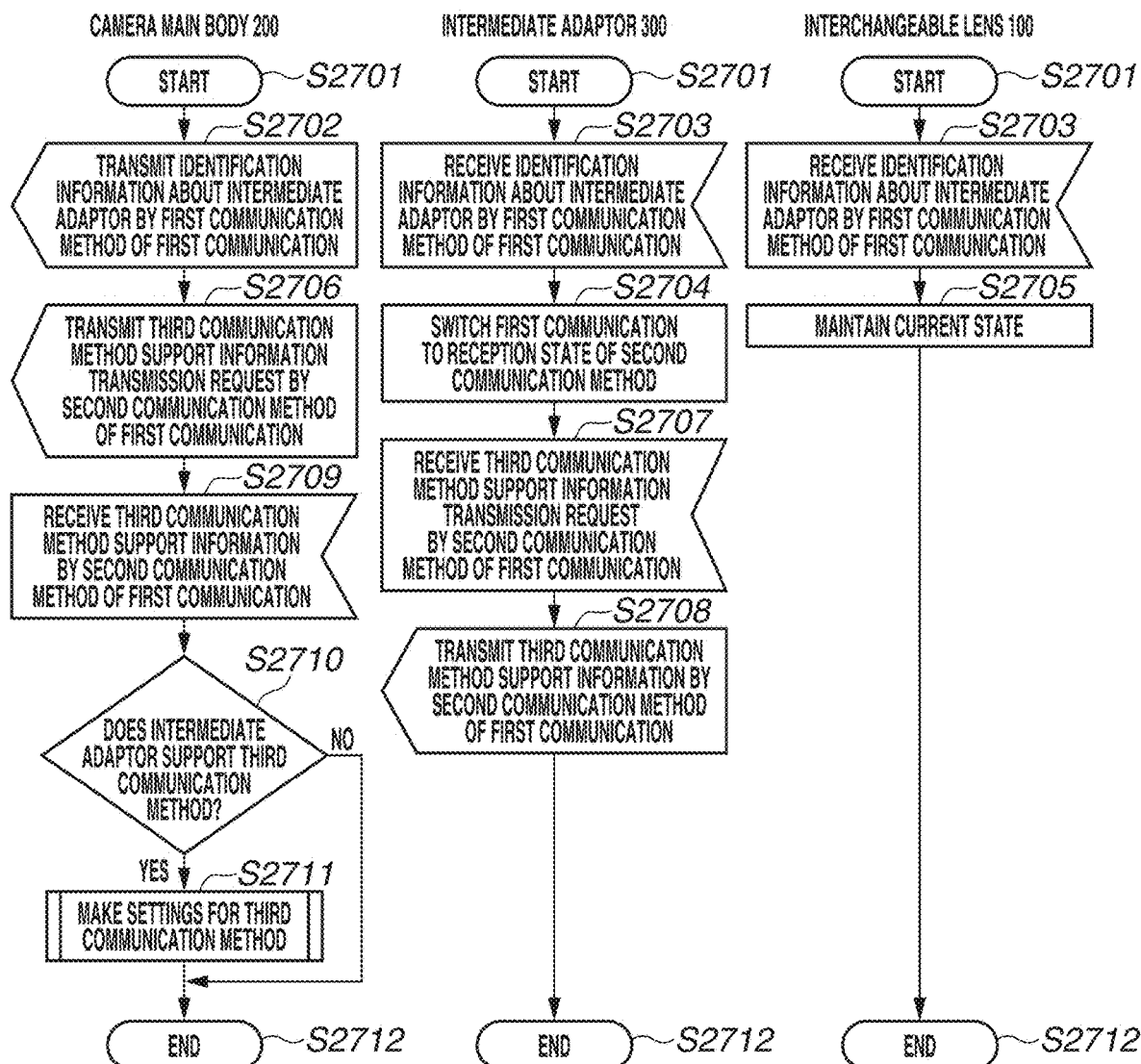
FIG. 27 is a flowchart illustrating a procedure for obtaining P2P burst communication support information and making settings for P2P burst communication.

The procedure of subprocess S2405 where the camera main body 200 makes communication settings for the third communication method of an accessory supporting the third communication method of the first communication through communication in the third exemplary embodiment will be described with reference to FIG. 27.

In this subprocess, the intermediate adaptor 300 supports the third communication method. Incidentally, to obtain third communication method support information about the interchangeable lens 100 and make settings, communication similar to that with the intermediate adaptor 300 can be performed with the interchangeable lens 100 before the end of this subprocess in step S2712.

In step S2701, subprocess S2405 starts. The processing proceeds to step S2702.

In step S2702, the camera microcomputer 205 transmits the identification information about the intermediate adaptor 300 by the first communication method of the first communication. In step S2703, both the adaptor microcomputer 302 and the lens microcomputer 111 receive the identification information about the intermediate adaptor 300 since the first communication method is broadcast communication.

In step S2704, the adaptor microcomputer 302 of the intermediate adaptor 300 receiving its own identification information switches the first communication to the reception state of the second communication method. By contrast, in step S2705, the interchangeable lens 100 receiving information different from its own identification information maintains the current state.

After the transmission of the identification information about the intermediate adaptor 300 in step S2702, the camera microcomputer 205 switches to the second communication method to communicate with the adaptor microcomputer 302 by the second communication method of the first communication.

In step S2706, the camera microcomputer 205 transmits a third communication method support information transmission request by the second communication method of the first communication.

In step S2707, the adaptor microcomputer 302 receives the third communication method support information transmission request. The processing proceeds to step S2708. In step S2708, the adaptor microcomputer 302 transmits the third communication method support information by the second communication method of the first communication.

In step S2709, the camera microcomputer 205 receives the third communication method support information by the second communication method of the first communication. The processing proceeds to step S2710.

In step S2710, the camera microcomputer 205 determines whether the intermediate adaptor 300 supports the third communication method based on the third communication method support information received from the adaptor microcomputer 302 in step S2709. If the intermediate adaptor 300 does not support the third communication method (NO in step S2710), the processing proceeds to step S2712. Subprocess S2405 ends.

If the intermediate adaptor 300 supports the third communication method (YES in step S2710), the processing proceeds to step S2711. In step S2711, the camera microcomputer 205 makes settings for the third communication method. The procedure of step (subprocess) S2711 for making settings for the third communication method will be described below with reference to FIG. 28.

After the settings for the third communication method are made in step S2711, the processing proceeds to step S2712. Subprocess S2405 ends.

<Subprocess for Making Settings for Third Communication Method (FIG. 28)>

Figure 28:
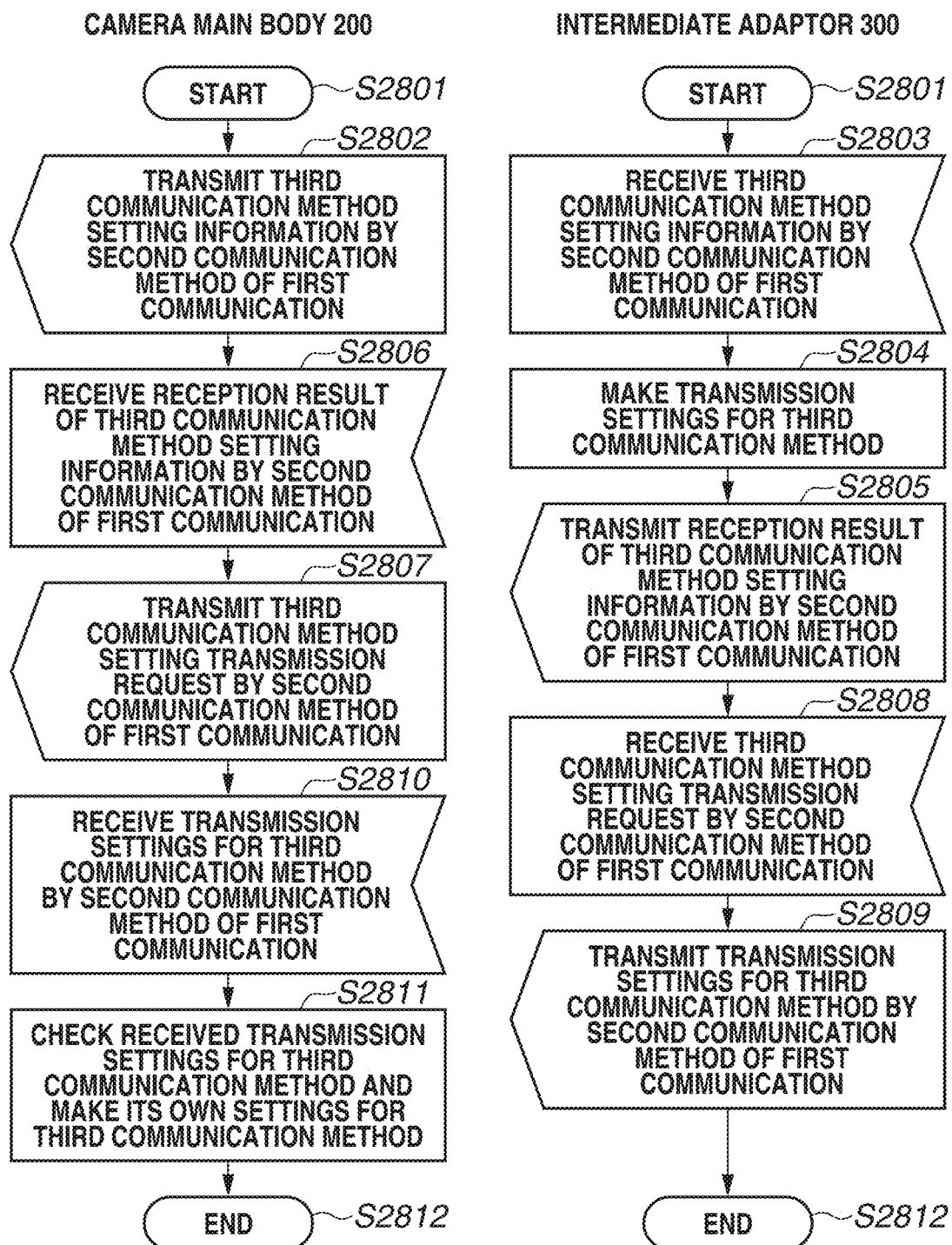
FIG. 28 is a flowchart illustrating a detailed procedure for making the settings for P2P burst communication.

The procedure of subprocess S2711 where the camera main body 200 makes settings for third communication method of an accessory supporting the third communication method of the first communication through communication in the third exemplary embodiment will be described with reference to FIG. 28.

In this subprocess, the camera main boy 200 makes settings for the intermediate adaptor 300. Suppose that before starting this subprocess, the camera microcomputer 205 specifies the intermediate adaptor 300 as the communication partner of the second communication method by using the first communication method of the first communication. Settings for the interchangeable lens 100 can also be made in a similar manner to in this subprocess.

In step S2801, subprocess S2711 starts. The processing proceeds to step S2802.

In step S2802, the camera microcomputer 205 transmits third communication method setting information by the second communication method of the first communication. In the present exemplary embodiment, the third communication method setting information includes the block size, the interblock wait time, and the number of blocks ahead of flow control included in the foregoing burst communication information. The third communication method setting information may include the identification information about the interchangeable lens 100. Information to be received from the intermediate adaptor 300 can sometimes be linked with the mounted interchangeable lens 100, like optical information obtained by correcting the optical characteristics of the interchangeable lens 100 with an optical member of the intermediate adaptor 300. In such a case, the identification information about the interchangeable lens 100 is desirably transmitted to the intermediate adaptor 300. The identification information about the interchangeable lens 100 to be transmitted here is desirably identification information capable of model identification, obtained by the second communication.

In step S2803, the adaptor microcomputer 302 receives the third communication method setting information. The processing proceeds to step S2804.

In step S2804, the adaptor microcomputer 302 makes transmission settings for the third communication method based on the third communication method setting information received in step S2803. The adaptor microcomputer 302 also makes preparations to transmit, to the camera microcomputer 205, optical information obtained by the adaptor microcomputer 302 correcting the interchangeable lens product based on the identification information about the interchangeable lens 100 received in step S2803.

After the completion of the transmission settings, the processing proceeds to step S2805. In step S2805, the adaptor microcomputer 302 transmits a reception result of the third communication method setting information by the second communication method. Here, the adaptor microcomputer 302 returns not the setting states of the third communication method but information indicating whether the third communication method setting information is normally received in step S2803. With such a configuration, the reception result can be communicated in a similar manner even if the items to be included in the third communication method setting information increase in the future, for example.

In step S2806, the camera microcomputer 205 receives the reception result of the third communication method setting information. If the third communication method setting information is confirmed to be normally received by the adaptor microcomputer 302, the processing proceeds to step S2807. If not, this subprocess is retried from step S2802 again. If the third communication method setting information fails to be normally communicated after several retries, the camera microcomputer 205 resets the power supplied to the accessory apparatus and makes a retry from the acquisition of the authentication information.

In step S2807, the camera microcomputer 205 transmits a third communication method setting transmission request by the second communication method.

In step S2808, the adaptor microcomputer 302 receives the third communication method setting transmission request. The processing proceeds to step S2809. In step S2809, the adaptor microcomputer 302 transmits the transmission settings made for the third communication method in step S2804 by the second communication method. The transmission settings for the third communication method according to the present exemplary embodiment include the number of bytes of the header of the optical information in addition to the block size, the number of blocks ahead of flow control, and the interblock wait time included in the foregoing burst communication information.

The header includes the sizes and storage addresses of respective pieces of data in the entire optical information. Only a desired piece of data can be obtained by specifying the address and size at the beginning of burst communication. The entire optical information can be obtained by specifying the top address as the address and the total number of bytes as the size.

The header may include a simplified conversion table of the optical information. This enables simplified conversion of the optical information about the interchangeable lens 100 by obtaining the header information before obtaining the entire optical information.

In step S2810, the camera microcomputer 205 receives the transmission settings for the third communication method. The processing proceeds to step S2811. In step S2811, the camera microcomputer 205 checks the received transmission settings of the intermediate adaptor 300, and makes its own settings for the third communication method. After the completion of the settings of the came main body 200 for the third communication method in step S2811, the processing proceeds to step S2812. Subprocess S2711 ends.

Effects of Third Exemplary Embodiment

As described above, the reception buffer size of the receiver is defined as the block size. One block of data transfer is followed by a time where no communication is performed as long as the interblock wait time for the receiver to perform data reception processing for burst communication. This enables normal reception even if data is continuously transferred.

Flow control is performed after as many blocks of data transfer as the number of blocks ahead of flow control. This can suspend data transfer from the sender as long as desirable for the receiver, so that processing other than communication can be performed in parallel.

In P2P burst communication, unlike P2P communication, the sender, i.e., either one of the communication master and the communication slave simply outputs an enormous amount of data while only the receiver issues notifications using the signal line CS. This can reduce the communication time compared to that in P2P communication.

Since the signal line CS-based flow control by the receiver of P2P burst communication is notified to both the communication master and the communication slave, the signal line CS is desirably maintained at Low over a certain period of time. The transfer time of the entire P2P burst communication can therefore be reduced by increasing the block size and the number of blocks ahead of flow control as much as possible and reducing the number of times of flow control.

The camera microcomputer 205 can also obtain information linked with the mounted interchangeable lens 100 from the intermediate adaptor 300 by making settings for the third communication method with the identification information about the interchangeable lens 100 obtained by the second communication included.

A fourth exemplary embodiment of the present exemplary embodiment will now be described. The present exemplary embodiment deals with step (subprocess) S2407. A camera system according to the present exemplary embodiment has a similar configuration as that of the third exemplary embodiment.

In the present exemplary embodiment, firmware of the intermediate adaptor 300 can be updated via the camera main body 200. Specifically, firmware update data for the intermediate adaptor 300 is communicated by the foregoing third communication method, whereby firmware update processing can be normally performed at high speed even with the first communication capable of one-to-many communication.

In the present exemplary embodiment, the adaptor microcomputer 302 includes a rewritable nonvolatile memory (not illustrated), and stores control software (firmware) for the adaptor microcomputer 302 to execute as well as identification information and state information about the intermediate adaptor 300. The identification information is information specific to the intermediate adaptor 300, such as a model name, optical characteristics, and correction information. Examples of the state information include an operation state (normal/safe mode), and the version and update state of the firmware. However, these are not restrictive. The nonvolatile memory also stores a program to be executed in operating the intermediate adaptor 300 in a safe mode to be described below.

The adaptor microcomputer 302 also includes a programmable processor (not illustrated) such as a central processing unit (CPU), reads programs from the nonvolatile memory and executes the programs, and thereby implements various operations, including operations of the intermediate adaptor 300 to be described below. For example, the adaptor microcomputer 302 performs an operation based on a command received from the camera microcomputer 205 via the adaptor communication unit 303 and updates the firmware stored in the nonvolatile memory.

The adaptor microcomputer 302 updates the old firmware stored in the nonvolatile memory, for example, by overwriting the firmware with new firmware received from the camera microcomputer 205 via the adaptor communication unit 303. The adaptor microcomputer 302 also manages the update processing of the firmware by recording data indicating the state of the update processing (update state data) into the nonvolatile memory. For example, the adaptor microcomputer 302 sets the update state data to a value indicating "not completed" before overwriting the firmware, and sets the update state data to a value indicating "completed" when the overwriting of the firmware is completed. The value indicating "completed" may have different values, one indicating "normally completed" and one indicating "abnormally completed". The value indicating "abnormally completed" may have different values depending on the cause of the abnormality.

For example, if the intermediate adaptor 300 is detached during firmware update, the power supply to the intermediate adaptor 300 is disconnected and the update processing is aborted with the value of the update state data still indicating "not completed". The adaptor microcomputer 302 checks the update state data when powered on again, for example. If the value of the update state data indicates "not completed", the adaptor microcomputer 302 enters an operation-restricted mode (safe mode). The safe mode runs on a memory area to not be rewritten by firmware update, whereby the firmware is guaranteed to be able to be updated despite the incomplete firmware update.

In the safe mode, only a limited set of functions can be executed, including processing for updating firmware. Specifically, the limited set of functions includes processing for transmitting information indicating the safe mode (or a request for firmware update) to the camera microcomputer 205, and processing for updating the firmware in the nonvolatile memory with the firmware received from the camera microcomputer 205. Other types of processing, such as transmission and reception by the third communication method, are not executable.

The memory capacity is typically not so large as to store the two entire versions of firmware, and the capacity available for storing a safe mode program is thus limited. In the safe mode, only a limited set of functions, including minimum functions such as transmitting the operation state of the intermediate adaptor 300 and updating the firmware, are therefore provided. The adaptor microcomputer 302 ignores requests for processing not executable in the safe mode, such as a third communication method setting request, if the adaptor communication unit 303 receives such requests in the safe mode.

A sequence for inquiring the intermediate adaptor 300 whether a firmware update file or files recorded on a medium loaded into the camera main body 200 is/are one(s) for the currently-attached intermediate adaptor 300 will be described with reference to FIG. 29. The camera main body 200 displays only the firmware update file(s) for the intermediate adaptor 300 on a menu screen based on the information obtained by this sequence. FIG. 30 illustrates the menu screen.

<Acquisition of Firmware Update File Support Information (FIG. 29)>

Figure 29:
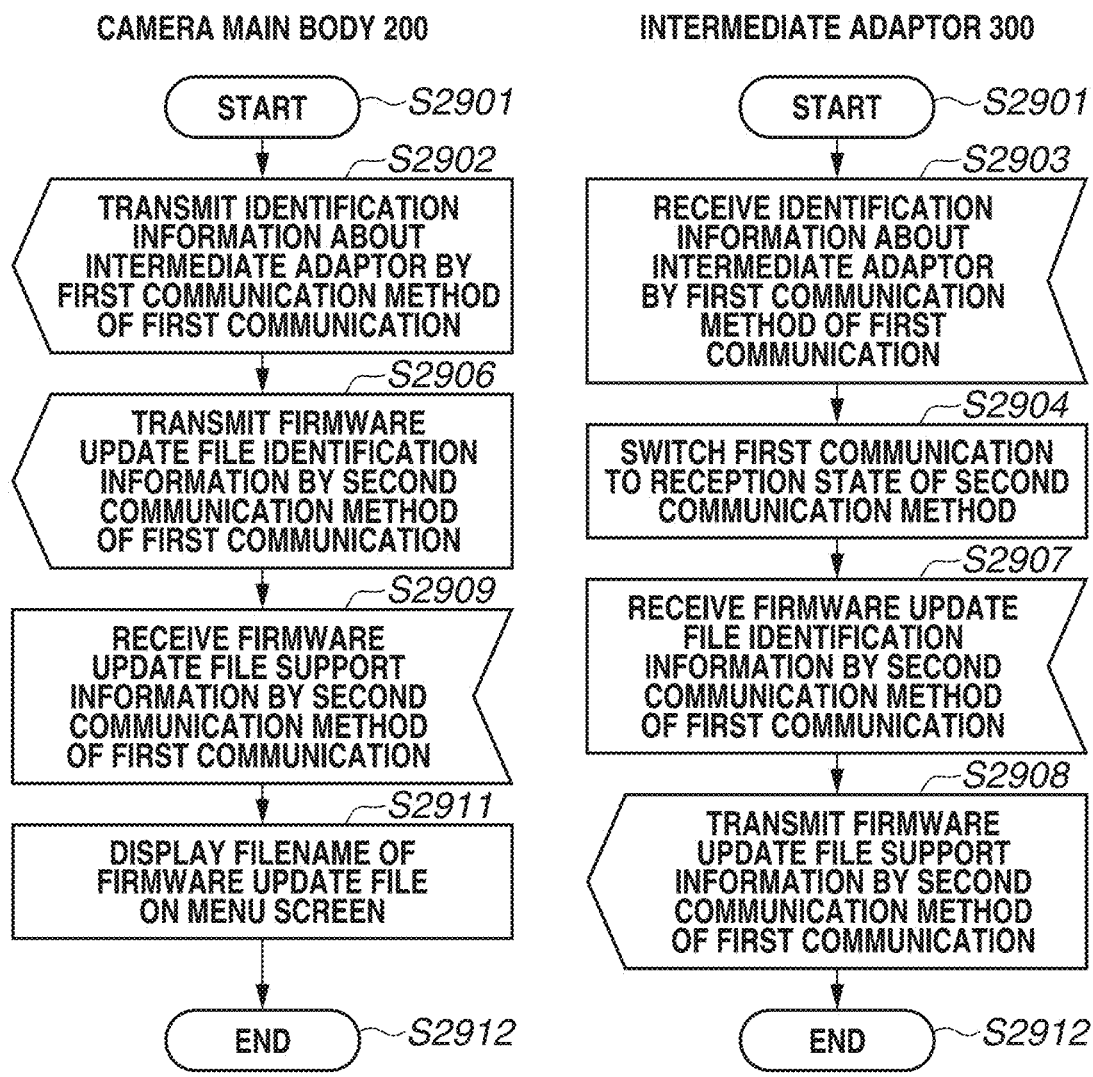
FIG. 29 is a flowchart illustrating a procedure for obtaining firmware update file support information.
Figure 30:
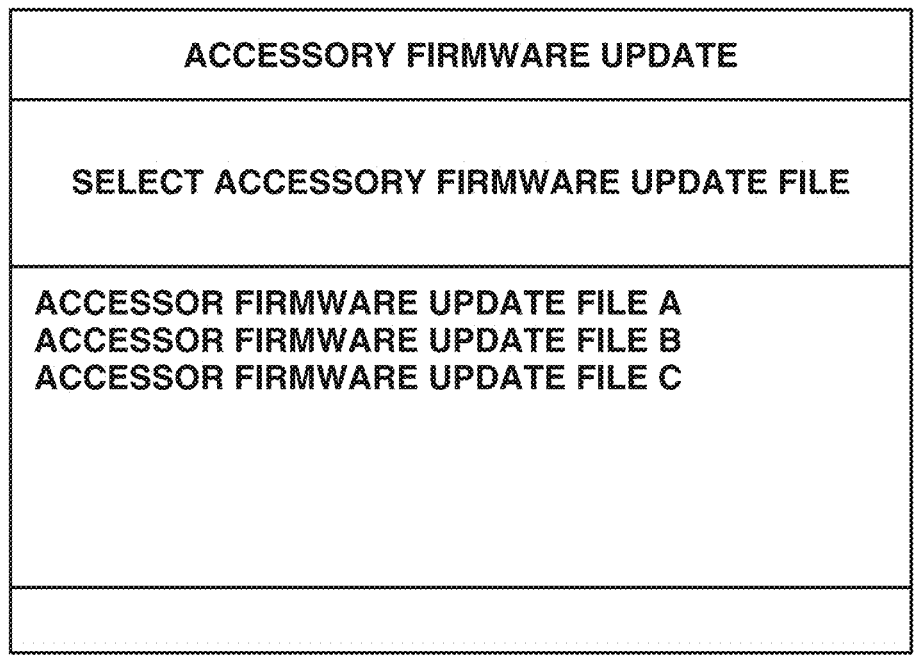
FIG. 30 is a diagram illustrating a menu screen for selecting a firmware update file.

FIG. 29 is a flowchart for describing a procedure for checking whether a firmware update file recorded on a medium loaded into the camera main body 200 is one intended for the intermediate adaptor 300 in the camera system according to the fourth exemplary embodiment. In this process, the camera main body 200 transmits identification information (firmware update file identification information) about the firmware update file recorded on the medium loaded into the camera main body 200 to the intermediate adaptor 300 and obtains support information by using the first communication.

In step S2901, the process starts. The processing proceeds to step S2902.

In step S2902, the camera microcomputer 205 transmits the identification information about the intermediate adaptor 300 by the first communication method of the first communication. In step S2903, both the adaptor microcomputer 302 and the lens microcomputer 111 receive the identification information about the intermediate adaptor 300 since the first communication method is broadcast communication.

In step S2904, the adaptor microcomputer 302 of the intermediate adaptor 300 receiving its own identification information switches the first communication to the reception state of the second communication method. Meanwhile, the interchangeable lens 100 receiving information different from its own identification information maintains the current state.

After the transmission of the identification information about the intermediate adaptor 300 in step S2902, the camera microcomputer 205 switches to the second communication method of the first communication to communicate with the adaptor microcomputer 302 by the second communication method.

In step S2906, the camera microcomputer 205 transmits firmware update file identification information by the second communication method of the first communication.

The firmware update file identification information according to the present exemplary embodiment may be the accessory identification information recorded in the firmware update file, or other information indicating the accessory. To prohibit firmware update to an older version, the firmware update file identification information may include version information recorded in the firmware update file. Information for determining the type of accessory, such as an interchangeable lens and an intermediate adaptor, may be included.

In step S2907, the adaptor communication unit 303 receives the firmware update file identification information by the second communication method. The processing proceeds to step S2908.

In step S2908, the adaptor microcomputer 302 determines whether its own firmware can be updated with the firmware update file based on the firmware update file identification information received in step S2907. The adaptor microcomputer 302 transmits the determination result as firmware update file support information to the camera first communication unit 208 by the second communication method of the first communication.

After the adaptor microcomputer 302 transmits the firmware update file support information to the camera first communication unit 208 in step S2908, the processing then proceeds to step S2912.

In step S2909, the camera microcomputer 205 receives the firmware update file support information about the intermediate adaptor 300. The processing proceeds to step S2911. In step S2911, if the intermediate adaptor 300 supports the firmware update file, the camera microcomputer 205 displays the filename of the firmware update file on the menu screen as illustrated in FIG. 30, so that the user can select the firmware update file.

If there is a plurality of firmware update files, this process may be repeated. In continuously inquiring the same accessory (in the present exemplary embodiment, the intermediate adaptor 300) of firmware update file support information, steps S2902 to S2904 may be omitted since the intermediate adaptor 300 has already been specified as the communication partner of the second communication method.

After the end of step S2911, the processing proceeds to step S2912. This process ends.

Firmware update file support information can be obtained from the interchangeable lens 100 by performing similar processing to this process or by using the second communication.

As described above, firmware update files corresponding to the attached accessories are displayed on the menu screen so that the user can select one.

<Firmware Update of Accessory by First Communication (FIG. 31)>

Figure 31:
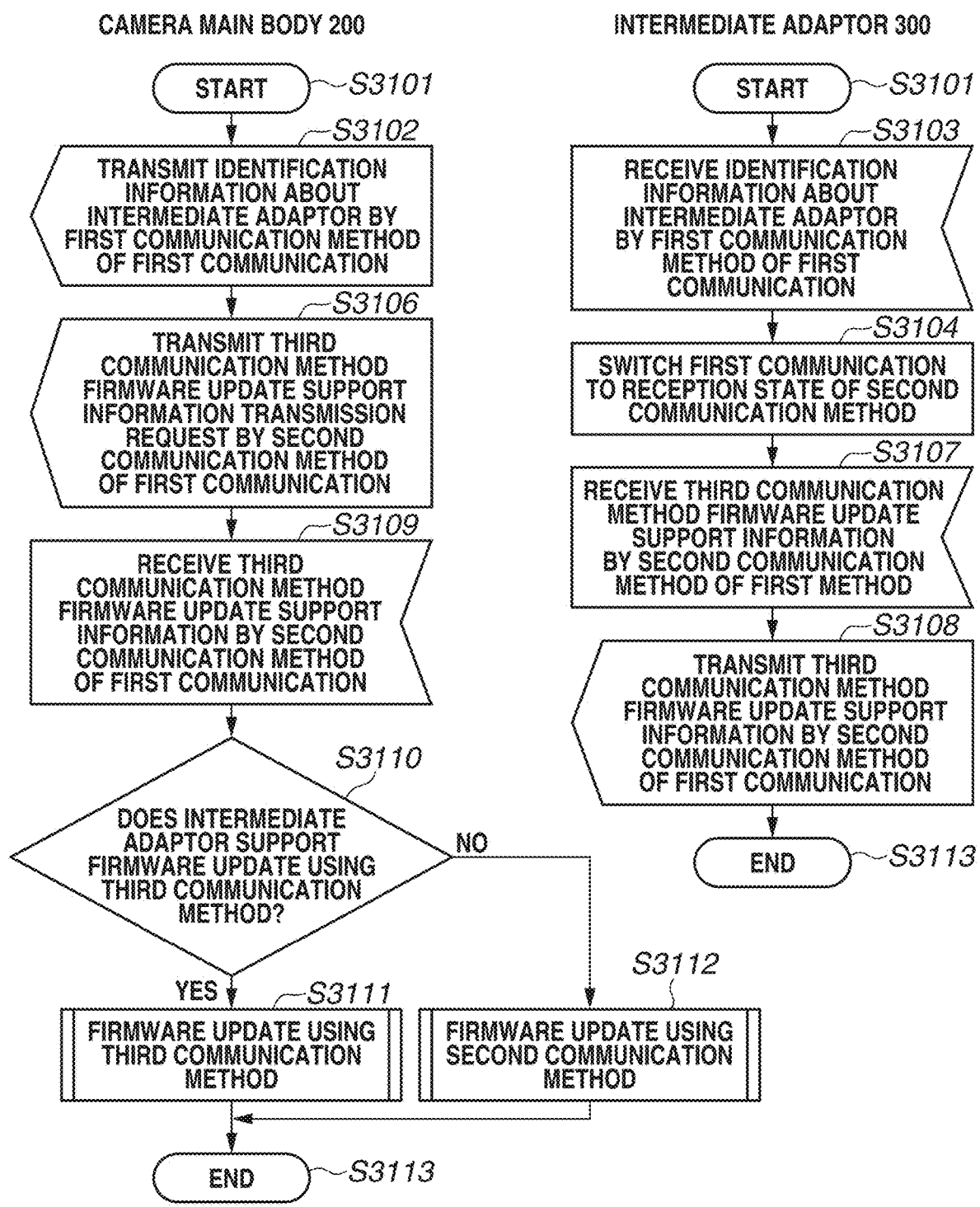
FIG. 31 is a flowchart illustrating a procedure for updating the firmware of an accessory apparatus by first communication.

Firmware update of the intermediate adaptor 300 by the first communication will now be described. FIG. 31 is a flowchart for describing a procedure for updating the firmware of the intermediate adaptor 300 by the first communication when a firmware update file recorded on the medium loaded into the camera main body 200 is selected in the camera system according to the fourth exemplary embodiment. In this process, the data on the firmware update file selected from among those recorded on the medium loaded into the camera main body 200 is transmitted to the intermediate adaptor 300. The following description will be given on the assumption that all the accessories supporting the first communication support firmware update using the second communication method. Whether firmware update using the second communication method is supported may be included in the firmware update file support information described with reference to FIG. 29. In other words, supporting a firmware update file means supporting firmware update using the second communication method. This enables firmware update by a camera main body 200 that does not support the third communication method.

In step S3101, this process starts. The processing proceeds to step S3102.

In step S3102, the camera microcomputer 205 transmits the identification information about the intermediate adaptor 300 by the first communication method of the first communication. In step S3103, both the adaptor microcomputer 302 and the lens microcomputer 111 receive the identification information about the intermediate adaptor 300 since the first communication method is broadcast communication.

In step S3104, the adaptor microcomputer 302 of the intermediate adaptor 300 receiving its own identification information switches the first communication to the reception state of the second communication method. Meanwhile, the interchangeable lens 100 receiving information different from its own identification information maintains the current state.

After the transmission of the identification information about the intermediate adaptor 300 in step S3102, the camera microcomputer 205 switches to the second communication method to communicate with the adaptor microcomputer 302 by the second communication method of the first communication.

In step S3106, the camera microcomputer 205 transmits a third communication method firmware update support information transmission request by the second communication method of the first communication.

The third communication method firmware update support information transmission request according to the present exemplary embodiment is intended to request the intermediate adaptor 300 to transmit information about whether firmware update using the third communication method is supported.

In step S3107, the adaptor communication unit 303 receives the third communication method firmware update support information transmission request by the second communication method. The processing proceeds to step S3108.

In step S3108, the adaptor microcomputer 302 transmits third communication method firmware update support information to the camera first communication unit 208 by the second communication method of the first communication.

In step S3109, the camera microcomputer 205 receives the third communication method firmware update support information from the adaptor microcomputer 302. In step S3110, the camera microcomputer 205 determines whether the intermediate adaptor 300 supports firmware update using the third communication method based on the third communication method firmware update support information received in step S3109. If firmware update using the third communication method is supported (YES in step S3110), the processing proceeds to step S3111.

In step S3111, the camera microcomputer 205 transmits the data on the firmware update file to the adaptor microcomputer 302 by the third communication method. The third communication method may be master-initiated P2P burst communication described with reference to FIG. 14 where flow control is performed using the signal line CS, or master-initiated P2P burst communication where flow control is performed using the signal line DATA like slave-initiated P2P burst communication according to the third exemplary embodiment. Since firmware update is performed not in the steady operation mode, flow control is not needed if the camera microcomputer 205 may be fully occupied. Moreover, a block control time can simply be set. If the camera first communication unit 208 has a sufficiently large reception buffer, block control is not needed, either. Such settings are made in a similar manner to in subprocess S2711 illustrated in FIG. 28. In the present exemplary embodiment, the camera microcomputer 200 makes the settings as communication settings for the intermediate adaptor 300.

In step S3110, if the intermediate adaptor 300 does not support firmware update using the third communication method (NO in step S3110), the processing proceeds to step S3112. In step S3112, the camera microcomputer 205 performs firmware update using the second communication method. The camera microcomputer 205 transmits the data on the firmware update file to the adaptor microcomputer 302 by the second communication method. The adaptor microcomputer 302 returns data such as a reception result to the camera microcomputer 205 each time a block of data is received. This is because in the second communication method, the next piece of data is unable to be transmitted from the camera microcomputer 205 to the adaptor microcomputer 302 unless the adaptor microcomputer 302 transmits the data to the camera microcomputer 205 for each block.

If all the data is transmitted to the adaptor microcomputer 302 in step S3111 or S3112 and the firmware update of the intermediate adaptor 300 is completed, the processing proceeds to step S3113. This process ends.

According to the present exemplary embodiment, the firmware update data for the intermediate adaptor 300 is communicated by the third communication method in updating the firmware of the intermediate adaptor 300 via the camera main body 200. The firmware update processing can thus be performed at high speed.

A fifth exemplary embodiment of the present invention will now be described. The present exemplary embodiment deals with subprocess 2407. A camera system according to the present exemplary embodiment has a similar configuration to that of the third exemplary embodiment.

In the present exemplary embodiment, a procedure for regularly transmitting a camera status from the camera main body 200 to the interchangeable lens 100 by the third communication method of the first communication will be described. Examples of the camera status to be transmitted may include information about camera shakes and orientation detected by a vibration sensor (not illustrated) such as a vibration gyroscope included in the camera main body 200, and camera member operation information. The information about camera shakes and orientation detected by the vibration sensor of the camera main body 200 is used for image stabilization processing for controlling a shift operation (image stabilization operation) of the image stabilization lens 103. The camera member operation information is used to operate, for example, various actuators of the interchangeable lens 100.

Such pieces of information are desirably real-time information, whereas the second communication is used for communication by which the camera main body 200 controls the interchangeable lens 100 in the steady state, and thus lacks communication realtimeness. The pieces of information are therefore regularly transmitted to the interchangeable lens 100 by using the third communication method of the first communication.

Figure 32:
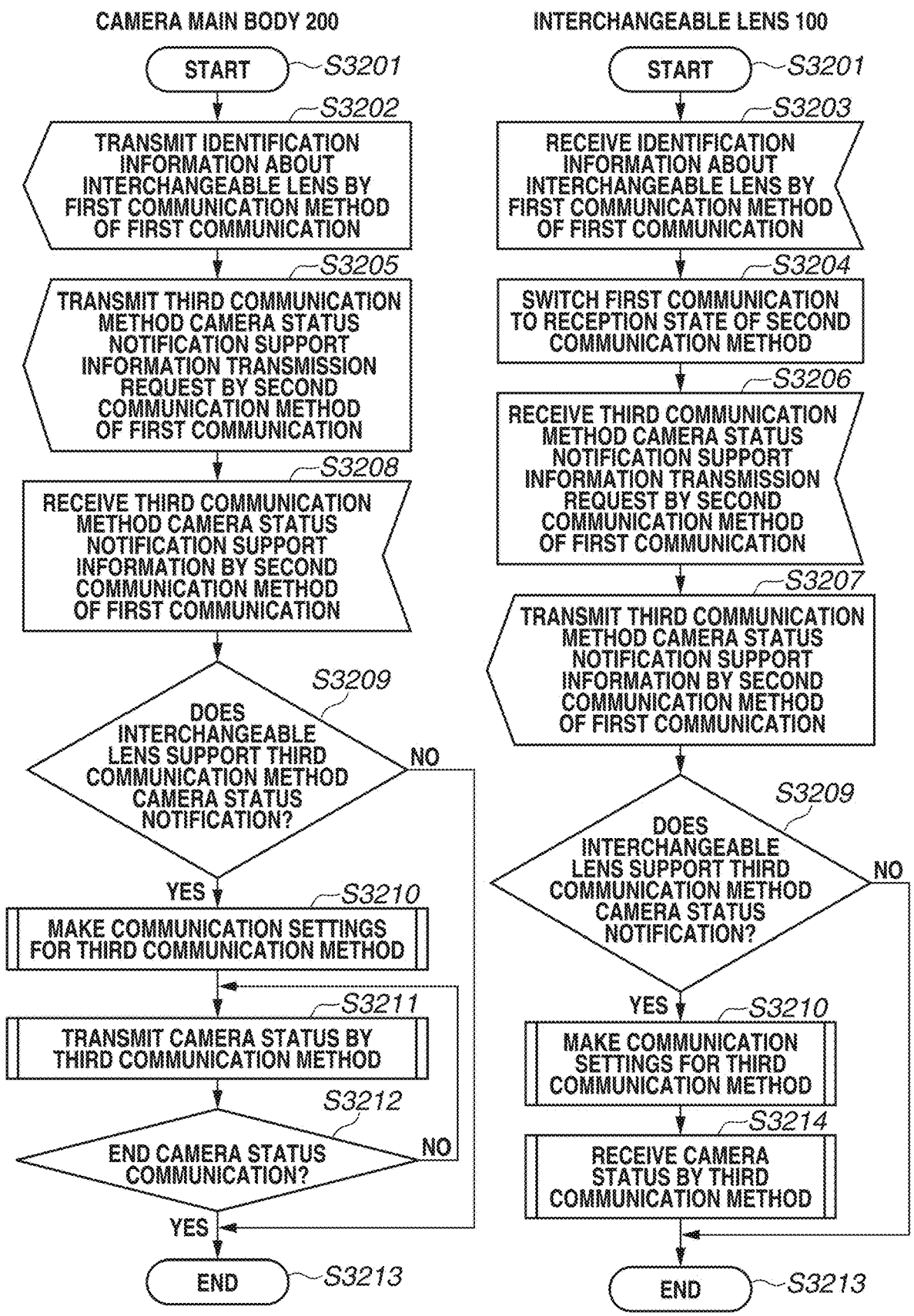
FIG. 32 is a flowchart illustrating a procedure for camera status notification using P2P burst communication.

<Notification of Camera Status Using Third Communication Method of First Communication (FIG. 32)>

The notification of the camera status using the third communication method of the first communication will be described.

In step S3201, this process starts. The processing proceeds to step S3202.

In step S3202, the camera microcomputer 205 transmits the identification information about the interchangeable lens 100 by the first communication method of the first communication. In step S3203, both the intermediate adaptor 300 and the interchangeable lens 100 receive the identification information about the interchangeable lens 100 since the first communication method is broadcast communication.

In step S3204, the lens microcomputer 111 of the interchangeable lens 100 receiving its own identification information switches the first communication to the reception state of the second communication method. Meanwhile, the intermediate adaptor 300 receiving information different from its own identification information maintains the current state.

After the transmission of the identification information about the interchangeable lens 100 in step S3202, the camera microcomputer 205 switches to the second communication method of the first communication to communicate with the interchangeable lens 100 by using the second communication method.

In step S3205, the camera microcomputer 205 transmits a third communication method camera status notification support information transmission request by using the second communication method of the first communication.

Third communication method camera status notification support information according to the present exemplary embodiment is information indicating whether the reception of the camera status by the third communication method is supported. For example, the third communication method camera status notification support information may include whether each status is supported, such as whether camera shake information is supported and whether camera member operation information is supported.

In step S3206, the lens first communication unit 112 receives the third communication method camera status notification support information transmission request by using the second communication method. The processing proceeds to step S3207.

In step S3207, the lens microcomputer 111 transmits the third communication method camera status notification support information to the camera first communication unit 208 by using the second communication method of the first communication.

In step S3208, the camera microcomputer 205 receives the third communication method camera status notification support information from the lens microcomputer 111. In step S3209, the camera microcomputer 205 determines whether the interchangeable lens 100 supports third communication method camera status notification based on the third communication method camera status notification support information received in step S3208. If the third communication method camera status notification is supported (YES in step S3209), the processing proceeds to step S3210.

If the third communication method camera status notification is not supported (NO in step S3209), the processing proceeds to step S3213. This process ends. In such a case, the camera status is either transmitted by the second communication or determined to not be used for the control of the interchangeable lens 100 and not transmitted. The use of the second communication method of the first communication is not desirable in terms of realtimeness.

In step S3210, the camera microcomputer 205 makes communication settings for the third communication method of the lens microcomputer 111 by using the second communication method. The communication settings are made in a similar manner to that in subprocess S2711 illustrated in FIG. 28, whereas the communication settings to be made by the camera microcomputer 205 in the present exemplary embodiment are intended for the interchangeable lens 100. The third communication method may be master-initiated P2P burst communication described with reference to FIG. 14 where flow control is performed using the signal line CS, or master-initiated P2P burst communication where flow control is performed using the signal line DATA like the slave-initiated P2P burst communication according to the third exemplary embodiment. Since firmware update is performed not in the steady operation mode, flow control is not needed if the camera microcomputer 205 may be fully occupied. Moreover, a block control time may simply be set. If the lens first communication unit 112 has a sufficiently large reception buffer, block control is not needed, either.

A small piece of data can be periodically transmitted as the camera status. In such a case, the time for flow control and the time for block control do not need to be set. After the completion of the settings, the processing proceeds to step S3211. If the camera status is a small piece of data as described above, the camera microcomputer 205 periodically transmits a block of camera status information while the lens first communication unit 112 maintains a state ready to receive the camera status information any time.

In step S3211, the camera microcomputer 205 transmits the camera status, and the processing proceeds to step S3212 each time the camera microcomputer 205 transmits the camera status. In step S3212, the camera microcomputer 205 determines whether to end camera status communication. If the camera status communication is to be continued (NO in step S3212), the processing returns to step S3211 to periodically perform communication. If the camera status communication is to be ended (YES in step S3211), the processing proceeds to step S3213, and this process then ends.

In step S3214, the lens microcomputer 111 receives the transmitted camera status by the third communication method.

Since the camera status is periodically communicated, the interchangeable lens 100 is unable to determine the completion of reception of all the data and lower the signal level of the signal line CS as illustrated at the end of FIG. 18. The camera status communication using the third communication method can be ended, for example, by broadcasting an end command by the first communication method of the first communication. Receiving the end command, the interchangeable lens 100 switches the first communication from the third communication method to the reception state of the first communication method.

According to the present exemplary embodiment, the camera microcomputer 205 can transmit the camera status to the interchangeable lens 100 in real time and at high speed by the third communication method of the first communication while controlling the interchangeable lens 100 by the second communication.

In the present exemplary embodiment, the camera microcomputer 205 obtains the third communication method camera status notification support information from the interchangeable lens 100 in steps S3202 to S3208. However, the camera microcomputer 205 may obtain the third communication method camera status notification support information by using the second communication. Alternatively, the camera microcomputer 205 may obtain the third communication method camera status notification support information when obtaining the interchangeable lens identification information in the foregoing step S2403 after power-on.

The third exemplary embodiment has dealt with data reception from the accessories using high-speed communication by the third communication method of the first communication. The fourth and fifth exemplary embodiments have dealt with data transmission to the accessories using high-speed communication by the third communication method of the first communication. However, the use cases of the third communication method are not limited thereto, and the third communication method can be used to transmit and receive a large amount of data and periodic data. The foregoing exemplary embodiments may be used in combination as appropriate.

In the foregoing exemplary embodiments, P2P burst communication is described to be performed between the camera microcomputer 205 of the camera main body 200 and the adaptor microcomputer 302 of the intermediate adaptor 300. Similarly, P2P burst communication may be applied to communication between the camera microcomputer 205 of the camera main body 200 and the lens microcomputer 111 of the interchangeable lens 100.

For example, similar effects can be obtained from data transfer between a sender apparatus and a receiver apparatus having a notification channel through which the receiver notifies the sender of flow control and a data communication channel through which the sender transfers data to the receiver.

Specifically, as illustrated in FIG. 21, the sender apparatus transmits a block of data and then suspends communication for the interblock wait time. The sender apparatus performs such an operation as many times as the number of blocks ahead of flow control, and waits for flow control by the receiver apparatus. The receiver apparatus receives a block of data and then makes preparations to receive the next block within the interblock wait time. The receiver apparatus performs such an operation as many times as the number of blocks ahead of flow control, performs predetermined processing, and then requests for the next data by flow control. Data can be transferred from the sender to the receiver by repeating such processing.

Similar effects can also be obtained from, for example, data transfer between a sender apparatus and a receiver apparatus where the receiver notifies the sender of flow control and the sender transfers data to the receiver by using the same notification and data channel.

Specifically, as illustrated in FIG. 22, the sender apparatus transmits a block of data and then suspends communication for the interblock wait time. The sender apparatus performs such an operation as many times as the number of blocks ahead of flow control, switches the notification and data channel to input, and waits for flow control from the receiver apparatus. The receiver apparatus receives a block of data and then makes preparations to receive the next block within the interblock wait time. The receiver apparatus performs such an operation as many times as the number of blocks ahead of flow control, and then switches the notification and data channel to output, performs predetermined processing, and requests the next data by flow control. Data can be transferred from the sender to the receiver by repeating such processing.

The foregoing exemplary embodiments have dealt with the cases where clock synchronous communication is performed by the second communication. Similar effects can be obtained if three-line asynchronous communication implemented using three lines of second communication is employed instead.

Figure 33:
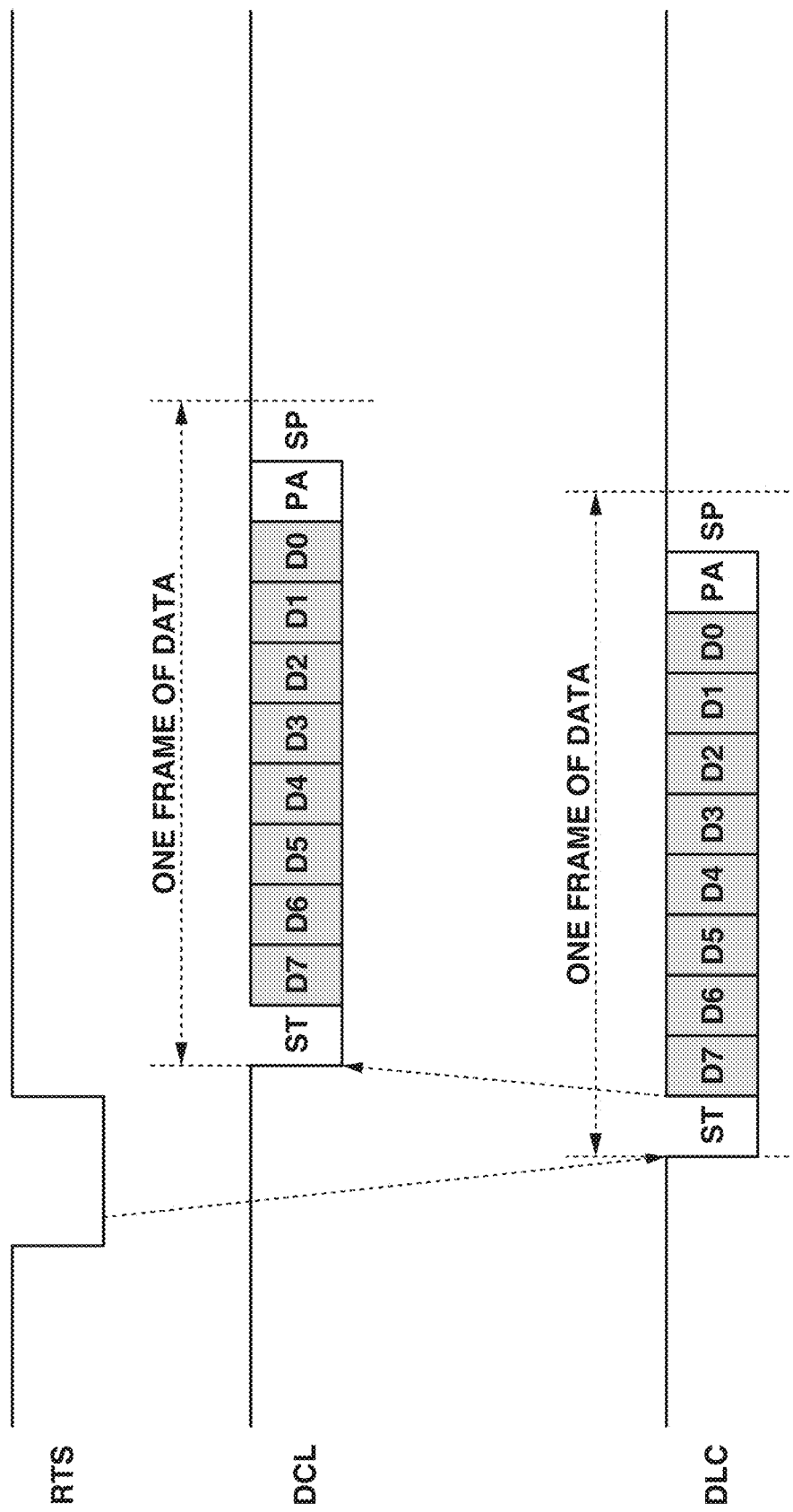
FIG. 33 is a diagram for describing a case where second communication is performed by asynchronous communication.

FIG. 33 illustrating signal waveforms in three-line asynchronous communication. In the case of three-line asynchronous communication, a transmission request line RTS is included instead of the foregoing clock line LCLK. The transmission request line RTS is a signal line for transmitting a signal for controlling the timing of communication through the data line DCL and communication through the data line DLC from the camera microcomputer 205 to the lens microcomputer 111. For example, the camera microcomputer 205 uses the transmission request line RTS to notify the lens microcomputer 111 of a transmission request for lens data and a switching request for communication processing. The notifications using the transmission request channel are issued by switching the signal level of the transmission request channel between Hi and Low.

In the following description, a signal supplied to the transmission request line RTS will be referred to as a transmission request signal RTS. The transmission request signal RTS is transmitted from the camera microcomputer 205 serving as a communication master to the lens microcomputer 111 serving as a communication slave.

As illustrated in FIG. 33, the lens microcomputer 111, after receiving the transmission request signal RTS, sets the signal level of the data line DLC to Low for one bit period to notify the camera microcomputer 205 of a start of transmission of one frame of data via the data line DLC. The one bit period is referred to as a start bit ST indicating a start of one frame. In other words, the transmission of one frame of data starts with the start bit ST. The start bit ST is located as the first bit of each frame of a data line DLC.

The lens microcomputer 111 subsequently transmits one byte of lens data to the camera microcomputer 205 in the following second to ninth, eight bit periods. The data bits are arranged in an MSB first format, starting with MSB data D7, successively followed by data D6, data D5, . . . , with LSB data D0 at the end. The lens microcomputer 111 adds one-bit parity information PA as the tenth bit, and sets the signal level of the data line DLC to Hi in the period of a stop bit SP indicating the end of one frame. The one frame of data starting with the start bit ST is thereby ended.

Meanwhile, the camera microcomputer 205 detects the start bit ST on the data line DLC and starts to transmit one frame of data in response via the data line DCL. The one frame of data has the same format as that of the data line DLC.

As described above, the second communication can implement three-line asynchronous communication instead of clock synchronous communication.

An exemplary embodiment of the present exemplary embodiment can be implemented by processing for supplying a program for implementing one or more functions of the foregoing exemplary embodiments to a system or an apparatus via a network or a storage medium, and reading and executing the program by one or more processors in a computer of the system or apparatus. A circuit for implementing one or more of the functions (for example, application specific integrated circuit (ASIC)) can also be used for implementation.

The foregoing exemplary embodiments are merely representative examples, and various changes or modifications can be made to the exemplary embodiments in practicing the present invention.

While the exemplary embodiments of the present invention have been described above, the present invention is not limited to these exemplary embodiments and various changes and modifications can be made without departing from the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155591, filed Sep. 16, 2020, which is hereby incorporated by reference herein in its entirety.

What is claimed is:

1. An accessory apparatus configured to be detachably attached to an imaging apparatus, the accessory apparatus comprising at least one processor configured to perform operations of:
   a communication control unit configured to control communication in a first communication mode where a notification is transmitted via a second terminal based on transmission of data in units of a frame via a first terminal and data is received in units of a frame via the first terminal based on transmission of the notification, and in a second communication mode where a notification is received via the second terminal based on transmission of data in units of a block including a plurality of frames via the first terminal and data is transmitted in units of a block including a plurality of frames via the first terminal based on reception of the notification,
   wherein the communication control unit is configured to, in the second communication mode, not transmit a next block of data until a notification based on transmission of a block of data via the first terminal is received via the second terminal,
   wherein the communication control unit is configured to receive information indicating a data size of each block in the first communication mode, and transmit data in units of a block having the data size based on the information via the first terminal, and
   wherein the communication control unit is configured to receive information indicating a time interval between a first block and a second block following the first block in the first communication mode, and transmit data block by block via the first terminal at the time interval based on the information.

2. The accessory apparatus according to claim 1, wherein the communication control unit is configured to receive information indicating a number of blocks in the first communication mode, and receive the notification via the second terminal based on transmission of as many blocks as the number based on the information via the first terminal.

3. The accessory apparatus according to claim 1, wherein one frame of data includes a start bit, eight bits of data, and a stop bit.

4. An imaging apparatus to which an accessory apparatus is attached, the imaging apparatus comprising at least one processor configured to perform operations of:
   a communication control unit configured to control communication in a first communication mode where a notification is received via a second terminal based on reception of data in units of a frame via a first terminal and data is transmitted in units of a frame via the first terminal based on reception of the notification, and in a second communication mode where a notification is transmitted via the second terminal based on reception of data in units of a block including a plurality of frames via the first terminal and data is received in units of a block including a plurality of frames via the first terminal based on transmission of the notification,
   wherein the communication control unit is configured to, in the second communication mode, not receive a next block of data until a notification based on reception of a block of data via the first terminal is transmitted via the second terminal, wherein the communication control unit is configured to transmit information indicating a data size of each block in the first communication mode, and receive data in units of a block having the data size based on the information via the first terminal, and wherein the communication control unit is configured to transmit information indicating a time interval between a first block and a second block following the first block in the first communication mode, and receive data block by block via the first terminal at the time interval based on the information.

5. The imaging apparatus according to claim 4, wherein the communication control unit is configured to transmit information indicating a number of blocks in the first communication mode, and transmit a notification via the second terminal based on reception of as many blocks as the number based on the information via the first terminal.

6. The imaging apparatus according to claim 4, wherein one frame of data includes a start bit, eight bits of data, and a stop bit.

7. A method for controlling an accessory apparatus configured to be detachably attached to an imaging apparatus, the method comprising:

controlling communication in a first communication mode where a notification is transmitted via a second terminal based on transmission of data in units of a frame via a first terminal and data is received in units of a frame via the first terminal based on transmission of the notification, and in a second communication mode where a notification is received via the second terminal based on transmission of data in units of a block including a plurality of frames via the first terminal and data is transmitted in units of a block including a plurality of frames via the first terminal based on reception of the notification, wherein in the second communication mode, a next block of data is not transmitted until a notification based on transmission of a block of data via the first terminal is received via the second terminal, wherein in the first communication mode, information indicating a data size of each block is received and data in units of a block having the data size based on the information is transmitted via the first terminal, and wherein in the first communication mode, information indicating a time interval between a first block and a second block following the first block is received and data block by block is transmitted via the first terminal at the time interval based on the information.

8. A method for controlling an imaging apparatus to which an accessory apparatus is attached, the method comprising:

controlling communication in a first communication mode where a notification is received via a second terminal based on reception of data in units of a frame via a first terminal and data is transmitted in units of a frame via the first terminal based on reception of the notification, and in a second communication mode where a notification is transmitted via the second terminal based on reception of data in units of a block including a plurality of frames via the first terminal and data is received in units of a block including a plurality of frames via the first terminal based on transmission of the notification, wherein in the second communication mode, a next block of data is not received until a notification based on reception of a block of data via the first terminal is transmitted via the second terminal, wherein in the first communication mode, information indicating a data size of each block is transmitted and data in units of a block having the data size based on the information is received via the first terminal, and wherein in the first communication mode, information indicating a time interval between a first block and a second block following the first block is transmitted and data block by block is received via the first terminal at the time interval based on the information.

* * * * *